(12) United States Patent
Edwards et al.

(10) Patent No.: US 10,849,386 B2
(45) Date of Patent: Dec. 1, 2020

(54) FOOTWEAR SOLE STRUCTURE HAVING A COMPOSITE ELEMENT AND METHODS FOR MANUFACTURING SAME

(71) Applicant: NIKE, Inc., Beaverton, OR (US)

(72) Inventors: Charles R. Edwards, Portland, OR (US); Joel L. Passke, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/658,067

(22) Filed: Oct. 19, 2019

(65) Prior Publication Data
US 2020/0121020 A1 Apr. 23, 2020

Related U.S. Application Data

(60) Provisional application No. 62/748,005, filed on Oct. 19, 2018, provisional application No. 62/747,967, filed on Oct. 19, 2018.

(51) Int. Cl.
A43B 13/18 (2006.01)
A43B 13/20 (2006.01)
(Continued)

(52) U.S. Cl.
CPC .............. *A43B 13/186* (2013.01); *A43B 1/04* (2013.01); *A43B 13/026* (2013.01); *A43B 13/04* (2013.01);
(Continued)

(58) Field of Classification Search
CPC ..... A43B 13/186; A43B 13/026; A43B 13/04; A43B 13/188; A43B 13/20; A43B 13/12; A43B 1/04
See application file for complete search history.

(56) References Cited

U.S. PATENT DOCUMENTS 6,127,026 A 10/2000 Bonk et al.
2014/0259462 A1* 9/2014 Taylor ................. B29D 35/144
12/146 R
(Continued)

FOREIGN PATENT DOCUMENTS

WO 2018017890 A1 1/2018
WO 2018017893 A1 1/2018

OTHER PUBLICATIONS

International Preliminary Report of Patentability issued by the European Patent Office for PCT/US2019/057100, dated Jun. 12, 2020.
(Continued)

*Primary Examiner* — Ted Kavanaugh
(74) *Attorney, Agent, or Firm* — Thomas | Horstemeyer, LLP

(57) ABSTRACT

One or more aspects of the present disclosure provide for composite elements that include a textile having a plurality of fibers, the plurality of fibers comprising a first thermoplastic material; and a second thermoplastic material surrounding the plurality of fibers of the textile and consolidating at least a portion of the textile, wherein the second thermoplastic material has a melting temperature lower than a melting temperature of the first thermoplastic material. The composite elements can be used as part of a fluid chamber or cushioning element, whereby the composite element imparts puncture resistant to the fluid chamber or cushioning element. This abstract is intended as a scanning tool for purposes of searching in the particular art and is not intended to be limiting of the present disclosure.

19 Claims, 9 Drawing Sheets

(51) Int. Cl.
*A43B 13/04* (2006.01)
*A43D 43/06* (2006.01)
*A43B 1/04* (2006.01)
*A43B 13/02* (2006.01)
*B29C 65/02* (2006.01)
*A43B 13/12* (2006.01)

(52) U.S. Cl.
CPC ............ *A43B 13/188* (2013.01); *A43B 13/20* (2013.01); *A43D 43/06* (2013.01); *B29C 65/02* (2013.01); *A43B 13/12* (2013.01)

(56) References Cited

U.S. PATENT DOCUMENTS

| | | | | |
|---|---|---|---|---|
| 2015/0013190 | A1* | 1/2015 | Davison | A43B 13/12 36/102 |
| 2018/0177261 | A1* | 6/2018 | Amis | A43B 13/125 |
| 2018/0345575 | A1* | 12/2018 | Constantinou | B29C 67/205 |
| 2020/0121022 | A1* | 4/2020 | Edwards | A43D 43/06 |

OTHER PUBLICATIONS

International Search Report issued for PCT/US2019/057100, dated Feb. 19, 2020.
International Search Report issued for PCT/US2019/057099, dated Feb. 19, 2020.

* cited by examiner

FOOTWEAR SOLE STRUCTURE HAVING A COMPOSITE ELEMENT AND METHODS FOR MANUFACTURING SAME

CROSS-REFERENCE TO RELATED APPLICATIONS

This Application claims the benefit of U.S. Provisional Application No. 62/747,967, filed on Oct. 19, 2018, and 62/748,005, filed on Oct. 19, 2018, each of which is incorporated herein by reference in its entirety.

TECHNICAL FIELD

The present disclosure relates to articles, such as articles of apparel, articles of footwear, and articles of sporting equipment. More specifically, the present disclosure is directed to articles comprising a composite element comprising a textile having a plurality of fibers including a first thermoplastic material and a second thermoplastic material surrounding the plurality of fibers of the textile, and to methods of making the disclosed articles.

BACKGROUND

The design of athletic equipment and apparel as well as footwear involves a variety of factors from the aesthetic aspects, to the comfort and feel, to the performance and durability. While design and fashion may be rapidly changing, the demand for increasing performance in the market is unchanging. To balance these demands, designers employ a variety of materials and designs for the various components that make up athletic equipment and apparel as well as footwear.

BRIEF DESCRIPTION OF THE DRAWINGS

Further aspects of the present disclosure will be readily appreciated upon review of the detailed description, described below, when taken in conjunction with the accompanying drawings.

FIG. 6C is a cross-sectional plan view of a disclosed composite element comprising a textile having a plurality of filaments or yarns in which the plurality of filaments or yarns comprise a first thermoplastic material, and in which a second thermoplastic material surrounds the plurality of fibers and consolidates the textile. FIG. 6D is a cross-sectional plan view of a disclosed composite element comprising two textiles such that each textile has a plurality of filaments or yarns in which the plurality of filaments or yarns comprise a first thermoplastic material, and in which a second thermoplastic material surrounds the plurality of fibers and consolidates the textiles.

FIG. 8A shows a cushioning structure comprising a cushioning element that is a fluid chamber and a disclosed composite element that is in contact with an interior face of the first cushioning element. FIG. 8B shows a cushioning structure comprising a cushioning element that is a fluid chamber and a disclosed composite element that is in contact with an exterior face of the first cushioning element.

FIG. 9A shows a cushioning structure comprising a first cushioning element and a second cushioning element, each of which is a foam component, and a disclosed composite element that is affixed with a face of the first cushioning element and the second cushioning element. FIG. 9B shows a cushioning structure comprising a first cushioning element that is a foam component and a disclosed composite element that is affixed to an exterior face of the first cushioning element.

DETAILED DESCRIPTION

Figure 1:
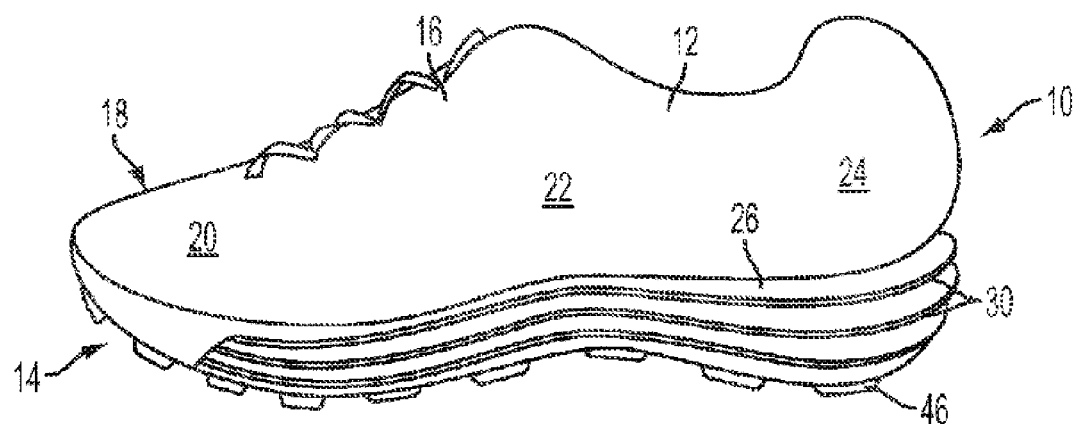
FIG. 1 is an elevation view of an article of footwear with a sole component according to an aspect of the invention.

The present disclosure provides for composite elements comprising: a textile including a plurality of fibers, the plurality of fibers comprising a first thermoplastic material; and a second thermoplastic material surrounding the plurality of fibers of the textile and consolidating at least a portion of the textile, wherein the second thermoplastic material has a melting temperature lower than a melting temperature of the first thermoplastic material. The composite element can be used alone or as an element in a component, article or structure. For example, the composite element can be used as part of a fluid chamber or a cushioning element. A component, article or structure comprising the composite element has improved puncture resistance compared to the component, article or structure lacking the composite element.

According to various aspects, a composite element can be used as part of a fluid chamber. For example, a fluid chamber can comprise a composite element extending across and affixed to at least a portion of the first side of the fluid chamber, to the second side of the fluid chamber, to the sidewall of the fluid chamber, or to any combination thereof; wherein the composite element comprises a textile including a plurality of fibers, the plurality of fibers comprising a first thermoplastic material, and a second thermoplastic material surrounding and the plurality of fibers in the textile and consolidating the textile, the second thermoplastic material having a melting temperature lower than a melting temperature of the first thermoplastic material; and a fluid chamber having a first side, a second side, and a sidewall extending between the first side and the second side, the fluid chamber comprising a third thermoplastic material.

In an aspect, a composite element can be used as part of a cushioning element. For example, a cushioning structure can comprise a first cushioning element; and a composite element affixed to the cushioning element, wherein the composite element comprises a textile including a plurality of fibers, the plurality of fibers comprising a first thermoplastic material; and a second thermoplastic material, wherein the second thermoplastic material has a melting temperature lower than a melting temperature of the first thermoplastic material; wherein, in the composite element, the second thermoplastic material surrounds the plurality of fibers in the textile and consolidates the textile.

In a first aspect, the present disclosure is directed to a composite element comprising: a textile including a plurality of fibers, the plurality of fibers comprising a first thermoplastic material; and a second thermoplastic material surrounding the plurality of fibers of the textile and consolidating at least a portion of the textile, wherein the second thermoplastic material has a melting temperature lower than a melting temperature of the first thermoplastic material.

In a second aspect, the present disclosure is directed to a fluid chamber, comprising: a composite element extending across and affixed to at least a portion of the first side of the fluid chamber, to the second side of the fluid chamber, to the sidewall of the fluid chamber, or to any combination thereof; wherein the composite element comprises a textile including a plurality of fibers, the plurality of fibers comprising a first thermoplastic material, and a second thermoplastic material surrounding and the plurality of fibers in the textile and consolidating the textile, the second thermoplastic material having a melting temperature lower than a melting temperature of the first thermoplastic material; and a fluid chamber having a first side, a second side, and a sidewall extending between the first side and the second side, the fluid chamber comprising a third thermoplastic material.

In a third aspect, the present disclosure is directed to a cushioning structure comprising: a first cushioning element; and a composite element affixed to the cushioning element, wherein the composite element comprises a textile including a plurality of fibers, the plurality of fibers comprising a first thermoplastic material; and a second thermoplastic material, wherein the second thermoplastic material has a melting temperature lower than a melting temperature of the first thermoplastic material; wherein, in the composite element, the second thermoplastic material surrounds the plurality of fibers in the textile and consolidates the textile.

In a fourth aspect, the present disclosure is directed to an article of footwear, comprising: an upper; and a sole structure affixed to the upper, wherein the sole structure includes a cushioning structure according to any one of Aspect 165 to Aspect 185.

In a fifth aspect, the present disclosure is directed to an outsole for an article of footwear, the outsole comprising: a composite element according to any one of Aspect 1 to Aspect 49.

In a sixth aspect, the present disclosure is directed to a method of manufacturing a composite element, the method comprising: positioning a textile and film adjacent to each other, wherein the textile includes a plurality of fibers, the plurality of fibers comprising a first thermoplastic material; and wherein the film comprises a second thermoplastic material has a melting temperature lower than a melting temperature of the first thermoplastic material; and increasing a temperature of the film to a temperature at or above the melting temperature of the second thermoplastic material but below the melting temperature of the first thermoplastic material, such that the second thermoplastic flows and surrounds the plurality of fibers of the textile and consolidates the textile; and decreasing the temperature of the film to a temperature below the melting temperature of the second thermoplastic material such that the second thermoplastic re-solidifies, forming the composite element.

In a seventh aspect, the present disclosure is directed to a method of forming a fluid chamber, the method comprising: affixing a composite element to a fluid chamber, wherein the fluid chamber has a first side, a second side, and a sidewall extending between the first side and the second side, and the fluid chamber comprises a third thermoplastic material; wherein the composite element extends across and affixed to at least a portion of the first side of the fluid chamber, to the second side of the fluid chamber, to the sidewall of the fluid chamber, or to any combination thereof, and wherein the composite element comprises a textile including a plurality of fibers, the plurality of fibers comprising a first thermoplastic material, and a second thermoplastic material surrounding and the plurality of fibers in the textile and consolidating the textile, the second thermoplastic material having a melting temperature lower than a melting temperature of the first thermoplastic material.

In an eighth aspect, the present disclosure is directed to a method of making a cushioning structure, the method comprising: affixing a composite element to a first cushioning element; wherein the composite element comprises a textile including a plurality of fibers, the plurality of fibers comprising a first thermoplastic material; a second thermoplastic material, wherein the second thermoplastic material has a melting temperature lower than a melting temperature of the first thermoplastic material; and, in the composite element, the second thermoplastic material surrounds the plurality of fibers in the textile and consolidates the textile.

The present disclosure relates to articles of footwear, comprising an upper; and a sole structure affixed to the upper, wherein the sole structure includes a disclosed cushioning structure comprising a disclosed composite element.

The present disclosure also relates to outsoles for an articles of footwear, the outsole comprising a disclosed composite element.

In various aspects, the present disclosure provides for a method of manufacturing a composite element, the method comprising: positioning a textile and film adjacent to each other, wherein the textile includes a plurality of fibers, the plurality of fibers comprising a first thermoplastic material; and wherein the film comprises a second thermoplastic material has a melting temperature lower than a melting temperature of the first thermoplastic material; and increasing a temperature of the film to a temperature at or above the melting temperature of the second thermoplastic material but below the melting temperature of the first thermoplastic material, such that the second thermoplastic flows and surrounds the plurality of fibers of the textile and consolidates the textile; and decreasing the temperature of the film to a temperature below the melting temperature of the second thermoplastic material such that the second thermoplastic re-solidifies, forming the composite element.

The present disclosure provides for a method of forming a fluid chamber, the method comprising: affixing a composite element to a fluid chamber, wherein the fluid chamber has a first side, a second side, and a sidewall extending between the first side and the second side, and the fluid chamber comprises a third thermoplastic material; wherein the composite element extends across and affixed to at least a portion of the first side of the fluid chamber, to the second side of the fluid chamber, to the sidewall of the fluid chamber, or to any combination thereof, and wherein the composite element comprises a textile including a plurality of fibers, the plurality of fibers comprising a first thermoplastic material, and a second thermoplastic material surrounding and the plurality of fibers in the textile and consolidating the textile, the second thermoplastic material having a melting temperature lower than a melting temperature of the first thermoplastic material.

The present disclosure provides for a method of making a cushioning structure, the method comprising: affixing a composite element to a first cushioning element; wherein the composite element comprises a textile including a plurality of fibers, the plurality of fibers comprising a first thermoplastic material; a second thermoplastic material, wherein the second thermoplastic material has a melting temperature lower than a melting temperature of the first thermoplastic material; and, in the composite element, the second thermoplastic material surrounds the plurality of fibers in the textile and consolidates the textile.

The present disclosure provides for a method of manufacturing an article, comprising: affixing a first component to a cushioning structure, wherein the cushioning structure is a disclosed cushioning structure.

Now having described embodiments of the present disclosure generally, additional discussion regarding embodiments will be described in greater details.

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method may be carried out in the order of events recited or in any other order that is logically possible.

Embodiments of the present disclosure will employ, unless otherwise indicated, techniques of material science, chemistry, textiles, polymer chemistry, and the like, which are within the skill of the art. Such techniques are explained fully in the literature.

Unless otherwise defined, all technical and scientific terms used herein have the same meaning as commonly understood by one of ordinary skill in the art of material science, chemistry, textiles, polymer chemistry, and the like.

Although methods and materials similar or equivalent to those described herein can be used in the practice or testing of the present disclosure, suitable methods and materials are described herein.

As used in the specification and the appended claims, the singular forms "a," "an," and "the" may include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Exemplary Articles Comprising a Composite Element

Articles of the present disclosure include the composite element, which is understood to comprise the composite element itself or a component such as a fluid chamber or a cushioning structure comprising the composite element. In an aspect, a disclosed article including a composite element can include footwear, apparel (e.g., shirts, jerseys, pants, shorts, gloves, glasses, socks, hats, caps, jackets, undergarments), containers (e.g., backpacks, bags), and upholstery for furniture (e.g., chairs, couches, car seats), bed coverings (e.g., sheets, blankets), table coverings, towels, flags, tents, sails, and parachutes. In addition, the composite element can be used with items such as striking devices (e.g., bats, rackets, sticks, mallets, golf clubs, paddles, etc.), athletic equipment (e.g., golf bags, baseball and football gloves, soccer ball restriction structures), protective equipment (e.g., pads, helmets, guards, visors, masks, goggles, etc.), locomotive equipment (e.g., bicycles, motorcycles, skateboards, cars, trucks, boats, surfboards, skis, snowboards, etc.), balls or pucks for use in various sports, fishing or hunting equipment, furniture, electronic equipment, construction materials, eyewear, timepieces, jewelry, and the like.

In certain aspects, a disclosed composite element can form at least a portion of a component of an article of footwear. In certain aspects, the disclosed composite elements can form at least a portion of a component of an article of sporting equipment. For example, the disclosed composite elements can comprise a portion of an outsole for a shoe, such as an athletic shoe.

In an aspect, the article can include footwear. The footwear can be designed for a variety of uses, such as sporting, athletic, military, work-related, recreational, or casual use. Primarily, the article of footwear is intended for outdoor use on unpaved surfaces (in part or in whole), such as on a ground surface including one or more of grass, turf, gravel, sand, dirt, clay, mud, and the like, whether as an athletic performance surface or as a general outdoor surface. However, the article of footwear may also be desirable for indoor applications, such as indoor sports including dirt playing surfaces for example (e.g., indoor baseball fields with dirt infields).

The article of footwear can be designed for use in outdoor sporting activities, such as global football/soccer, golf, American football, rugby, baseball, running, track and field, cycling (e.g., road cycling and mountain biking), and the like. The article of footwear can optionally include traction elements (e.g., lugs, cleats, studs, and spikes as well as tread patterns) to provide traction on soft and slippery surfaces, where components of the present disclosure can be used or applied between or among the traction elements and optionally on the sides of the traction elements but on the surface of the traction element that contacts the ground or surface. Cleats, studs and spikes are commonly included in footwear designed for use in sports such as global football/soccer, golf, American football, rugby, baseball, and the like, which are frequently played on unpaved surfaces. Lugs and/or exaggerated tread patterns are commonly included in footwear including boots design for use under rugged outdoor conditions, such as trail running, hiking, and military use.

The article can be an article of apparel (i.e., a garment). The article of apparel can be an article of apparel designed for athletic or leisure activities. The article of apparel can be an article of apparel designed to provide protection from the elements (e.g., wind and/or rain), or from impacts.

The article can be an article of sporting equipment. The article of sporting equipment can be designed for use in indoor or outdoor sporting activities, such as global football/soccer, golf, American football, rugby, baseball, running, track and field, cycling (e.g., road cycling and mountain biking), and the like.

Exemplary Aspects of Articles of Footwear

Footwear 10 is an exemplary article of athletic footwear that comprises one or more components article made using the methods of the present disclosure. While illustrated as a running shoe, footwear 10 may alternatively be configured for any suitable athletic performance, such as baseball shoes, basketball shoes, soccer/global football shoes, American football shoes, running shoes, cross-trainer shoes, cheerleading shoes, golf shoes, and the like. While an athletic shoe is exemplified in FIG. 1, it will be readily understood that some of the terminology employed will also apply to other articles of footwear or to other styles of shoe. Footwear 10 includes an upper 12 and a sole component 14 secured to upper 12. Sole component 14 can be secured to upper 12 by adhesive or any other suitable means. As used herein, the sole component 14 can be a monolithic component formed entirely of an article made using the disclosed methods as described herein, or a multi-component assembly formed of a plurality of monolithic components, where at least one of the monolithic components is formed entirely of the article made using the disclosed methods as described herein.

Footwear 10 has a medial, or inner, side 16 and a lateral, or outer, side 18. For ease of discussion, footwear 10 can be divided into three portions: a forefoot portion 20, a midfoot portion 22, and a heel portion 24. Portions 20, 22, and 24 are not intended to demarcate precise areas of footwear 10. Rather, portions 20, 22, and 24 are intended to represent respective areas of footwear 10 that provide a frame of reference during the following discussion. Unless indicated otherwise, directional terms used herein, such as rearwardly, forwardly, top, bottom, inwardly, downwardly, upwardly, etc., refer to directions relative to footwear 10 itself. Footwear 10 is shown in FIG. 1 in a substantially horizontal orientation, as it would be positioned on a horizontal surface when worn by a wearer. However, it is to be appreciated that footwear 10 need not be limited to such an orientation. Thus, in FIG. 1, rearwardly is toward heel portion 24 (to the right as seen in FIG. 1), forwardly is toward forefoot portion 20 (to the left as seen in FIG. 1), and downwardly is toward the bottom of the page as seen in FIG. 1. Top refers to elements toward the top of the view in FIG. 1, while bottom refers to elements toward the bottom of the view in FIG. 1. Inwardly is toward the center of footwear 10, and outwardly is toward the outer peripheral edge of footwear 10.

In some aspects, the component is a sole component, such as a sole component 14 depicted in FIGS. 1-5, that includes article made using the disclosed methods as described herein. In some aspects, the component is an insert such as insert 36 or insert 60 depicted in FIGS. 4-5 that includes article made using the disclosed methods as described herein. The sole components and inserts for sole components can be made partially or entirely of article made using the disclosed methods as described herein. Any portion of a sole component or an insert for a sole component can be made of article made using the disclosed methods as described herein. For example, first portion 26 of the sole component (optionally including the ground engaging lower surface 44, such as the plurality of projections 46 and/or the groove 48 surrounding the projections), the entire insert 36, portions 62 or 64 of insert 60, a separate outsole component, or any combination thereof, can include article made using the disclosed methods as described herein.

Sole component 14, which is generally disposed between the foot of the wearer and the ground, provides attenuation of ground reaction forces (i.e., imparting cushioning), traction, and may control foot motions, such as pronation. As with conventional articles of footwear, sole component 14 can include an insole (not shown) located within upper 12. In some aspects, the sole component is an insole or sockliner or is a multi-component assembly including an insole or sockliner, can further include an insole or sockliner located within the upper, where the insole or sockliner is formed entirely or partially of article made using the disclosed methods as described herein. Articles of footwear described herein can include an insole or sockliner formed entirely or partially of article made using the disclosed methods as described herein.

Figure 2:
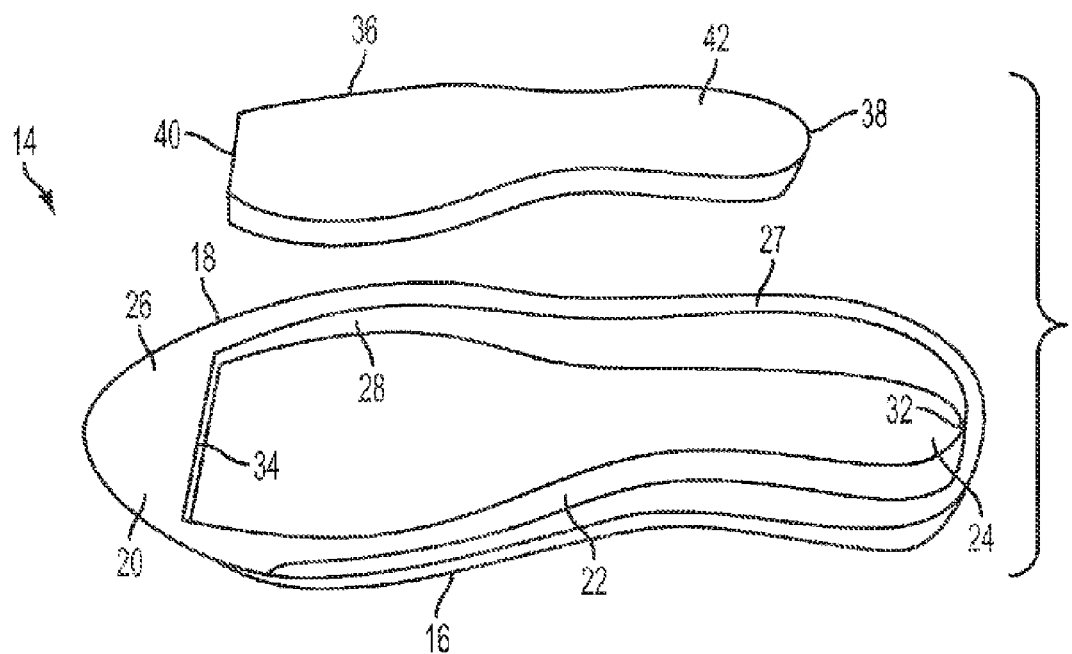
FIG. 2 is an exploded view of the sole component of the article of footwear of FIG. 1.

As can be seen in FIG. 2, sole component 14 consists of a first portion 26 having an upper surface 27 with a recess 28 formed therein. Upper surface 27 is secured to upper 12 with adhesive or other suitable fastening means. A plurality of substantially horizontal ribs 30 is formed on the exterior of first portion 26. In certain aspects, ribs 30 extend from a central portion of forefoot portion 20 on medial side 16 rearwardly along first portion 26, around heel portion 24 and forwardly on lateral side 18 of first portion 26 to a central portion of forefoot portion 20.

First portion 26 provides the external traction surface of sole component 14. In certain aspects it is to be appreciated that a separate outsole component could be secured to the lower surface of first portion 26. When a separate outsole component is secured to the lower surface of first portion 26, the first portion 26 is a midsole component. In some aspects, the article is a midsole component for an article of footwear.

In some aspects, the article is an insert. An insert 36 can be received in recess 28. As illustrated in FIG. 2, insert 36 can provide cushioning or resiliency in the sole component. First portion 26 can provide structure and support for insert 36. In such aspects, first portion 26 can be formed of a material of higher density and/or hardness as compared to insert 36 such as, for example, non-foam materials including rubber and thermoplastic polyurethane, as well as foam materials. In certain aspects, insert 36 can be formed of article made using the disclosed methods as described herein.

Insert 36 has a curved rear surface 38 to mate with curved rear surface 32 of recess 28 and a transverse front surface 40 to mate with transverse front surface 34 of recess 28. An upper surface 42 of insert 36 is in contact with and secured to upper 12 with adhesive or other suitable fastening means. For example, when there is an insert 36, a recess 28 can extend from heel portion 24 to forefoot portion 20. In certain aspects, the rear surface 32 of recess 28 is curved to substantially follow the contour of the rear of heel portion 24 and the front surface 34 of recess 28 extends transversely across first portion 26.

Figure 3:
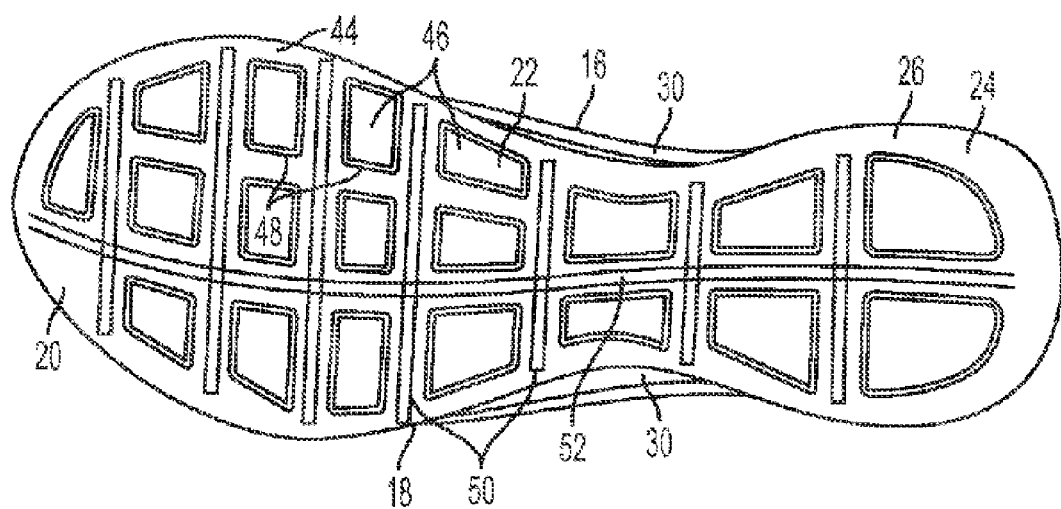
FIG. 3 is a plan view of the bottom of the sole component of the article of footwear of FIG.

As seen best in FIG. 3, a ground engaging lower surface 44 of first portion 26 includes a plurality of projections 46.

Each projection 46 is surrounded by a groove 48. A plurality of transverse slots 50 are formed in lower surface 44, extending between adjacent projections 46. A longitudinal slot 52 extends along lower surface 44 from heel portion 26 to forefoot portion 20.

Figure 4:
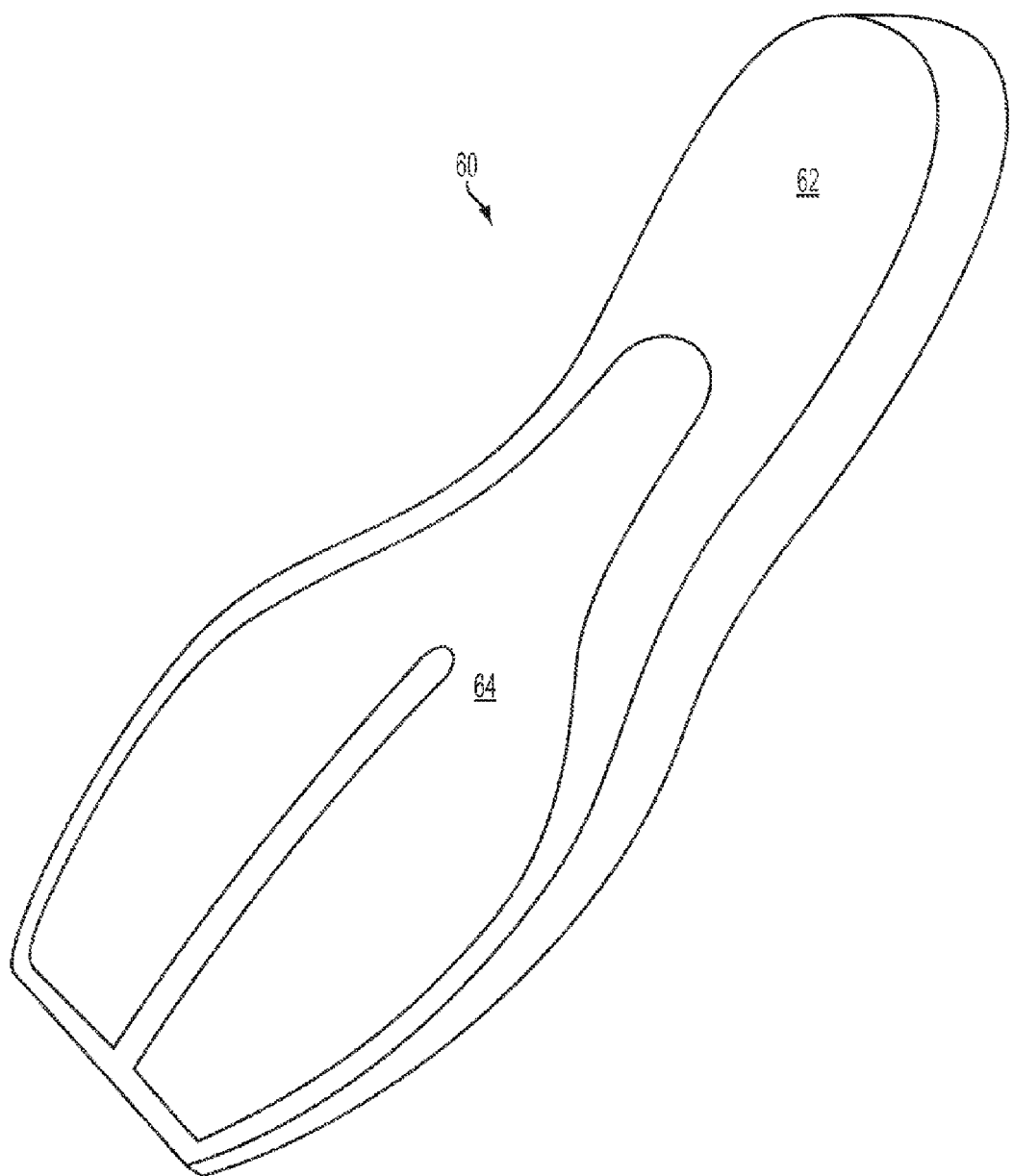
FIG. 4 is a bottom view of an insert for use in a sole component of an article of footwear.
Figure 5:
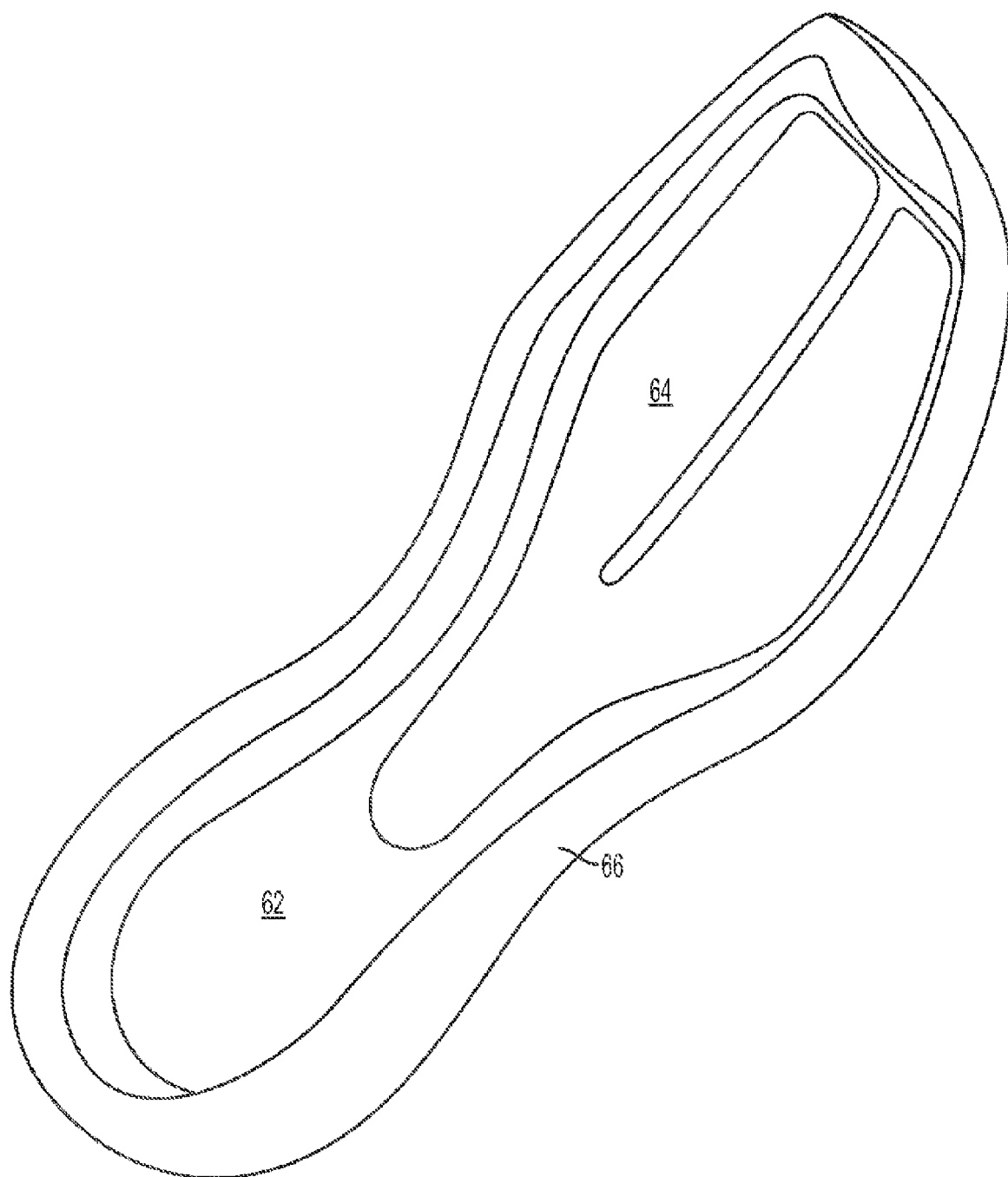
FIG. 5 is a top view of the insert of FIG. 4 inserted in a first portion to form a sole component.

FIGS. 4 and 5 show bottom and top views of an insert 60 which can be used in a sole component as described herein. Insert 60 is similar to insert 36, but as illustrated in FIGS. 4 and 5, insert 60 is formed of two types of materials 62 and 64, where at least one of the materials is article made using the disclosed methods as described herein. FIG. 4 shows a bottom view of insert 60, while FIG. 5 shows a top view of insert 60 formed of two types of materials 62 and 64, with the insert placed inside a first portion 66 to form a sole component 14. Inserts with more than two types of materials, at least one of which is article made using the disclosed methods as described herein, can also be used. In the example illustrated in FIGS. 4 and 5, a portion of a first material 62 can be used in the heel region of the insert, and a portion of a second material 64 can be used in the toe region of the insert. A higher density material can be used to support the heel region, while a lower density material can be used to support the toe region. For example, the density of the first material can be at least 0.02 g/cm$^3$ greater than the density of the second material. The shape of the portions of the two materials 62 and 64 of the insert can be any suitable shape. For example, the heel region can be in the shape of a wedge. Inserts formed of two types of materials can be useful in running shoes, as well as in basketball shoes.

Composite Elements

As mentioned above, a disclosed composite element includes a textile having one or more fibers, filaments, or yarns, such that the plurality of fibers, filaments, or yarns comprise a first thermoplastic material; and a second thermoplastic material surrounding the plurality of fibers, filaments, or yarns of the textile and consolidating at least a portion of the textile, wherein the second thermoplastic material has a melting temperature lower than a melting temperature of the first thermoplastic material.

Exemplary disclosed composite elements 100 are shown as cross-sectional plan views in FIGS. 6A-6E, which although depicted in the drawings as having certain relative proportions, it is to be understood that the drawings are not necessarily to scale and that other relative proportions of element thicknesses, size, spatial relationships, and the like are within the scope of the drawings. All such modifications and variations are intended to be included herein within the scope of this composite element shown. Briefly, the various composite elements 100 depicted comprise one or more textile 120, 121, 122, 123, and/or 124, in which the textile has a plurality of fibers in which the plurality of fibers comprise a first thermoplastic material, and the textile is arranged within the composite element such that a second thermoplastic material 120 surrounds the plurality of fibers and consolidates the textile.

Figure 6A:
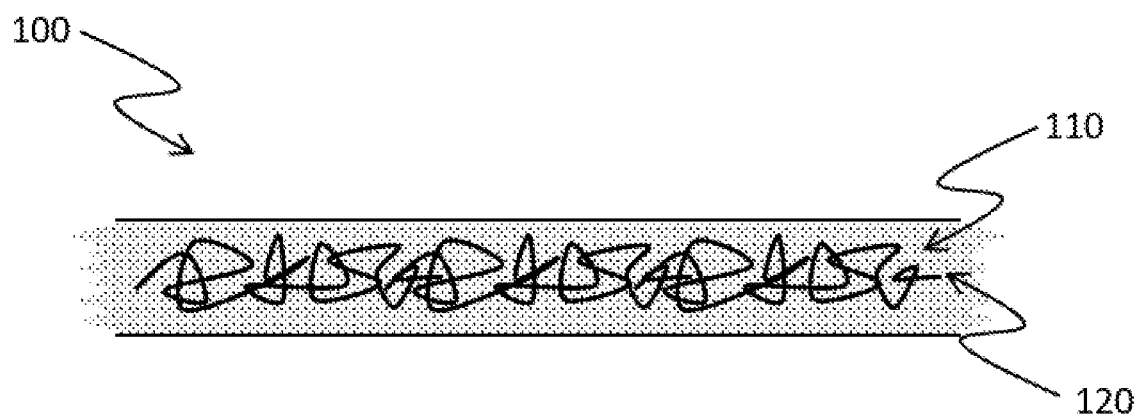
FIGS. 6A-6D are cross-sectional plan views of disclosed composite elements. Each of FIGS. 6A and 6B show a cross-sectional plan view of a disclosed composite element comprising a non-woven textile having a plurality of fibers in which the plurality of fibers comprise a first thermoplastic material, and in which a second thermoplastic material surrounds the plurality of fibers and consolidates the textile.
Figure 6B:
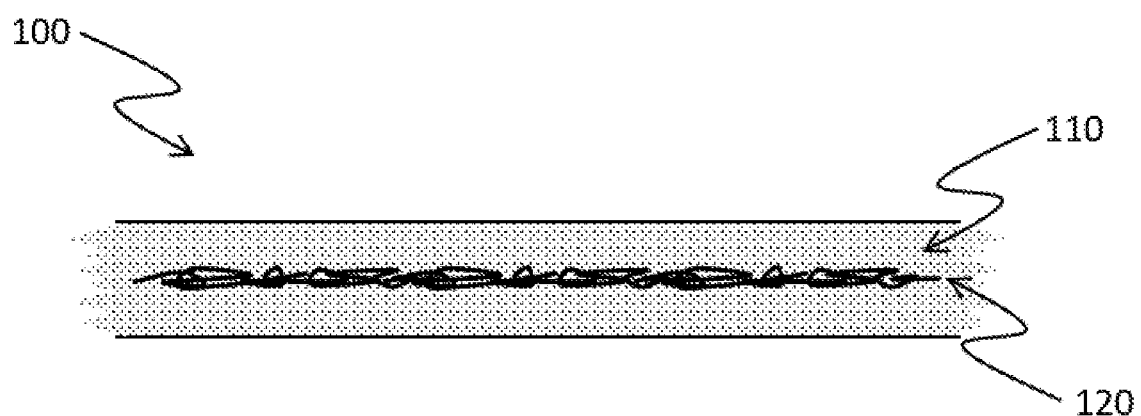
Figure 6C:
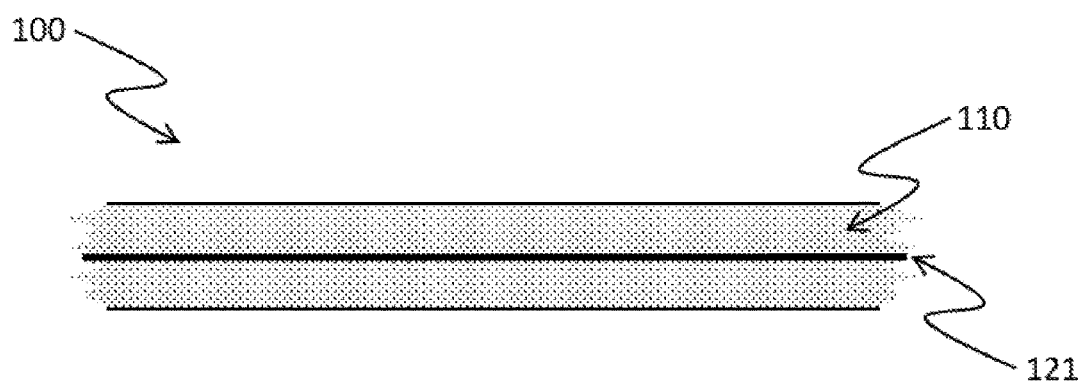
Figure 6D:
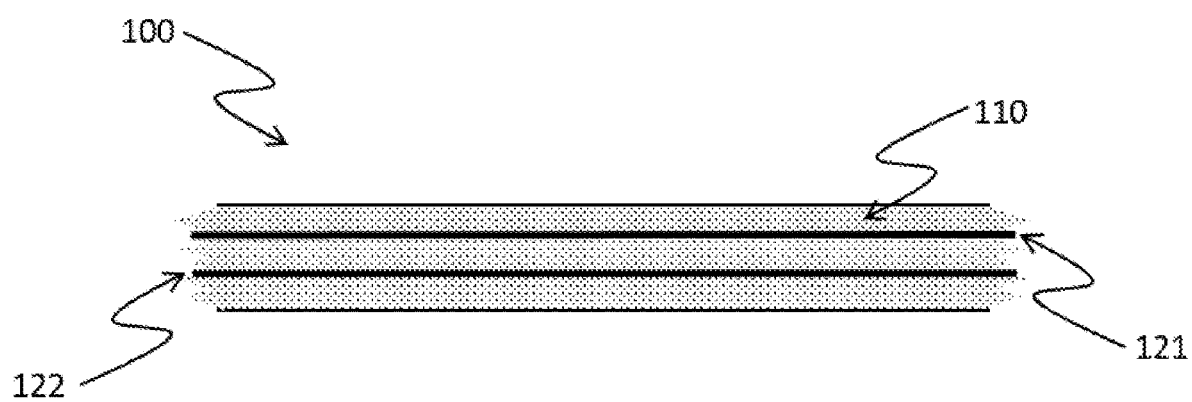
Figure 6E:
FIG. 6E is a cross-sectional plan view of a disclosed composite element comprising a plurality of textiles such that each textile has a plurality of filaments or yarns in which the plurality of filaments or yarns comprise a first thermoplastic material, and in which a second thermoplastic material surrounds the plurality of fibers and consolidates the textiles.

In some instances, as shown in FIG. 6A, a composite element 100 can comprise a non-woven textile 120 comprising a plurality fibers, with the non-woven textile 120 arranged or distributed within the composite element 100 and in contact with a second thermoplastic material that surrounds and consolidates the textile 120. Although the non-woven 120 is depicted in FIG. 6A is depicted as having an overall thickness that is relatively thick compared to the overall thickness of the composite element 100, and with the plurality of fibers in the non-woven textile as being loosely bonded and arranged relative to one another, other arrangements and relative thicknesses are within the scope contemplated by FIG. 6A. For example, the non-woven textile have a relatively thinner thickness with the fibers in the non-woven textile is more compressed with a tighter arrangement of fibers as depicted in FIG. 6B. In other instances, as shown in FIG. 6C, a composite element 100 can comprise a textile 120, in which the textile can be a woven or knit textile comprising a plurality fibers, having the plurality of filaments or yarns comprising a first thermoplastic material, and in which a second thermoplastic material surrounds the plurality of fibers and consolidates the textile. The textile 120 depicted in FIG. 6C can be any textile as disclosed herein, e.g., a woven textile or a knit textile. Alternatively, as shown in FIG. 6D, a composite element comprises a first textile 121, e.g., a woven or knit textile, and a second textile 122, e.g., a woven or knit textile, each textile having a plurality of filaments or yarns in which the plurality of filaments or yarns comprise a first thermoplastic material, and in which a second thermoplastic material surrounds the plurality of fibers and consolidates the textile. It is to be understood that the first textile 121 and the second textile 122 do not need to be the same textile, that is, each can independently be a woven or knit textile comprising the same or different filaments or yarns. Moreover, the first textile 121 and the second textile 122 can both comprise the first thermoplastic material, but is also possible that the first textile 121 and the second textile 122 can independently comprise the first thermoplastic material and an additional thermoplastic material. In a further instance, as shown in FIG. 6E, a composite element can comprise a plurality of textiles 150, e.g., as shown a first textile 121, a second textile 122, a third textile 123, and a fourth textile 124, with each textile independently a woven or knit textile and each textile having a plurality of filaments or yarns in which the plurality of filaments or yarns can comprise a first thermoplastic material, and in which a second thermoplastic material surrounds the plurality of fibers and consolidates the textile. Similarly to the composite element described in FIG. 6D, it is understood that the plurality of textiles can each comprise the first thermoplastic material, but is also possible that the plurality of textiles can independently comprise the first thermoplastic material or an additional thermoplastic material. Although in FIGS. 6D and 6E, the plurality of textiles are shown with a certain relative spacing and a certain thickness of the second thermoplastic material between each textile of the plurality of textiles, it is also contemplated that each textile of the plurality of textiles can have relatively little or substantially no spacing between each textile of the plurality of textiles or such that each textile of the plurality of textiles one face of a textile is contacting, in part or in whole, the opposing face of the textile above and/or below it. As shown in FIGS. 6A-6E, it can be appreciated that the second thermoplastic material can be found between and within the fibers, filaments, or yarns of the textile 120, 121, 122, 123, and/or 124. That is, the second thermoplastic material can be in a molten or melted state that is flowable, allowing flow of the second thermoplastic material between and within the fibers, filaments, or yarns of the textile 120, 121, 122, 123, and/or 124, followed by solidification of the second thermoplastic material.

Moreover, it is understood that in any of composite elements as disclosed, e.g., in each of FIGS. 6A-6E, that a fiber, filament or yarn comprising a first thermoplastic material means that the fiber, filament or yarn may comprising substantially, at least in terms of polymer content, only a single thermoplastic material, but is also inclusive of composite elements in which the fiber, filament or yarn comprises the first thermoplastic material a plurality of thermoplastic materials as disclosed herein. Similarly, disclosure of a second thermoplastic material is inclusive of composite elements in which the second thermoplastic material is substantially, at least in terms of polymer content, only a single thermoplastic material, as well as composite elements in which the second thermoplastic material comprises a plurality of thermoplastic materials as disclosed herein.

As discussed herein below, it is understood the textile can include a plurality of fibers, a plurality of filaments, or a plurality of yarns, such that the plurality of fibers, the plurality of filaments, or the plurality of yarns comprise a first thermoplastic material. In some instances, the plurality of fibers, the plurality of filaments, or the plurality of yarns can have a first and a second fiber, a first filament and a second filament, or a first yarn and a second yarn, such that each of the first and the second fiber, filament, or yarn, independently have a first thermoplastic material and an additional thermoplastic material as disclosed herein. For example, a textile can have a plurality of yarns, such that the first yarn comprises a first thermoplastic material and the second yarn comprises a thermoplastic material that is not the first thermoplastic material, but another thermoplastic material as disclosed herein. That is, the first thermoplastic material and the additional thermoplastic material can be the same or different in terms of polymer composition or a property, e.g., melting temperature of the polymer.

Figure 7:
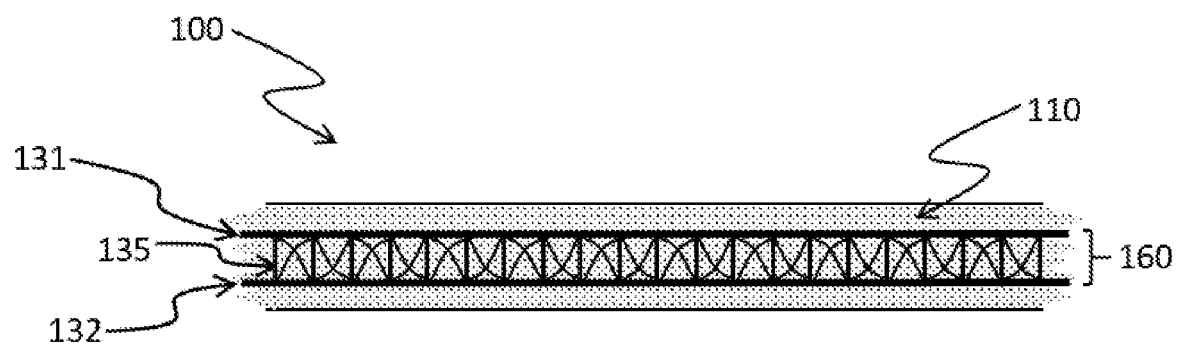
FIG. 7 is a cross-sectional plan view of a disclosed composite element comprising a textile component having a plurality of fibers in which the plurality of fibers comprise a first thermoplastic material, and in which a second thermoplastic material surrounds the plurality of fibers and consolidates the textile. The textile has a first face and a second face, with yarns connecting the first face and the second face.

A further composite element is described by the drawing in FIG. 7, in which the composite element comprises a spacer textile 160, in which the textile has a first textile face 131, a second textile face 132, and a spacer yarns 135. The connecting yarns 135 form a connection between the first textile face 131 and the second textile face 132, and the spacer yarns can be arranged to form greater or lesser spacing between the first textile face 131 and the second textile face 132. As shown, the second thermoplastic material can be found between and within the first textile face 131, the second textile face 132, and the spacer yarns 135. That is, the second thermoplastic material can be in a molten or melted state that is flowable, allowing flow of the second thermoplastic material between and within the first textile face 131, the second textile face 132, and the spacer yarns 135, followed by solidification of the second thermoplastic material.

In some instances, a disclosed composite element includes a textile having a plurality of fibers, the plurality of fibers comprising a first thermoplastic material; and a second thermoplastic material surrounding the plurality of fibers of the textile and consolidating at least a portion of the textile, wherein the second thermoplastic material has a melting temperature lower than a melting temperature of the first thermoplastic material.

In other instances, a disclosed composite element includes a textile having a plurality of filaments, the plurality of filaments comprising a first thermoplastic material; and a second thermoplastic material surrounding the plurality of fibers of the textile and consolidating at least a portion of the textile, wherein the second thermoplastic material has a melting temperature lower than a melting temperature of the first thermoplastic material.

In further instances, a disclosed composite element includes a textile having at least one yarn, the at least one yarn comprising a first thermoplastic material; and a second thermoplastic material surrounding the plurality of fibers of the textile and consolidating at least a portion of the textile, wherein the second thermoplastic material has a melting temperature lower than a melting temperature of the first thermoplastic material.

Fluid Chambers

In accordance with some aspects, the composite element can be affixed on to a components, e.g., a fluid chamber such as may be incorporate into a sole of an article of footwear.

In some aspects, the present disclosure pertains to a fluid chamber, comprising: a composite element extending across and affixed to at least a portion of the first side of the fluid chamber, to the second side of the fluid chamber, to the sidewall of the fluid chamber, or to any combination thereof; wherein the composite element comprises a textile including a plurality of fibers, the plurality of fibers comprising a first thermoplastic material, and a second thermoplastic material surrounding and the plurality of fibers in the textile and consolidating the textile, the second thermoplastic material having a melting temperature lower than a melting temperature of the first thermoplastic material; and a fluid chamber having a first side, a second side, and a sidewall extending between the first side and the second side, the fluid chamber comprising a third thermoplastic material.

The fluid chamber can be unfilled, partially inflated, or fully inflated when the composite element is affixed to the fluid chamber. The fluid chamber is a fluid chamber capable of including a volume of a fluid. An unfilled fluid chamber is a fluid-fillable fluid chamber and a filled fluid chamber which has been at least partially inflated with a fluid at a pressure equal to or greater than atmospheric pressure. When disposed onto or incorporated into an article, the fluid chamber is generally, at that point, a fluid-filled fluid chamber. The fluid be a gas or a liquid. The gas can include air, nitrogen gas ($N_2$), or other appropriate gas.

The fluid chamber can have a gas transmission rate for nitrogen gas, for example, where a fluid chamber wall of a given thickness has a gas transmission rate for nitrogen that is at least about ten times lower than the gas transmission rate for nitrogen of a butyl rubber layer of substantially the same thickness as the thickness of the fluid chamber described herein. The fluid chamber can have a first fluid chamber wall having a first fluid chamber wall thickness (e.g., about 0.1 to 40 mils). The fluid chamber can have a first fluid chamber wall that can have a gas transmission rate (GTR) for nitrogen gas of less than about 15 $cm^3/m^2 \cdot atm \cdot day$, less than about 10 $m^3/m^2 \cdot atm \cdot day$, less than about 5 $cm^3/m^2 \cdot atm \cdot day$, less than about 1 $cm^3/m^2 \cdot atm \cdot day$ (e.g., from about 0.001 $cm^3/m^2 \cdot atm \cdot day$ to about 1 $cm^3/m^2 \cdot atm \cdot day$, about 0.01 $cm^3/m^2 \cdot atm \cdot day$ to about 1 $cm^3/m^2 \cdot atm \cdot day$ or about 0.1 $cm^3/m^2 \cdot atm \cdot day$ to about 1 $cm^3/m^2 \cdot atm \cdot day$) for an average wall thickness of 20 mils. The fluid chamber can have a first fluid chamber wall having a first fluid chamber wall thickness, where the first fluid chamber wall has a gas transmission rate of 15 $cm^3/m^2 \cdot atm \cdot day$ or less for than nitrogen for an average wall thickness of 20 mils.

An accepted method for measuring the relative permeance, permeability, and diffusion of inflated fluid chambers is ASTM D-1434-82-V. See, e.g., U.S. Pat. No. 6,127,026, which is incorporated by reference as if fully set forth herein. According to ASTM D-1434-82-V, permeance, permeability and diffusion are measured by the following formulae:

(quantity of gas)/[(area)×(time)×(pressure difference)]=permeance(GTR)/(pressure difference)= $cm^3/m^2 \cdot atm \cdot day$(i.e.,24 hours)　　　Permeance

[(quantity of gas)×(film thickness)][(area)×(time)× (pressure difference)]=permeability[(GTR)×(film thickness)]/(pressure difference)=[($cm^3$)(mil)]/ $m^2 \cdot atm \cdot day$(i.e.,24 hours)　　　Permeability (quantity of gas)/[(area)×(time)]=GTR=$cm^3/m^2 \cdot day$ (i.e.,24 hours)　　　Diffusion at one atmosphere In some embodiments, a fluid chamber can comprise a composite element extending across and affixed to at least a portion of the first side of the fluid chamber, to the second side of the fluid chamber, to the sidewall of the fluid chamber, or to any combination thereof; wherein the composite element comprises a textile including a plurality of fibers, the plurality of fibers comprising a first thermoplastic material, and a second thermoplastic material surrounding and the plurality of fibers in the textile and consolidating the textile, the second thermoplastic material having a melting temperature lower than a melting temperature of the first thermoplastic material; and a fluid chamber having a first side, a second side, and a sidewall extending between the first side and the second side, the fluid chamber comprising a third thermoplastic material.

The fluid chamber can include a layered film including at least one polymeric layer or at least two or more polymeric layers. Each of the polymeric layers can be about 0.1 to 40 mils in thickness.

The polymeric layer can be formed of polymer material such as a thermoplastic material. The thermoplastic material can include an elastomeric material, such as a thermoplastic elastomeric material. The thermoplastic materials can include thermoplastic polyurethane (TPU), such as those described herein. The thermoplastic materials can include polyester-based TPU, polyether-based TPU, polycaprolactone-based TPU, polycarbonate-based TPU, polysiloxane-based TPU, or combinations thereof. Non-limiting examples of thermoplastic material that can be used include: "PELLETHANE" 2355-85ATP and 2355-95AE (Dow Chemical Company of Midland, Mich., USA), "ELASTOLLAN" (BASF Corporation, Wyandotte, Mich., USA) and "ESTANE" (Lubrizol, Brecksville, Ohio, USA), all of which are either ester or ether based. Additional thermoplastic material can include those described in U.S. Pat. Nos. 5,713,141; 5,952,065; 6,082,025; 6,127,026; 6,013,340; 6,203,868; and 6,321,465, which are incorporated herein by reference.

The polymeric layer can be formed of one or more of the following: ethylene-vinyl alcohol copolymers (EVOH), poly(vinyl chloride), polyvinylidene polymers and copolymers (e.g., polyvinylidene chloride), polyamides (e.g., amorphous polyamides), acrylonitrile polymers (e.g., acrylonitrile-methyl acrylate copolymers), polyurethane engineering plastics, polymethylpentene resins, ethylene-carbon monoxide copolymers, liquid crystal polymers, polyethylene terephthalate, polyether imides, polyacrylic imides, and other polymeric materials known to have relatively low gas transmission rates. Blends and alloys of these materials as well as with the TPUs described herein and optionally including combinations of polyimides and crystalline polymers, are also suitable. For instance, blends of polyimides and liquid crystal polymers, blends of polyamides and polyethylene terephthalate, and blends of polyamides with styrenics are suitable.

Specific examples of polymeric materials of the polymeric layer can include acrylonitrile copolymers such as "BAREX" resins, available from Ineos (Rolle, Switzerland); polyurethane engineering plastics such as "ISPLAST" ETPU available from Lubrizol (Brecksville, Ohio, USA); ethylene-vinyl alcohol copolymers marketed under the tradenames "EVAL" by Kuraray (Houston, Tex., USA), "SOARNOL" by Nippon Gohsei (Hull, England), and "SELAR OH" by DuPont (Wilmington, Del., USA); polyvinylidene chloride available from S.C. Johnson (Racine, Wis., USA) under the tradename "SARAN", and from Solvay (Brussels, Belgium) under the tradename "IXAN"; liquid crystal polymers such as "VECTRA" from Celanese (Irving, Tex., USA) and "XYDAR" from Solvay; "MDX6" nylon, and amorphous nylons such as "NOVAMID" X21 from Koninklijke DSM N.V (Heerlen, Netherlands), "SELAR PA" from DuPont; polyetherimides sold under the tradename "ULTEM" by SABIC (Riyadh, Saudi Arabia); poly(vinyl alcohol)s; and polymethylpentene resins available from Mitsui Chemicals (Tokyo, Japan) under the tradename "TPX".

Each polymeric layer of the film can be formed of a thermoplastic material which can include a combination of thermoplastic polymers. In addition to one or more thermoplastic polymers, the thermoplastic material can optionally include a colorant, a filler, a processing aid, a free radical scavenger, an ultraviolet light absorber, and the like. Each polymeric layer of the film can be made of a different of thermoplastic material including a different type of thermoplastic polymer.

The fluid chamber can be made by applying heat, pressure and/or vacuum to a film. The fluid chamber (e.g., one or more polymeric layers) can be formed using one or more polymeric materials, and forming the fluid chamber using one or more processing techniques including, for example, extrusion, blow molding, injection molding, vacuum molding, rotary molding, transfer molding, pressure forming, heat sealing, casting, low-pressure casting, spin casting, reaction injection molding, radio frequency (RF) welding, and the like. The fluid chamber can be made by co-extrusion followed by heat sealing or welding to give an inflatable fluid chamber, which can optionally include one or more valves (e.g., one way valves) that allows the fluid chamber to be filled with the fluid (e.g., gas).

Cushioning Structures

In accordance with some aspects, the composite element can be affixed on to a components, e.g., a cushioning structure such as may be incorporate into a sole of an article of footwear.

In various aspects, the present disclosure pertains to a cushioning structure comprising: a first cushioning element; and a composite element affixed to the cushioning element, wherein the composite element comprises a textile including a plurality of fibers, the plurality of fibers comprising a first thermoplastic material; and a second thermoplastic material, wherein the second thermoplastic material has a melting temperature lower than a melting temperature of the first thermoplastic material; wherein, in the composite element, the second thermoplastic material surrounds the plurality of fibers in the textile and consolidates the textile.

In accordance with some aspects, the composite element can be affixed on to a component, e.g., a cushioning structure such as may be incorporated into a sole of an article of footwear. Thus, in various aspects, the present disclosure pertains to a cushioning structure comprising: a first cushioning element; and a composite element affixed to the cushioning element, wherein the composite element comprises a textile including a plurality of fibers, the plurality of fibers comprising a first thermoplastic material; and a second thermoplastic material, wherein the second thermoplastic material has a melting temperature lower than a melting temperature of the first thermoplastic material; wherein, in the composite element, the second thermoplastic material surrounds the plurality of fibers in the textile and consolidates the textile. In some instances, the cushioning element can be a fluid chamber. In other instances, the cushioning element can be a foam component.

Figure 8A:
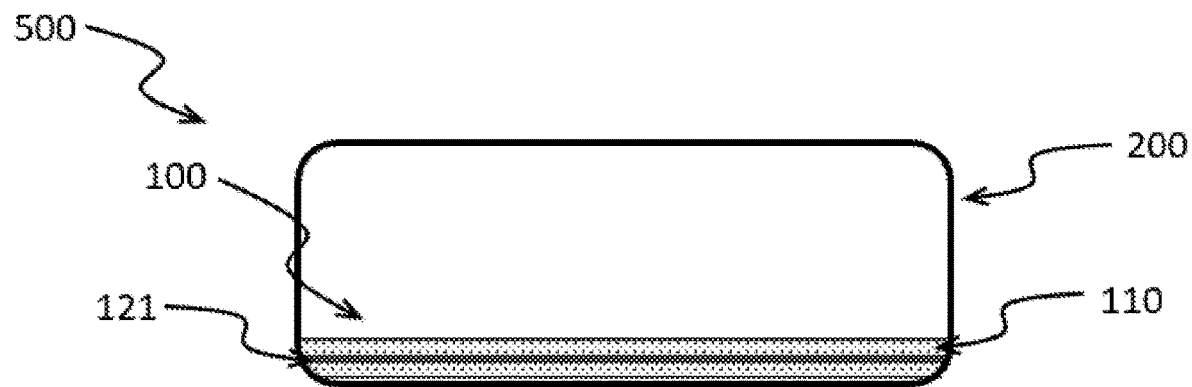
FIGS. 8A-8B are cross-sectional plan views of disclosed cushioning structures comprising a first cushioning element that is a fluid chamber and a disclosed composite element.
Figure 8B:
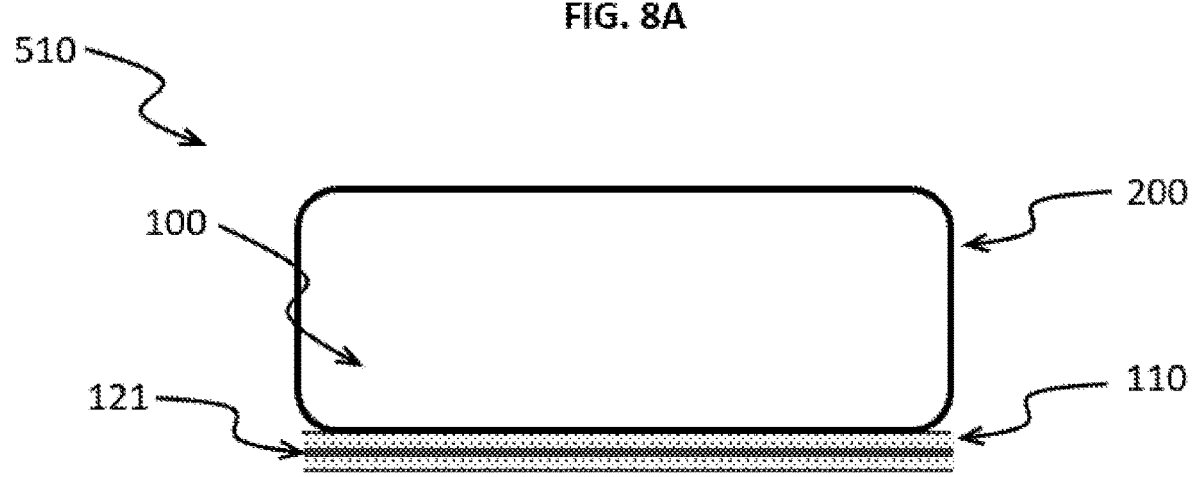

Exemplary cushioning structures are depicted in FIGS. 8A-8B, as cross-sectional plan views of disclosed cushioning structures comprising a first cushioning element that is a fluid chamber and a disclosed composite element. For example, as shown in FIG. 8A, a cushioning structure 500 can comprise a first cushioning element that is a fluid chamber 200 in which the fluid chamber has an internally-facing side and an externally-facing side opposite the internally-facing side, and the composite element 100, comprising a textile 121 including a plurality of fibers, the plurality of fibers comprising a first thermoplastic material; and a second thermoplastic material 110, such that the composite element 100 is affixed to the internally-facing side of the fluid chamber 200. In another instance, as shown in FIG. 8B, a cushioning structure 510 can comprise a first cushioning element that is a fluid chamber 200 in which the fluid chamber has an internally-facing side and an externally-facing side opposite the internally-facing side, and the composite element 100, comprising a textile 121 including a plurality of fibers, the plurality of fibers comprising a first thermoplastic material; and a second thermoplastic material 110, such that the composite element 100 is affixed to the externally-facing side of the fluid chamber 200.

Figure 9A:
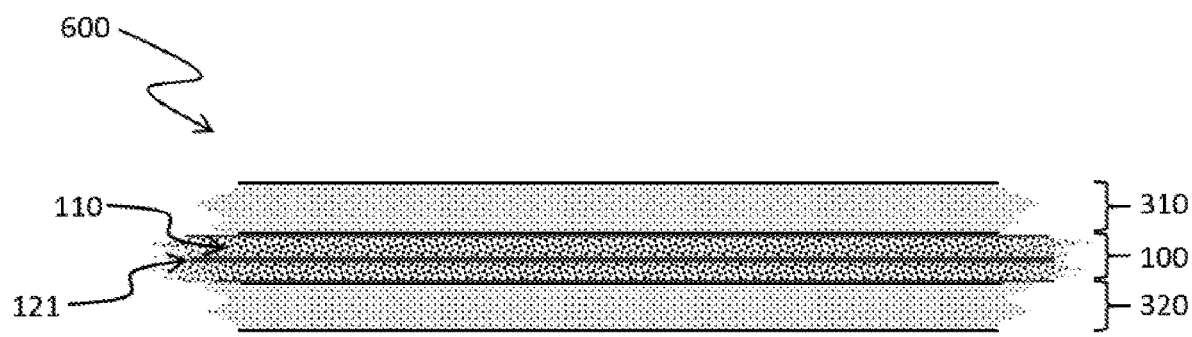
FIGS. 9A-9B are cross-sectional plan views of disclosed cushioning structures comprising a one or more cushioning elements that are foam components and a disclosed composite element.
Figure 9B:
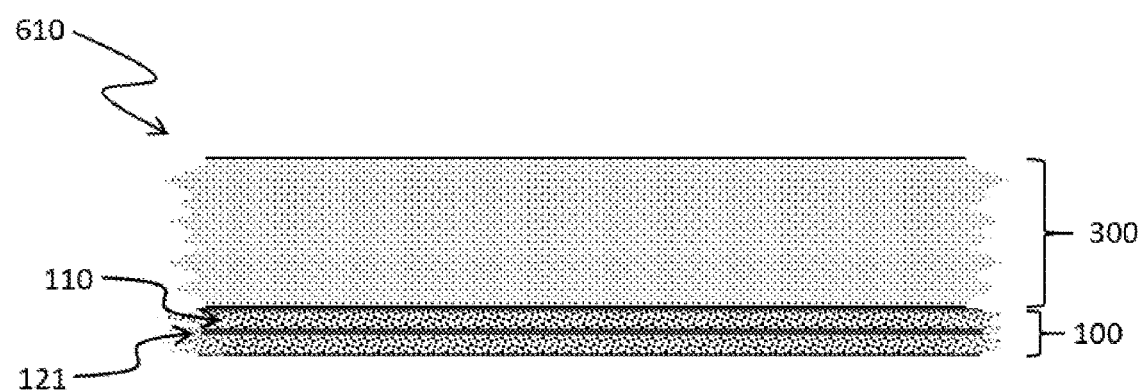

Further exemplary cushioning structures are depicted in FIGS. 9A-9B, as cross-sectional plan views of disclosed cushioning structures comprising a one or more cushioning elements that are foam components and a disclosed composite element. For example, as shown in FIG. 9A, a cushioning structure 600 can comprise a first cushioning element that is a foam component 310 and a second cushioning element that is a foam component 320, in which each of the first cushioning elements 310 and second cushioning elements 320, each being a foam component, have an internally-facing side and an externally-facing side opposite the internally-facing side, and the composite element 100, comprising a textile 121 including a plurality of fibers, the plurality of fibers comprising a first thermoplastic material; and a second thermoplastic material 110, such that the composite element 100 is affixed to the externally-facing side of each of the first cushioning elements 310 and second cushioning elements 320, each being a foam component as shown in FIG. 9A. In another instance, as shown in FIG. 9B, a cushioning structure 610 can comprise a first cushioning element that is a foam component 300 in which the foam component has two externally-facing sides as shown, and the composite element 100, comprising a textile 121 including a plurality of fibers, the plurality of fibers comprising a first thermoplastic material; and a second thermoplastic material 110, such that the composite element 100 is affixed to one of the externally-facing sides of the foam component 300.

The cushioning element can have an internally-facing side and an externally-facing side opposite the internally-facing side, and the composite element can be affixed to the internally-facing side. Alternatively, the cushioning element has an internally-facing side and an externally-facing side opposite the internally-facing side, and the composite element can be affixed to the externally-facing side. In some cases, the externally-facing side of the cushioning structure can further have an outer layer affixed to a side of the composite element opposite the side affixed to the externally-facing side of the cushioning element. The cushioning structure can be a cushioning structure for an article of footwear, such that the internally-facing side is an upper-facing side, the externally-facing side is a ground-facing side, and the outer layer is an outsole layer.

It is to be understood that the cushioning structure as described herein above can further include a second cushioning element, and the composite element is positioned between and affixed to both the first cushioning element and the second cushioning element. In some cases, it may be useful to for the first cushioning element to be a foam component or a fluid chamber, and the second cushioning element is a foam component or a fluid chamber. In specific instances, the first cushioning element can be a foam component, and the second cushioning element can be a fluid chamber. In other specific instances, the first cushioning element can be a fluid chamber, and the second cushioning element can be a foam component.

The cushioning structure described herein can have the first cushioning element as a fluid chamber having a first side, a second side, and a sidewall extending between the first side, wherein the composite element extends across and is affixed to at least a portion of the first side of the fluid chamber, to the second side of the fluid chamber, to the sidewall of the fluid chamber, or to any combination thereof. In some cases, in the first side of the fluid chamber and at least a portion of the sidewall are formed of a first sheet having a third thermoplastic material, the second side of the fluid chamber is formed of a second sheet having a fourth thermoplastic material. It is understood that the cushioning structure herein throughout can utilize any disclosed composite element.

In various aspects, a cushioning structure can be a disclosed fluid. The cushioning structure disclosed herein can be used in a variety of articles. For example, a disclosed cushioning structure can be a cushioning structure for an article of apparel. Other non-limiting examples of a disclosed cushioning structure is a cushioning structure for an article of sporting equipment. In some specific uses, a disclosed cushioning structure can be a sole structure for an article of footwear.

The disclosed cushioning can further have an outsole having a chamber-engaging side and a ground-engaging side, wherein the chamber-engaging side of the outsole covers and is affixed to at least a portion of the ground-facing side of the fluid chamber. It may be useful for the chamber-engaging side of the outsole to be affixed to at least a portion of the sidewall of the fluid chamber. An outsole can include a second composite element between the chamber-engaging side of the outsole and a portion of the ground-facing side of the fluid-filled chamber. In other instances, an outsole can include a second composite element between the chamber-engaging side of the outsole and a portion of the ground-facing side of the fluid-filled chamber. It is understood that a second composite element can be any disclosed composite element. In some instances, a disclosed cushioning can further have a mid-sole having a ground-facing side affixed to the second side of the fluid chamber.

Processes for Manufacturing

The present disclosure provides for a method of manufacturing a composite element, the method comprising: positioning a textile and film adjacent to each other, wherein the textile includes a plurality of fibers, the plurality of fibers comprising a first thermoplastic material; and wherein the film comprises a second thermoplastic material has a melting temperature lower than a melting temperature of the first thermoplastic material; and increasing a temperature of the film to a temperature at or above the melting temperature of the second thermoplastic material but below the melting temperature of the first thermoplastic material, such that the second thermoplastic flows and surrounds the plurality of fibers of the textile and consolidates the textile; and decreasing the temperature of the film to a temperature below the melting temperature of the second thermoplastic material such that the second thermoplastic re-solidifies, forming the composite element.

The present disclosure also provides for a method of forming a fluid chamber, the method comprising: affixing a composite element to a fluid chamber, wherein the fluid chamber has a first side, a second side, and a sidewall extending between the first side and the second side, and the fluid chamber comprises a third thermoplastic material; wherein the composite element extends across and affixed to at least a portion of the first side of the fluid chamber, to the second side of the fluid chamber, to the sidewall of the fluid chamber, or to any combination thereof, and wherein the composite element comprises a textile including a plurality of fibers, the plurality of fibers comprising a first thermoplastic material, and a second thermoplastic material surrounding and the plurality of fibers in the textile and consolidating the textile, the second thermoplastic material having a melting temperature lower than a melting temperature of the first thermoplastic material.

The present disclosure further provides for a method of making a cushioning structure, the method comprising: affixing a composite element to a first cushioning element; wherein the composite element comprises a textile including a plurality of fibers, the plurality of fibers comprising a first thermoplastic material; a second thermoplastic material, wherein the second thermoplastic material has a melting temperature lower than a melting temperature of the first thermoplastic material; and, in the composite element, the second thermoplastic material surrounds the plurality of fibers in the textile and consolidates the textile.

The present disclosure also provides for a method of manufacturing an article, comprising: affixing a first component to a cushioning structure, wherein the cushioning structure is a disclosed cushioning structure.

Thermoplastic Polymeric Materials

Additional details are provided regarding the polymeric materials referenced herein for example, the polymers described in reference to the article, components of the article, structures, layers, films, bladders, foams, primer layer, coating, and like the.

Additional details are provided regarding the polymeric materials referenced herein for example, the polymers described in reference to the article, components of the article, structures, layers, films, bladders, foams, primer layer, coating, and like the. The polymer can be a thermoplastic polymer. The polymer can be an elastomeric polymer such as a thermoplastic elastomeric polymer. The polymer can be selected from: polyurethanes (including thermoplastic polyurethanes (TPUs) and elastomeric TPUs), polyesters, polyethers, polyamides, vinyl polymers (e.g., copolymers of vinyl alcohol, vinyl esters, ethylene, acrylates, methacrylates, styrene, and so on), polyacrylonitriles, polyphenylene ethers, polycarbonates, polyureas, polystyrenes, co-polymers thereof (including polyester-polyurethanes, polyether-polyurethanes, polycarbonate-polyurethanes, polyether block polyamides (PEBAs), and styrene block copolymers), and any combination thereof, as described herein. The polymer can include one or more polymers selected from the group consisting of polyesters, polyethers, polyamides, polyurethanes, polyolefins copolymers of each, and combinations thereof.

The term "polymer" refers to a chemical compound formed of a plurality of repeating structural units referred to as monomers. Polymers often are formed by a polymerization reaction in which the plurality of structural units become covalently bonded together. When the monomer units forming the polymer all have the same chemical structure, the polymer is a homopolymer. When the polymer includes two or more monomer units having different chemical structures, the polymer is a copolymer. One example of a type of copolymer is a terpolymer, which includes three different types of monomer units. The co-polymer can include two or more different monomers randomly distributed in the polymer (e.g., a random co-polymer). Alternatively, one or more blocks containing a plurality of a first type of monomer can be bonded to one or more blocks containing a plurality of a second type of monomer, forming a block copolymer. A single monomer unit can include one or more different chemical functional groups.

Polymers having repeating units which include two or more types of chemical functional groups can be referred to as having two or more segments. For example, a polymer having repeating units of the same chemical structure can be referred to as having repeating segments. Segments are commonly described as being relatively harder or softer based on their chemical structures, and it is common for polymers to include relatively harder segments and relatively softer segments bonded to each other in a single monomeric unit or in different monomeric units. When the polymer includes repeating segments, physical interactions or chemical bonds can be present within the segments or between the segments or both within and between the segments. Examples of segments often referred to as hard segments include segments including a urethane linkage, which can be formed from reacting an isocyanate with a polyol to form a polyurethane. Examples of segments often referred to as soft segments include segments including an alkoxy functional group, such as segments including ether or ester functional groups, and polyester segments. Segments can be referred to on the basis of the name of the functional group present in the segment (e.g., a polyether segment, a polyester segment), as well as based on the name of the chemical structure which was reacted in order to form the segment (e.g., a polyol-derived segment, an isocyanate-derived segment). When referring to segments of a particular functional group or of a particular chemical structure from which the segment was derived, it is understood that the polymer can contain up to 10 mole percent of segments of other functional groups or derived from other chemical structures. For example, as used herein, a polyether segment is understood to include up to 10 mole percent of non-polyether segments.

In aspects, exemplary thermoplastic polymers include homo-polymers and co-polymers. In certain aspects, the thermoplastic polymer can be a random co-polymer. In one aspect, the thermoplastic polymer can be a block co-polymer. The term "polymer" refers to a polymerized molecule having one or more monomer species, and includes homopolymers and copolymers. The term "copolymer" refers to a polymer having two or more monomer species, and includes terpolymers (i.e., copolymers having three monomer species). For example, the thermoplastic polymer can be a block co-polymer having repeating blocks of polymeric units of the same chemical structure (segments) which are relatively harder (hard segments), and repeating blocks of polymeric segments which are relatively softer (soft segments). In various aspects, in block co-polymers, including block co-polymers having repeating hard segments and soft segments, physical crosslinks can be present within the blocks or between the blocks or both within and between the blocks. Particular examples of hard segments include isocyanate segments and polyamide segments. Particular examples of soft segments include polyether segments and polyester segments. As used herein, the polymeric segment can be referred to as being a particular type of polymeric segment such as, for example, an isocyanate segment, a polyamide segment, a polyether segment, a polyester segment, and the like. It is understood that the chemical structure of the segment is derived from the described chemical structure. For example, an isocyanate segment is a polymerized unit including an isocyanate functional group. When referring to a block of polymeric segments of a particular chemical structure, the block can contain up to 10 mol % of segments of other chemical structures. For example, as used herein, a polyether segment is understood to include up to 10 mol % of non-polyether segments.

In general, a thermoplastic polymer softens or melts when heated and returns to a solid state when cooled. The thermoplastic polymer transitions from a solid state to a softened state when its temperature is increased to a temperature at or above its softening temperature, and a liquid state when its temperature is increased to a temperature at or above its melting temperature. When sufficiently cooled, the thermoplastic polymer transitions from the softened or liquid state to the solid state. As such, the thermoplastic polymer may be softened or melted, molded, cooled, re-softened or re-melted, re-molded, and cooled again through multiple cycles. For amorphous thermoplastic polymers, the solid state is understood to be the "rubbery" state above the glass transition temperature of the polymer. The thermoplastic polymer can have a melting temperature from about 90 degrees C. to about 190 degrees C. when determined in accordance with ASTM D3418-97 as described herein below, and includes all subranges therein in increments of 1 degree. The thermoplastic polymer can have a melting temperature from about 93 degrees C. to about 99 degrees C. when determined in accordance with ASTM D3418-97 as described herein below. The thermoplastic polymer can have a melting temperature from about 112 degrees C. to about 118 degrees C. when determined in accordance with ASTM D3418-97 as described herein below.

The glass transition temperature is the temperature at which an amorphous polymer transitions from a relatively brittle "glassy" state to a relatively more flexible "rubbery" state. The thermoplastic polymer can have a glass transition temperature from about −20 degrees C. to about 30 degrees C. when determined in accordance with ASTM D3418-97 as described herein below. The thermoplastic polymer can have a glass transition temperature (from about −13 degree C. to about −7 degrees C. when determined in accordance with ASTM D3418-97 as described herein below. The thermoplastic polymer can have a glass transition temperature from about 17 degrees C. to about 23 degrees C. when determined in accordance with ASTM D3418-97 as described herein below.

The thermoplastic polymer can have a melt flow index from about 10 to about 30 cubic centimeters per 10 minutes ($cm^3/10$ min) when tested in accordance with ASTM D1238-13 as described herein below at 160 degrees C. using a weight of 2.16 kilograms (kg). The thermoplastic polymer can have a melt flow index from about 22 $cm^3/10$ min to about 28 $cm^3/10$ min when tested in accordance with ASTM D1238-13 as described herein below at 160 degrees C. using a weight of 2.16 kg.

The thermoplastic polymer can have a cold Ross flex test result of about 120,000 to about 180,000 cycles without cracking or whitening when tested on a thermoformed plaque of the thermoplastic polymer in accordance with the cold Ross flex test as described herein below. The thermoplastic polymer can have a cold Ross flex test result of about 140,000 to about 160,000 cycles without cracking or whitening when tested on a thermoformed plaque of the thermoplastic polymer in accordance with the cold Ross flex test as described herein below.

The thermoplastic polymer can have a modulus from about 5 megapascals (MPa) to about 100 MPa when determined on a thermoformed plaque in accordance with ASTM D412-98 Standard Test Methods for Vulcanized Rubber and Thermoplastic Rubbers and Thermoplastic Elastomers-Tension with modifications described herein below. The thermoplastic polymer can have a modulus from about 20 MPa to about 80 MPa when determined on a thermoformed plaque in accordance with ASTM D412-98 Standard Test Methods for Vulcanized Rubber and Thermoplastic Rubbers and Thermoplastic Elastomers-Tension with modifications described herein below.

Thermoplastic Polyurethanes

The polymer can be a polyurethane, such as a thermoplastic polyurethane (also referred to as "TPU"). Additionally, polyurethane can be an elastomeric polyurethane such as a thermoplastic elastomeric polyurethane. The elastomeric polyurethane can include hard and soft segments. The hard segments can comprise or consist of urethane segments (e.g., isocyanate-derived segments). The soft segments can comprise or consist of alkoxy segments (e.g., polyol-derived segments including polyether segments, or polyester segments, or a combination of polyether segments and polyester segments). The polyurethane can comprise or consist essentially of an elastomeric polyurethane having repeating hard segments and repeating soft segments.

One or more of the polyurethanes can be produced by polymerizing one or more isocyanates with one or more polyols to produce polymer chains having carbamate linkages (—N(CO)O—) as illustrated below in Formula 1, where the isocyanate(s) each preferably include two or more isocyanate (—NCO) groups per molecule, such as 2, 3, or 4 isocyanate groups per molecule (although, mono-functional isocyanates can also be optionally included, e.g., as chain terminating units).

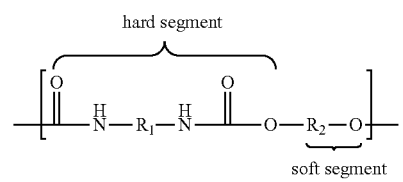

(Formula 1)

Each $R_1$ group and $R_2$ group independently is an aliphatic or aromatic group. Optionally, each $R_2$ can be a relatively hydrophilic group, including a group having one or more hydroxyl groups.

Additionally, the isocyanates can also be chain extended with one or more chain extenders to bridge two or more isocyanates, increasing the length of the hard segment. This can produce polyurethane polymer chains as illustrated below in Formula 2, where $R_3$ includes the chain extender. As with each $R_1$ and $R_3$, each $R_3$ independently is an aliphatic or aromatic functional group.

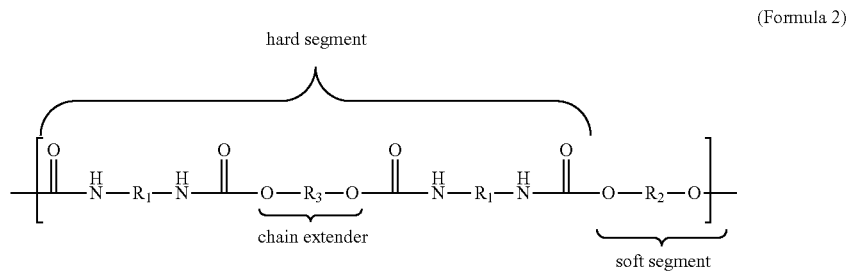

(Formula 2)

Each $R_1$ group in Formulas 1 and 2 can independently include a linear or branched group having from 3 to 30 carbon atoms, based on the particular isocyanate(s) used, and can be aliphatic, aromatic, or include a combination of aliphatic portions(s) and aromatic portion(s). The term "aliphatic" refers to a saturated or unsaturated organic molecule or portion of a molecule that does not include a cyclically conjugated ring system having delocalized pi electrons. In comparison, the term "aromatic" refers to an organic molecule or portion of a molecule having a cyclically conjugated ring system with delocalized pi electrons, which exhibits greater stability than a hypothetical ring system having localized pi electrons.

Each $R_1$ group can be present in an amount of about 5 percent to about 85 percent by weight, from about 5 percent to about 70 percent by weight, or from about 10 percent to about 50 percent by weight, based on the total weight of the reactant compounds or monomers which form the polymer.

In aliphatic embodiments (from aliphatic isocyanate(s)), each $R_1$ group can include a linear aliphatic group, a branched aliphatic group, a cycloaliphatic group, or combinations thereof. For instance, each $R_1$ group can include a linear or branched alkylene group having from 3 to 20 carbon atoms (e.g., an alkylene having from 4 to 15 carbon atoms, or an alkylene having from 6 to 10 carbon atoms), one or more cycloalkylene groups having from 3 to 8 carbon atoms (e.g., cyclopropyl, cyclobutyl, cyclopentyl, cyclohexyl, cycloheptyl, or cyclooctyl), and combinations thereof. The term "alkene" or "alkylene" as used herein refers to a bivalent hydrocarbon. When used in association with the term $C_n$ it means the alkene or alkylene group has "n" carbon atoms. For example, $C_{1-6}$ alkylene refers to an alkylene group having, e.g., 1, 2, 3, 4, 5, or 6 carbon atoms.

Examples of suitable aliphatic diisocyanates for producing the polyurethane polymer chains include hexamethylene diisocyanate (HDI), isophorone diisocyanate (IPDI), butylenediisocyanate (BDI), bisisocyanatocyclohexylmethane (HMDI), 2,2,4-trimethylhexamethylene diisocyanate (TMDI), bisisocyanatomethylcyclohexane, bisisocyanatomethyltricyclodecane, norbornane diisocyanate (NDI), cyclohexane diisocyanate (CHDI), 4,4'-dicyclohexylmethane diisocyanate (H12MD1), diisocyanatododecane, lysine diisocyanate, and combinations thereof.

The isocyanate-derived segments can include segments derived from aliphatic diisocyanate. A majority of the isocyanate-derived segments can comprise segments derived from aliphatic diisocyanates. At least 90% of the isocyanate-derived segments are derived from aliphatic diisocyanates. The isocyanate-derived segments can consist essentially of segments derived from aliphatic diisocyanates. The aliphatic diisocyanate-derived segments can be derived substantially (e.g., about 50 percent or more, about 60 percent or more, about 70 percent or more, about 80 percent or more, about 90 percent or more) from linear aliphatic diisocyanates. At least 80% of the aliphatic diisocyanate-derived segments can be derived from aliphatic diisocyanates that are free of side chains. The segments derived from aliphatic diisocyanates can include linear aliphatic diisocyanates having from 2 to 10 carbon atoms.

When the isocyanate-derived segments are derived from aromatic isocyanate(s)), each $R_1$ group can include one or more aromatic groups, such as phenyl, naphthyl, tetrahydronaphthyl, phenanthrenyl, biphenylenyl, indanyl, indenyl, anthracenyl, and fluorenyl. Unless otherwise indicated, an aromatic group can be an unsubstituted aromatic group or a substituted aromatic group, and can also include heteroaromatic groups. "Heteroaromatic" refers to monocyclic or polycyclic (e.g., fused bicyclic and fused tricyclic) aromatic ring systems, where one to four ring atoms are selected from oxygen, nitrogen, or sulfur, and the remaining ring atoms are carbon, and where the ring system is joined to the remainder of the molecule by any of the ring atoms. Examples of suitable heteroaryl groups include pyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, furanyl, quinolinyl, isoquinolinyl, benzoxazolyl, benzimidazolyl, and benzothiazolyl groups.

Examples of suitable aromatic diisocyanates for producing the polyurethane polymer chains include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4, 4'-diisocyanate (DDDI), 4,4'-dibenzyl diisocyanate (DBDI), 4-chloro-1,3-phenylene diisocyanate, and combinations thereof. The polymer chains can be substantially free of aromatic groups.

The polyurethane polymer chains can be produced from diisocyanates including HMDI, TDI, MDI, $H_{12}$ aliphatics, and combinations thereof. For example, the polyurethane can comprise one or more polyurethane polymer chains produced from diisocyanates including HMDI, TDI, MDI, $H_{12}$ aliphatics, and combinations thereof.

Polyurethane chains which are at least partially crosslinked or which can be crosslinked, can be used in accordance with the present disclosure. It is possible to produce crosslinked or crosslinkable polyurethane chains by reacting multi-functional isocyanates to form the polyurethane. Examples of suitable triisocyanates for producing the polyurethane chains include TDI, HDI, and IPDI adducts with trimethyloylpropane (TMP), uretdiones (i.e., dimerized isocyanates), polymeric MDI, and combinations thereof.

The $R_3$ group in Formula 2 can include a linear or branched group having from 2 to 10 carbon atoms, based on the particular chain extender polyol used, and can be, for example, aliphatic, aromatic, or an ether or polyether. Examples of suitable chain extender polyols for producing the polyurethane include ethylene glycol, lower oligomers of ethylene glycol (e.g., diethylene glycol, triethylene glycol, and tetraethylene glycol), 1,2-propylene glycol, 1,3-propylene glycol, lower oligomers of propylene glycol (e.g., dipropylene glycol, tripropylene glycol, and tetrapropylene glycol), 1,4-butylene glycol, 2,3-butylene glycol, 1,6-hexanediol, 1,8-octanediol, neopentyl glycol, 1,4-cyclohexanedimethanol, 2-ethyl-1,6-hexanediol, 1-methyl-1,3-propanediol, 2-methyl-1,3-propanediol, dihydroxyalkylated aromatic compounds (e.g., bis(2-hydroxyethyl) ethers of hydroquinone and resorcinol, xylene-a,a-diols, bis(2-hydroxyethyl)ethers of xylene-a,a-diols, and combinations thereof.

The $R_2$ group in Formula 1 and 2 can include a polyether group, a polyester group, a polycarbonate group, an aliphatic group, or an aromatic group. Each $R_2$ group can be present in an amount of about 5 percent to about 85 percent by weight, from about 5 percent to about 70 percent by weight, or from about 10 percent to about 50 percent by weight, based on the total weight of the reactant monomers.

At least one $R_2$ group of the polyurethane includes a polyether segment (i.e., a segment having one or more ether groups). Suitable polyether groups include, but are not limited to, polyethylene oxide (PEO), polypropylene oxide (PPO), polytetrahydrofuran (PTHF), polytetramethylene oxide (PTMO), and combinations thereof. The term "alkyl" as used herein refers to straight chained and branched saturated hydrocarbon groups containing one to thirty carbon atoms, for example, one to twenty carbon atoms, or one to ten carbon atoms. When used in association with the term $C_n$ it means the alkyl group has "n" carbon atoms. For example, $C_4$ alkyl refers to an alkyl group that has 4 carbon atoms. $C_{1-7}$ alkyl refers to an alkyl group having a number of carbon atoms encompassing the entire range (i.e., 1 to 7 carbon atoms), as well as all subgroups (e.g., 1-6, 2-7, 1-5, 3-6, 1, 2, 3, 4, 5, 6, and 7 carbon atoms). Non-limiting examples of alkyl groups include, methyl, ethyl, n-propyl, isopropyl, n-butyl, sec-butyl (2-methylpropyl), t-butyl (1,1-dimethylethyl), 3,3-dimethylpentyl, and 2-ethylhexyl. Unless otherwise indicated, an alkyl group can be an unsubstituted alkyl group or a substituted alkyl group.

In some examples of the polyurethane, the at least one $R_2$ group includes a polyester group. The polyester group can be derived from the polyesterification of one or more dihydric alcohols (e.g., ethylene glycol, 1,3-propylene glycol, 1,2-propylene glycol, 1,4-butanediol, 1,3-butanediol, 2-methylpentanediol-1,5,diethylene glycol, 1,5-pentanediol, 1,5-hexanediol, 1,2-dodecanediol, cyclohexanedimethanol, and combinations thereof) with one or more dicarboxylic acids (e.g., adipic acid, succinic acid, sebacic acid, suberic acid, methyladipic acid, glutaric acid, pimelic acid, azelaic acid, thiodipropionic acid and citraconic acid and combinations thereof). The polyester group also can be derived from polycarbonate prepolymers, such as poly(hexamethylene carbonate) glycol, poly(propylene carbonate) glycol, poly(tetramethylene carbonate)glycol, and poly(nonanemethylene carbonate) glycol. Suitable polyesters can include, for example, polyethylene adipate (PEA), poly(1,4-butylene adipate), poly(tetramethylene adipate), poly(hexamethylene adipate), polycaprolactone, polyhexamethylene carbonate, poly(propylene carbonate), poly(tetramethylene carbonate), poly(nonanemethylene carbonate), and combinations thereof.

At least one $R_2$ group can include a polycarbonate group. The polycarbonate group can be derived from the reaction of one or more dihydric alcohols (e.g., ethylene glycol, 1,3-propylene glycol, 1,2-propylene glycol, 1,4-butanediol, 1,3-butanediol, 2-methylpentanediol-1,5, diethylene glycol, 1,5-pentanediol, 1,5-hexanediol, 1,2-dodecanediol, cyclohexanedimethanol, and combinations thereof) with ethylene carbonate.

The aliphatic group can be linear and can include, for example, an alkylene chain having from 1 to 20 carbon atoms or an alkylene chain having from 1 to 20 carbon atoms (e.g., methylene, ethylene, propylene, butylene, pentylene, hexylene, heptylene, octylene, nonylene, decylene, undecylene, dodecylene, tridecylene, ethenylene, propenylene, butenylene, pentenylene, hexenylene, heptenylene, octenylene, nonenylene, decenylene, undecenylene, dodecenylene, tridecenylene). The term "alkene" or "alkylene" refers to a bivalent hydrocarbon. The term "alkylene" refers to a bivalent hydrocarbon molecule or portion of a molecule having at least one double bond.

The aliphatic and aromatic groups can be substituted with one or more pendant relatively hydrophilic and/or charged groups. The pendant hydrophilic group can include one or more (e.g., 2, 3, 4, 5, 6, 7, 8, 9, 10 or more) hydroxyl groups. The pendant hydrophilic group includes one or more (e.g., 2, 3, 4, 5, 6, 7, 8, 9, 10 or more) amino groups. In some cases, the pendant hydrophilic group includes one or more (e.g., 2, 3, 4, 5, 6, 7, 8, 9, 10 or more) carboxylate groups. For example, the aliphatic group can include one or more polyacrylic acid group. In some cases, the pendant hydrophilic group includes one or more (e.g., 2, 3, 4, 5, 6, 7, 8, 9, 10 or more) sulfonate groups. In some cases, the pendant hydrophilic group includes one or more (e.g., 2, 3, 4, 5, 6, 7, 8, 9, 10 or more) phosphate groups. In some examples, the pendant hydrophilic group includes one or more ammonium groups (e.g., tertiary and/or quaternary ammonium). In other examples, the pendant hydrophilic group includes one or more zwitterionic groups (e.g., a betaine, such as poly (carboxybetaine) or "pCB") and ammonium phosphonate groups such as a phosphatidylcholine group).

The $R_2$ group can include charged groups that are capable of binding to a counterion to ionically crosslink the polymer and form ionomers. For example, $R_2$ is an aliphatic or aromatic group having pendant amino, carboxylate, sulfonate, phosphate, ammonium, or zwitterionic groups, or combinations thereof.

When a pendant hydrophilic group is present, the pendant hydrophilic group can be at least one polyether group, such as two polyether groups. In other cases, the pendant hydrophilic group is at least one polyester. The pendant hydrophilic group can be a polylactone group (e.g., polyvinylpyrrolidone). Each carbon atom of the pendant hydrophilic group can optionally be substituted with, e.g., an alkyl group having from 1 to 6 carbon atoms. The aliphatic and aromatic groups can be graft polymeric groups, wherein the pendant groups are homopolymeric groups (e.g., polyether groups, polyester groups, polyvinylpyrrolidone groups).

The pendant hydrophilic group can be a polyether group (e.g., a polyethylene oxide (PEO) group, a polyethylene glycol (PEG) group), a polyvinylpyrrolidone group, a polyacrylic acid group, or combinations thereof.

The pendant hydrophilic group can be bonded to the aliphatic group or aromatic group through a linker. The linker can be any bifunctional small molecule (e.g., one having from 1 to 20 carbon atoms) capable of linking the pendant hydrophilic group to the aliphatic or aromatic group. For example, the linker can include a diisocyanate group, as previously described herein, which when linked to the pendant hydrophilic group and to the aliphatic or aromatic group forms a carbamate bond. The linker can be 4,4'-diphenylmethane diisocyanate (MDI), as shown below.

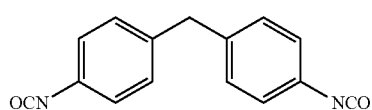

(Formula 3)

The pendant hydrophilic group can be a polyethylene oxide group and the linking group can be MDI, as shown below.

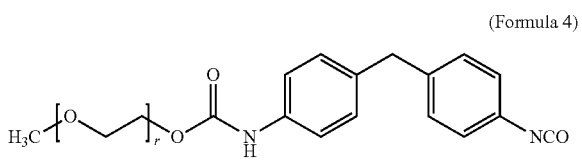

(Formula 4)

The pendant hydrophilic group can be functionalized to enable it to bond to the aliphatic or aromatic group, optionally through the linker. For example, when the pendant hydrophilic group includes an alkene group, which can undergo a Michael addition with a sulfhydryl-containing bifunctional molecule (i.e., a molecule having a second reactive group, such as a hydroxyl group or amino group), resulting in a hydrophilic group that can react with the polymer backbone, optionally through the linker, using the second reactive group. For example, when the pendant hydrophilic group is a polyvinylpyrrolidone group, it can react with the sulfhydryl group on mercaptoethanol to result in hydroxyl-functionalized polyvinylpyrrolidone, as shown below.

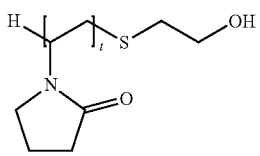

(Formula 5)

At least one $R_2$ group in the polyurethane can include a polytetramethylene oxide group. At least one $R_2$ group of the polyurethane can include an aliphatic polyol group functionalized with a polyethylene oxide group or polyvinylpyrrolidone group, such as the polyols described in E.P. Patent No. 2 462 908, which is hereby incorporated by reference. For example, the $R_2$ group can be derived from the reaction product of a polyol (e.g., pentaerythritol or 2,2,3-trihydroxypropanol) and either MDI-derivatized methoxypolyethylene glycol (to obtain compounds as shown in Formulas 6 or 7) or with MDI-derivatized polyvinylpyrrolidone (to obtain compounds as shown in Formulas 8 or 9) that had been previously been reacted with mercaptoethanol, as shown below.

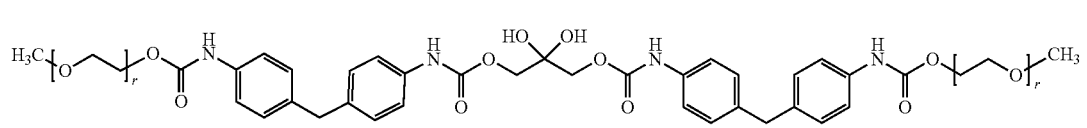

(Formula 6)

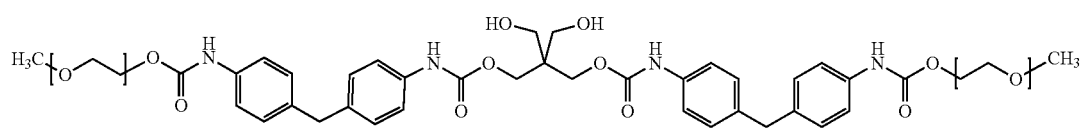

(Formula 7)

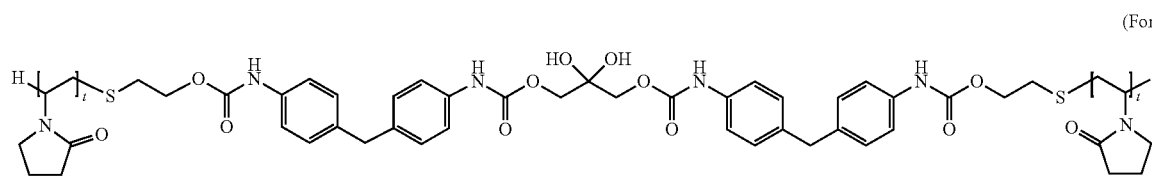

(Formula 8)

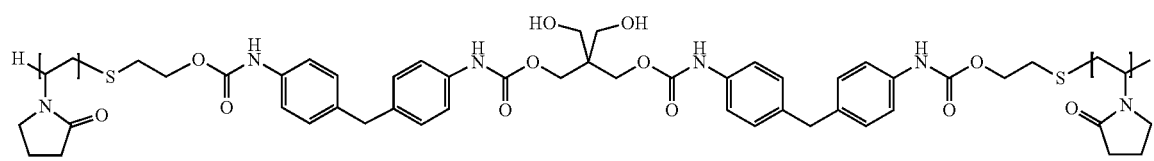

(Formula 9)

At least one $R_2$ of the polyurethane can be a polysiloxane. In these cases, the $R_2$ group can be derived from a silicone monomer of Formula 10, such as a silicone monomer disclosed in U.S. Pat. No. 5,969,076, which is hereby incorporated by reference:

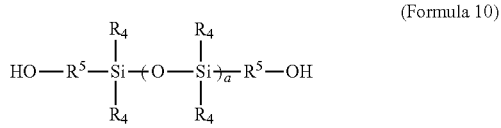
(Formula 10)

wherein: a is 1 to 10 or larger (e.g., 1, 2, 3, 4, 5, 6, 7, 8, 9, or 10); each $R_4$ independently is hydrogen, an alkyl group having from 1 to 18 carbon atoms, an alkenyl group having from 2 to 18 carbon atoms, aryl, or polyether; and each $R_5$ independently is an alkylene group having from 1 to 10 carbon atoms, polyether, or polyurethane.

Each $R_4$ group can independently be a H, an alkyl group having from 1 to 10 carbon atoms, an alkenyl group having from 2 to 10 carbon atoms, an aryl group having from 1 to 6 carbon atoms, polyethylene, polypropylene, or polybutylene group. Each $R_4$ group can independently be selected from the group consisting of methyl, ethyl, n-propyl, iso-propyl, n-butyl, isobutyl, s-butyl, t-butyl, ethenyl, propenyl, phenyl, and polyethylene groups.

Each $R_5$ group can independently include an alkylene group having from 1 to 10 carbon atoms (e.g., a methylene, ethylene, propylene, butylene, pentylene, hexylene, heptylene, octylene, nonylene, or decylene group). Each $R_5$ group can be a polyether group (e.g., a polyethylene, polypropylene, or polybutylene group). Each $R_5$ group can be a polyurethane group.

Optionally, the polyurethane can include an at least partially crosslinked polymeric network that includes polymer chains that are derivatives of polyurethane. The level of crosslinking can be such that the polyurethane retains thermoplastic properties (i.e., the crosslinked thermoplastic polyurethane can be melted and re-solidified under the processing conditions described herein). This crosslinked polymeric network can be produced by polymerizing one or more isocyanates with one or more polyamino compounds, polysulfhydryl compounds, or combinations thereof, as shown in Formulas 11 and 12, below:

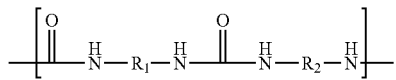
(Formula 11)

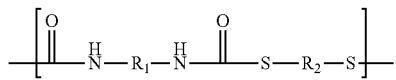
(Formula 12)

wherein the variables are as described above. Additionally, the isocyanates can also be chain extended with one or more polyamino or polythiol chain extenders to bridge two or more isocyanates, such as previously described for the polyurethanes of Formula 2.

The polyurethane chain can be physically crosslinked to another polyurethane chain through e.g., nonpolar or polar interactions between the urethane or carbamate groups of the polymers (the hard segments). The $R_1$ group in Formula 1, and the $R_1$ and $R_3$ groups in Formula 2, form the portion of the polymer often referred to as the "hard segment", and the $R_2$ group forms the portion of the polymer often referred to as the "soft segment". The soft segment is covalently bonded to the hard segment. The polyurethane having physically crosslinked hard and soft segments can be a hydrophilic polyurethane (i.e., a polyurethane, including a thermoplastic polyurethane, including hydrophilic groups as disclosed herein).

The polyurethane can be a thermoplastic polyurethane is composed of MDI, PTMO, and 1,4-butylene glycol, as described in U.S. Pat. No. 4,523,005. Commercially available polyurethanes suitable for the present use include, but are not limited to those under the tradename "SANCURE" (e.g., the "SANCURE" series of polymer such as "SAN-CURE" 20025F) or "TECOPHILIC" (e.g., TG-500, TG-2000, SP-80A-150, SP-93A-100, SP-60D-60) (Lubrizol, Countryside, Ill., USA), "PELLETHANE" 2355-85ATP and 2355-95AE (Dow Chemical Company of Midland, Mich., USA.), "ESTANE" (e.g., ALR G 500, or 58213; Lubrizol, Countryside, Ill., USA).

One or more of the polyurethanes (e.g., those used in the primer as the coating (e.g., water-dispersible polyurethane)) can be produced by polymerizing one or more isocyanates with one or more polyols to produce copolymer chains having carbamate linkages (—N(C═O)O—) and one or more water-dispersible enhancing moieties, where the polymer chain includes one or more water-dispersible enhancing moieties (e.g., a monomer in polymer chain). The water-dispersible polyurethane can also be referred to as "a water-borne polyurethane polymer dispersion." The water-dispersible enhancing moiety can be added to the chain of Formula 1 or 2 (e.g., within the chain and/or onto the chain as a side chain). Inclusion of the water-dispersible enhancing moiety enables the formation of a water-borne polyurethane dispersion. The term "water-borne" herein means the continuous phase of the dispersion or formulation of about 50 weight percent to 100 weight percent water, about 60 weight percent to 100 weight percent water, about 70 weight percent to 100 weight percent water, or about 100 weight percent water. The term "water-borne dispersion" refers to a dispersion of a component (e.g., polymer, cross-linker, and the like) in water without co-solvents. The co-solvent can be used in the water-borne dispersion and the co-solvent can be an organic solvent. Additional detail regarding the polymers, polyurethanes, isocyanates and the polyols are provided below.

The polyurethane (e.g., a water-borne polyurethane polymer dispersion) can include one or more water-dispersible enhancing moieties. The water-dispersible enhancing moiety can have at least one hydrophilic (e.g., poly(ethylene oxide)), ionic or potentially ionic group to assist dispersion of the polyurethane, thereby enhancing the stability of the dispersions. A water-dispersible polyurethane can be formed by incorporating a moiety bearing at least one hydrophilic group or a group that can be made hydrophilic (e.g., by chemical modifications such as neutralization) into the polymer chain. For example, these compounds can be nonionic, anionic, cationic or zwitterionic or the combination thereof. In one example, anionic groups such as carboxylic acid groups can be incorporated into the chain in an inactive form and subsequently activated by a salt-forming compound, such as a tertiary amine. Other water-dispersible enhancing moieties can also be reacted into the backbone through urethane linkages or urea linkages, including lateral or terminal hydrophilic ethylene oxide or ureido units.

The water-dispersible enhancing moiety can be a one that includes carboxyl groups. Water-dispersible enhancing moiety that include a carboxyl group can be formed from hydroxy-carboxylic acids having the general formula $(HO)_x Q(COOH)_y$, where Q can be a straight or branched bivalent hydrocarbon radical containing 1 to 12 carbon atoms, and x and y can each independently be 1 to 3. Illustrative examples include dimethylolpropanoic acid (DMPA), dimethylol butanoic acid (DMBA), citric acid, tartaric acid, glycolic acid, lactic acid, malic acid, dihydroxymalic acid, dihydroxytartaric acid, and the like, and mixtures thereof.

The water-dispersible enhancing moiety can include reactive polymeric polyol components that contain pendant anionic groups that can be polymerized into the backbone to impart water dispersible characteristics to the polyurethane. Anionic functional polymeric polyols can include anionic polyester polyols, anionic polyether polyols, and anionic polycarbonate polyols, where additional detail is provided in U.S. Pat. No. 5,334,690.

The water-dispersible enhancing moiety can include a side chain hydrophilic monomer. For example, the water-dispersible enhancing moiety including the side chain hydrophilic monomer can include alkylene oxide polymers and copolymers in which the alkylene oxide groups have from 2-10 carbon atoms as shown in U.S. Pat. No. 6,897,281. Additional types of water-dispersible enhancing moieties can include thioglycolic acid, 2,6-dihydroxybenzoic acid, sulfoisophthalic acid, polyethylene glycol, and the like, and mixtures thereof. Additional details regarding water-dispersible enhancing moieties can be found in U.S. Pat. No. 7,476,705.

Thermoplastic Polyamides

The polymer can comprise a polyamide, such as a thermoplastic polyamide. The polyamide can be an elastomeric polyamide such as a thermoplastic elastomeric polyamide. The polyamide can be a polyamide homopolymer having repeating polyamide segments of the same chemical structure. Alternatively, the polyamide can comprise a number of polyamide segments having different polyamide chemical structures (e.g., polyamide 6 segments, polyamide 11 segments, polyamide 12 segments, polyamide 66 segments, etc.). The polyamide segments having different chemical structure can be arranged randomly, or can be arranged as repeating blocks.

The polyamide can be a co-polyamide (i.e., a co-polymer including polyamide segments and non-polyamide segments). The polyamide segments of the co-polyamide can comprise or consist of polyamide 6 segments, polyamide 11 segments, polyamide 12 segments, polyamide 66 segments, or any combination thereof. The polyamide segments of the co-polyamide can be arranged randomly, or can be arranged as repeating segments. The polyamide segments can comprise or consist of polyamide 6 segments, or polyamide 12 segments, or both polyamide 6 segment and polyamide 12 segments. In the example where the polyamide segments of the co-polyamide include of polyamide 6 segments and polyamide 12 segments, the segments can be arranged randomly. The non-polyamide segments of the co-polyamide can comprise or consist of polyether segments, polyester segments, or both polyether segments and polyester segments. The co-polyamide can be a co-polyamide, or can be a random co-polyamide. The copolyamide can be formed from the polycondensation of a polyamide oligomer or prepolymer with a second oligomer prepolymer to form a copolyamide (i.e., a co-polymer including polyamide segments. Optionally, the second prepolymer can be a hydrophilic prepolymer.

The polyamide can be a polyamide-containing block co-polymer. For example, the block co-polymer can have repeating hard segments, and repeating soft segments. The hard segments can comprise polyamide segments, and the soft segments can comprise non-polymer segments. The polyamide-containing block co-polymer can be an elastomeric co-polyamide comprising or consisting of polyamide-containing block co-polymers having repeating hard segments and repeating soft segments. In block co-polymers, including block co-polymers having repeating hard segments and soft segments, physical crosslinks can be present within the segments or between the segments or both within and between the segments.

The polyamide itself, or the polyamide segment of the polyamide-containing block co-polymer can be derived from the condensation of polyamide prepolymers, such as lactams, amino acids, and/or diamino compounds with dicarboxylic acids, or activated forms thereof. The resulting polyamide segments include amide linkages (—(CO)NH—). The term "amino acid" refers to a molecule having at least one amino group and at least one carboxyl group. Each polyamide segment of the polyamide can be the same or different.

The polyamide or the polyamide segment of the polyamide-containing block co-polymer can be derived from the polycondensation of lactams and/or amino acids, and can include an amide segment having a structure shown in Formula 13, below, wherein $R_6$ group represents the portion of the polyamide derived from the lactam or amino acid.

(Formula 13)

The $R_6$ group can be derived from a lactam. The $R_6$ group can be derived from a lactam group having from 3 to 20 carbon atoms, or a lactam group having from 4 to 15 carbon atoms, or a lactam group having from 6 to 12 carbon atoms. The $R_6$ group can be derived from caprolactam or lauryl lactam. The $R_6$ group can be derived from one or more amino acids. The $R_6$ group can be derived from an amino acid group having from 4 to 25 carbon atoms, or an amino acid group having from 5 to 20 carbon atoms, or an amino acid group having from 8 to 15 carbon atoms. The $R_6$ group can be derived from 12-aminolauric acid or 11-aminoundecanoic acid.

Optionally, in order to increase the relative degree of hydrophilicity of the polyamide-containing block co-polymer, Formula 13 can include a polyamide-polyether block copolymer segment, as shown below:

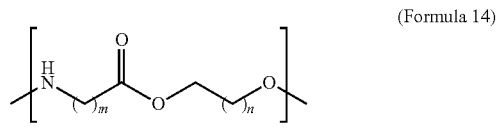

(Formula 14)

wherein m is 3-20, and n is 1-8. Optionally, m is 4-15, or 6-12 (e.g., 6, 7, 8, 9, 10, 11, or 12), and n is 1, 2, or 3. For example, m can be 11 or 12, and n can be 1 or 3. The polyamide or the polyamide segment of the polyamide-containing block co-polymer can be derived from the condensation of diamino compounds with dicarboxylic acids, or activated forms thereof, and can include an amide segment having a structure shown in Formula 15, below, wherein the $R_7$ group represents the portion of the polyamide derived from the diamino compound, and the $R_8$ group represents the portion derived from the dicarboxylic acid compound:

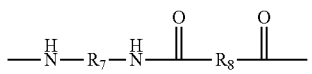

(Formula 15)

The R$_7$ group can be derived from a diamino compound that includes an aliphatic group having from 4 to 15 carbon atoms, or from 5 to 10 carbon atoms, or from 6 to 9 carbon atoms. The diamino compound can include an aromatic group, such as phenyl, naphthyl, xylyl, and tolyl. Suitable diamino compounds from which the R$_7$ group can be derived include, but are not limited to, hexamethylene diamine (HMD), tetramethylene diamine, trimethyl hexamethylene diamine (TMD), m-xylylene diamine (MXD), and 1,5-pentamine diamine. The R$_8$ group can be derived from a dicarboxylic acid or activated form thereof, including an aliphatic group having from 4 to 15 carbon atoms, or from 5 to 12 carbon atoms, or from 6 to 10 carbon atoms. The dicarboxylic acid or activated form thereof from which R$_8$ can be derived includes an aromatic group, such as phenyl, naphthyl, xylyl, and tolyl groups. Suitable carboxylic acids or activated forms thereof from which R$_8$ can be derived include adipic acid, sebacic acid, terephthalic acid, and isophthalic acid. The polyamide chain can be substantially free of aromatic groups.

Each polyamide segment of the polyamide (including the polyamide-containing block co-polymer) can be independently derived from a polyamide prepolymer selected from the group consisting of 12-aminolauric acid, caprolactam, hexamethylene diamine and adipic acid.

The polyamide can comprise or consist essentially of a poly(ether-block-amide). The poly(ether-block-amide) can be formed from the polycondensation of a carboxylic acid terminated polyamide prepolymer and a hydroxyl terminated polyether prepolymer to form a poly(ether-block-amide), as shown in Formula 16:

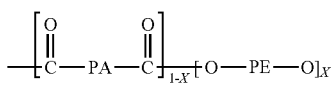

(Formula 16)

The poly(ether block amide) polymer can be prepared by polycondensation of polyamide blocks containing reactive ends with polyether blocks containing reactive ends. Examples include: 1) polyamide blocks containing diamine chain ends with polyoxyalkylene blocks containing carboxylic chain ends; 2) polyamide blocks containing dicarboxylic chain ends with polyoxyalkylene blocks containing diamine chain ends obtained by cyanoethylation and hydrogenation of aliphatic dihydroxylated alpha-omega polyoxyalkylenes known as polyether diols; 3) polyamide blocks containing dicarboxylic chain ends with polyether diols, the products obtained in this particular case being polyetheresteramides. The polyamide block of the poly(ether-block-amide) can be derived from lactams, amino acids, and/or diamino compounds with dicarboxylic acids as previously described. The polyether block can be derived from one or more polyethers selected from the group consisting of polyethylene oxide (PEO), polypropylene oxide (PPO), polytetrahydrofuran (PTHF), polytetramethylene oxide (PTMO), and combinations thereof.

The poly(ether block amide) polymers can include those comprising polyamide blocks comprising dicarboxylic chain ends derived from the condensation of α, ω-aminocarboxylic acids, of lactams or of dicarboxylic acids and diamines in the presence of a chain-limiting dicarboxylic acid. In poly(ether block amide) polymers of this type, a α, ω-aminocarboxylic acid such as aminoundecanoic acid can be used; a lactam such as caprolactam or lauryl lactam can be used; a dicarboxylic acid such as adipic acid, decanedioic acid or dodecanedioic acid can be used; and a diamine such as hexamethylenediamine can be used; or various combinations of any of the foregoing. The copolymer can comprise polyamide blocks comprising polyamide 12 or of polyamide 6.

The poly(ether block amide) polymers can include those comprising polyamide blocks derived from the condensation of one or more α, ω-aminocarboxylic acids and/or of one or more lactams containing from 6 to 12 carbon atoms in the presence of a dicarboxylic acid containing from 4 to 12 carbon atoms, and are of low mass, i.e., they have a number-average molecular weight of from 400 to 1000. In poly(ether block amide) polymers of this type, an α, ω-aminocarboxylic acid such as aminoundecanoic acid or aminododecanoic acid can be used; a dicarboxylic acid such as adipic acid, sebacic acid, isophthalic acid, butanedioic acid, 1,4-cyclohexyldicarboxylic acid, terephthalic acid, the sodium or lithium salt of sulphoisophthalic acid, dimerized fatty acids (these dimerized fatty acids have a dimer content of at least 98 weight percent and are preferably hydrogenated) and dodecanedioic acid HOOC—(CH$_2$)$_{10}$—COOH can be used; and a lactam such as caprolactam and lauryl lactam can be used; or various combinations of any of the foregoing. The copolymer can comprise polyamide blocks obtained by condensation of lauryl lactam in the presence of adipic acid or dodecanedioic acid and with a number average molecular weight of at least 750 have a melting temperature of from about 127 to about 130 degrees C. The various constituents of the polyamide block and their proportion can be chosen in order to obtain a melting point of less than 150 degrees C., or from about 90 degrees C. to about 135 degrees C.

The poly(ether block amide) polymers can include those comprising polyamide blocks derived from the condensation of at least one a, w-aminocarboxylic acid (or a lactam), at least one diamine and at least one dicarboxylic acid. In copolymers of this type, a α,ω-aminocarboxylic acid, the lactam and the dicarboxylic acid can be chosen from those described herein above and the diamine such as an aliphatic diamine containing from 6 to 12 atoms and can be acrylic and/or saturated cyclic such as, but not limited to, hexamethylenediamine, piperazine, 1-aminoethylpiperazine, bisaminopropylpiperazine, tetramethylenediamine, octamethylene-diamine, decamethylenediamine, dodecamethylenediamine, 1,5-diaminohexane, 2,2,4-trimethyl-1,6-diaminohexane, diamine polyols, isophoronediamine (IPD), methylpentamethylenediamine (MPDM), bis(aminocyclohexyl)methane (BACM) and bis(3-methyl-4-aminocyclohexyl)methane (BMACM) can be used.

The polyamide can be a thermoplastic polyamide and the constituents of the polyamide block and their proportion can be chosen in order to obtain a melting temperature of less than 150 degrees C., such as a melting point of from about 90 degrees C. to about 135 degrees C. The various constituents of the thermoplastic polyamide block and their proportion can be chosen in order to obtain a melting point of less than 150 degrees C., such as from about and 90 degrees C. to about 135 degrees C.

The number average molar mass of the polyamide blocks can be from about 300 grams per mole to about 15,000 grams per mole, from about 500 grams per mole to about 10,000 grams per mole, from about 500 grams per mole to about 6,000 grams per mole, from about 500 grams per mole to about 5,000 grams per mole, or from about 600 grams per mole to about 5,000 grams per mole. The number average molecular weight of the polyether block can range from about 100 to about 6,000, from about 400 to about 3000, or from about 200 to about 3,000. The polyether (PE) content (x) of the poly(ether block amide) polymer can be from about 0.05 to about 0.8 (i.e., from about 5 mole percent to about 80 mole percent). The polyether blocks can be present in the polyamide in an amount of from about 10 weight percent to about 50 weight percent, from about 20 weight percent to about 40 weight percent, or from about 30 weight percent to about 40 weight percent. The polyamide blocks can be present in the polyamide in an amount of from about 50 weight percent to about 90 weight percent, from about 60 weight percent to about 80 weight percent, or from about 70 weight percent to about 90 weight percent.

The polyether blocks can contain units other than ethylene oxide units, such as, for example, propylene oxide or polytetrahydrofuran (which leads to polytetramethylene glycol sequences). It is also possible to use simultaneously PEG blocks, i.e., those consisting of ethylene oxide units, polypropylene glycol (PPG) blocks, i.e. those consisting of propylene oxide units, and poly(tetramethylene ether)glycol (PTMG) blocks, i.e. those consisting of tetramethylene glycol units, also known as polytetrahydrofuran. PPG or PTMG blocks are advantageously used. The amount of polyether blocks in these copolymers containing polyamide and polyether blocks can be from about 10 weight percent to about 50 weight percent of the copolymer, or from about 35 weight percent to about 50 weight percent.

The copolymers containing polyamide blocks and polyether blocks can be prepared by any means for attaching the polyamide blocks and the polyether blocks. In practice, two processes are essentially used, one being a 2-step process and the other a one-step process.

In the two-step process, the polyamide blocks having dicarboxylic chain ends are prepared first, and then, in a second step, these polyamide blocks are linked to the polyether blocks. The polyamide blocks having dicarboxylic chain ends are derived from the condensation of polyamide precursors in the presence of a chain-stopper dicarboxylic acid. If the polyamide precursors are only lactams or α,ω-aminocarboxylic acids, a dicarboxylic acid is added. If the precursors already comprise a dicarboxylic acid, this is used in excess with respect to the stoichiometry of the diamines. The reaction usually takes place from about 180 to about 300 degrees C., such as from about 200 degrees to about 290 degrees C., and the pressure in the reactor can be set from about 5 to about 30 bar and maintained for approximately 2 to 3 hours. The pressure in the reactor is slowly reduced to atmospheric pressure and then the excess water is distilled off, for example for one or two hours.

Once the polyamide having carboxylic acid end groups has been prepared, the polyether, the polyol and a catalyst are then added. The total amount of polyether can be divided and added in one or more portions, as can the catalyst. The polyether is added first and the reaction of the OH end groups of the polyether and of the polyol with the COOH end groups of the polyamide starts, with the formation of ester linkages and the elimination of water. Water is removed as much as possible from the reaction mixture by distillation and then the catalyst is introduced in order to complete the linking of the polyamide blocks to the polyether blocks. This second step takes place with stirring, preferably under a vacuum of at least 50 millibar (5000 pascals) at a temperature such that the reactants and the copolymers obtained are in the molten state. By way of example, this temperature can be from about 100 to about 400 degrees C., such as from about 200 to about 250 degrees C. The reaction is monitored by measuring the torque exerted by the polymer melt on the stirrer or by measuring the electric power consumed by the stirrer. The end of the reaction is determined by the value of the torque or of the target power. The catalyst is defined as being any product which promotes the linking of the polyamide blocks to the polyether blocks by esterification. The catalyst can be a derivative of a metal (M) chosen from the group formed by titanium, zirconium and hafnium. The derivative can be prepared from a tetraalkoxides consistent with the general formula $M(OR)_4$, in which M represents titanium, zirconium or hafnium and R, which can be identical or different, represents linear or branched alkyl radicals having from 1 to 24 carbon atoms.

The catalyst can comprise a salt of the metal (M), particularly the salt of (M) and of an organic acid and the complex salts of the oxide of (M) and/or the hydroxide of (M) and an organic acid. The organic acid can be formic acid, acetic acid, propionic acid, butyric acid, valeric acid, caproic acid, caprylic acid, lauric acid, myristic acid, palmitic acid, stearic acid, oleic acid, linoleic acid, linolenic acid, cyclohexanecarboxylic acid, phenylacetic acid, benzoic acid, salicylic acid, oxalic acid, malonic acid, succinic acid, glutaric acid, adipic acid, maleic acid, fumaric acid, phthalic acid or crotonic acid. The organic acid can be an acetic acid or a propionic acid. M can be zirconium and such salts are called zirconyl salts, e.g., the commercially available product sold under the name zirconyl acetate.

The weight proportion of catalyst can vary from about 0.01 to about 5 percent of the weight of the mixture of the dicarboxylic polyamide with the polyetherdiol and the polyol. The weight proportion of catalyst can vary from about 0.05 to about 2 percent of the weight of the mixture of the dicarboxylic polyamide with the polyetherdiol and the polyol.

In the one-step process, the polyamide precursors, the chain stopper and the polyether are blended together; what is then obtained is a polymer having essentially polyether blocks and polyamide blocks of highly variable length, but also the various reactants that have reacted randomly, which are distributed randomly along the polymer chain. They are the same reactants and the same catalyst as in the two-step process described above. If the polyamide precursors are only lactams, it is advantageous to add a little water. The copolymer has essentially the same polyether blocks and the same polyamide blocks, but also a small portion of the various reactants that have reacted randomly, which are distributed randomly along the polymer chain. As in the first step of the two-step process described above, the reactor is closed and heated, with stirring. The pressure established is from about 5 to about 30 bar. When the pressure no longer changes, the reactor is put under reduced pressure while still maintaining vigorous stirring of the molten reactants. The reaction is monitored as previously in the case of the two-step process.

The proper ratio of polyamide to polyether blocks can be found in a single poly(ether block amide), or a blend of two or more different composition poly(ether block amide)s can be used with the proper average composition. It can be useful to blend a block copolymer having a high level of polyamide groups with a block copolymer having a higher level of polyether blocks, to produce a blend having an average level of polyether blocks of about 20 to about 40 weight percent of the total blend of poly(amid-block-ether) copolymers, or about 30 to about 35 weight percent. The copolymer can comprise a blend of two different poly(ether-block-amide)s comprising at least one block copolymer having a level of polyether blocks below 35 weight percent, and a second poly(ether-block-amide) having at least 45 weight percent of polyether blocks.

Exemplary commercially available copolymers include, but are not limited to, those available under the tradenames of "VESTAMID" (Evonik Industries, Essen, Germany); "PLATAMID" (Arkema, Colombes, France), e.g., product code H2694; "PEBAX" (Arkema), e.g., product code "PEBAX MH1657" and "PEBAX MV1074"; "PEBAX RNEW" (Arkema); "GRILAMID" (EMS-Chemie AG, Domat-Ems, Switzerland), or also to other similar materials produced by various other suppliers.

The polyamide can be physically crosslinked through, e.g., nonpolar or polar interactions between the polyamide groups of the polymers. In examples where the polyamide is a copolyamide, the copolyamide can be physically crosslinked through interactions between the polyamide groups, and optionally by interactions between the copolymer groups. When the co-polyamide is physically crosslinked thorough interactions between the polyamide groups, the polyamide segments can form the portion of the polymer referred to as the hard segment, and copolymer segments can form the portion of the polymer referred to as the soft segment. For example, when the copolyamide is a poly (ether-block-amide), the polyamide segments form the hard segments of the polymer, and polyether segments form the soft segments of the polymer. Therefore, in some examples, the polymer can include a physically crosslinked polymeric network having one or more polymer chains with amide linkages.

The polyamide segment of the co-polyamide can include polyamide-11 or polyamide-12 and the polyether segment can be a segment selected from the group consisting of polyethylene oxide, polypropylene oxide, and polytetramethylene oxide segments, and combinations thereof.

The polyamide can be partially or fully covalently crosslinked, as previously described herein. In some cases, the degree of crosslinking present in the polyamide is such that, when it is thermally processed, e.g., in the form of a yarn or fiber to form the articles of the present disclosure, the partially covalently crosslinked thermoplastic polyamide retains sufficient thermoplastic character that the partially covalently crosslinked thermoplastic polyamide is melted during the processing and re-solidifies.
Thermoplastic Polyesters The polymers can comprise a polyester. The polyester can comprise a thermoplastic polyester. Additionally, the polyester can be an elastomeric polyester such as a thermoplastic polyester. The polyester can be formed by reaction of one or more carboxylic acids, or its ester-forming derivatives, with one or more bivalent or multivalent aliphatic, alicyclic, aromatic or araliphatic alcohols or a bisphenol. The polyester can be a polyester homopolymer having repeating polyester segments of the same chemical structure. Alternatively, the polyester can comprise a number of polyester segments having different polyester chemical structures (e.g., polyglycolic acid segments, polylactic acid segments, polycaprolactone segments, polyhydroxyalkanoate segments, polyhydroxybutyrate segments, etc.). The polyester segments having different chemical structure can be arranged randomly, or can be arranged as repeating blocks.

Exemplary carboxylic acids that can be used to prepare a polyester include, but are not limited to, adipic acid, pimelic acid, suberic acid, azelaic acid, sebacic acid, nonane dicarboxylic acid, decane dicarboxylic acid, undecane dicarboxylic acid, terephthalic acid, isophthalic acid, alkyl-substituted or halogenated terephthalic acid, alkyl-substituted or halogenated isophthalic acid, nitro-terephthalic acid, 4,4'-diphenyl ether dicarboxylic acid, 4,4'-diphenyl thioether dicarboxylic acid, 4,4'-diphenyl sulfone-dicarboxylic acid, 4,4'-diphenyl alkylenedicarboxylic acid, naphthalene-2,6-dicarboxylic acid, cyclohexane-1,4-dicarboxylic acid and cyclohexane-1,3-dicarboxylic acid. Exemplary diols or phenols suitable for the preparation of the polyester include, but are not limited to, ethylene glycol, diethylene glycol, 1,3-propanediol, 1,4-butanediol, 1,6-hexanediol, 1,8-octanediol, 1,10-decanediol, 1,2-propanediol, 2,2-dimethyl-1,3-propanediol, 2,2,4-trimethylhexanediol, p-xylenediol, 1,4-cyclohexanediol, 1,4-cyclohexane dimethanol, and bis-phenol A.

The polyester can be a polybutylene terephthalate (PBT), a polytrimethylene terephthalate, a polyhexamethylene terephthalate, a poly-1,4-dimethylcyclohexane terephthalate, a polyethylene terephthalate (PET), a polyethylene isophthalate (PEI), a polyarylate (PAR), a polybutylene naphthalate (PBN), a liquid crystal polyester, or a blend or mixture of two or more of the foregoing.

The polyester can be a co-polyester (i.e., a co-polymer including polyester segments and non-polyester segments). The co-polyester can be an aliphatic co-polyester (i.e., a co-polyester in which both the polyester segments and the non-polyester segments are aliphatic). Alternatively, the co-polyester can include aromatic segments. The polyester segments of the co-polyester can comprise or consist essentially of polyglycolic acid segments, polylactic acid segments, polycaprolactone segments, polyhydroxyalkanoate segments, polyhydroxybutyrate segments, or any combination thereof. The polyester segments of the co-polyester can be arranged randomly, or can be arranged as repeating blocks.

For example, the polyester can be a block co-polyester having repeating blocks of polymeric units of the same chemical structure which are relatively harder (hard segments), and repeating blocks of the same chemical structure which are relatively softer (soft segments). In block co-polyesters, including block co-polyesters having repeating hard segments and soft segments, physical crosslinks can be present within the blocks or between the blocks or both within and between the blocks. The polymer can comprise or consist essentially of an elastomeric co-polyester having repeating blocks of hard segments and repeating blocks of soft segments.

The non-polyester segments of the co-polyester can comprise or consist essentially of polyether segments, polyamide segments, or both polyether segments and polyamide segments. The co-polyester can be a block co-polyester, or can be a random co-polyester. The co-polyester can be formed from the polycodensation of a polyester oligomer or prepolymer with a second oligomer prepolymer to form a block copolyester. Optionally, the second prepolymer can be a hydrophilic prepolymer. For example, the co-polyester can be formed from the polycondensation of terephthalic acid or naphthalene dicarboxylic acid with ethylene glycol, 1,4-butanediol, or 1-3 propanediol. Examples of co-polyesters include polyethylene adipate, polybutylene succinate, poly (3-hydroxbutyrate-co-3-hydroxyvalerate), polyethylene terephthalate, polybutylene terephthalate, polytrimethylene terephthalate, polyethylene naphthalate, and combinations thereof. The co-polyamide can comprise or consist of polyethylene terephthalate.

The polyester can be a block copolymer comprising segments of one or more of polybutylene terephthalate (PBT), a polytrimethylene terephthalate, a polyhexamethylene terephthalate, a poly-1,4-dimethylcyclohexane terephthalate, a polyethylene terephthalate (PET), a polyethylene isophthalate (PEI), a polyarylate (PAR), a polybutylene naphthalate (PBN), and a liquid crystal polyester. For example, a suitable polyester that is a block copolymer can be a PET/PEI copolymer, a polybutylene terephthalate/tetraethylene glycol copolymer, a polyoxyalkylenediimide diacid/polybutylene terephthalate copolymer, or a blend or mixture of any of the foregoing.

The polyester can be a biodegradable resin, for example, a copolymerized polyester in which poly($\alpha$-hydroxy acid) such as polyglycolic acid or polylactic acid is contained as principal repeating units.

The disclosed polyesters can be prepared by a variety of polycondensation methods known to the skilled artisan, such as a solvent polymerization or a melt polymerization process.

Thermoplastic Polyolefins

The polymers can comprise or consist essentially of a polyolefin. The polyolefin can be a thermoplastic polyolefin. Additionally, the polyolefin can be an elastomeric polyolefin such as a thermoplastic elastomeric polyolefin. Exemplary polyolefins can include polyethylene, polypropylene, and olefin elastomers (e.g., metallocene-catalyzed block copolymers of ethylene and $\alpha$-olefins having 4 to about 8 carbon atoms). The polyolefin can be a polymer comprising a polyethylene, an ethylene-$\alpha$-olefin copolymer, an ethylene-propylene rubber (EPDM), a polybutene, a polyisobutylene, a poly-4-methylpent-1-ene, a polyisoprene, a polybutadiene, an ethylene-methacrylic acid copolymer, and an olefin elastomer such as a dynamically cross-linked polymer obtained from polypropylene (PP) and an ethylene-propylene rubber (EPDM), and blends or mixtures of the foregoing. Further exemplary polyolefins include polymers of cycloolefins such as cyclopentene or norbornene.

It is to be understood that polyethylene, which optionally can be crosslinked, is inclusive a variety of polyethylenes, including low density polyethylene (LDPE), linear low density polyethylene (LLDPE), (VLDPE) and (ULDPE), medium density polyethylene (MDPE), high density polyethylene (HDPE), high density and high molecular weight polyethylene (HDPE-HMW), high density and ultrahigh molecular weight polyethylene (HDPE-UHMW), and blends or mixtures of any the foregoing polyethylenes. A polyethylene can also be a polyethylene copolymer derived from monomers of monoolefins and diolefins copolymerized with a vinyl, acrylic acid, methacrylic acid, ethyl acrylate, vinyl alcohol, and/or vinyl acetate. Polyolefin copolymers comprising vinyl acetate-derived units can be a high vinyl acetate content copolymer, e.g., greater than about 50 weight percent vinyl acetate-derived composition.

The polyolefin can be formed through free radical, cationic, and/or anionic polymerization by methods well known to those skilled in the art (e.g., using a peroxide initiator, heat, and/or light). The disclosed polyolefin can be prepared by radical polymerization under high pressure and at elevated temperature. Alternatively, the polyolefin can be prepared by catalytic polymerization using a catalyst that normally contains one or more metals from group IVb, Vb, VIb or VIII metals. The catalyst usually has one or more than one ligand, typically oxides, halides, alcoholates, esters, ethers, amines, alkyls, alkenyls and/or aryls that can be either p- or s-coordinated complexed with the group IVb, Vb, VIb or VIII metal. The metal complexes can be in the free form or fixed on substrates, typically on activated magnesium chloride, titanium(III) chloride, alumina or silicon oxide. The metal catalysts can be soluble or insoluble in the polymerization medium. The catalysts can be used by themselves in the polymerization or further activators can be used, typically a group Ia, IIa and/or IIIa metal alkyls, metal hydrides, metal alkyl halides, metal alkyl oxides or metal alkyloxanes. The activators can be modified conveniently with further ester, ether, amine or silyl ether groups.

Suitable polyolefins can be prepared by polymerization of monomers of monoolefins and diolefins as described herein. Exemplary monomers that can be used to prepare the polyolefin include, but are not limited to, ethylene, propylene, 1-butene, 1-pentene, 1-hexene, 2-methyl-1-propene, 3-methyl-1-pentene, 4-methyl-1-pentene, 5-methyl-1-hexene and mixtures thereof.

Suitable ethylene-$\alpha$-olefin copolymers can be obtained by copolymerization of ethylene with an $\alpha$-olefin such as propylene, butene-1, hexene-1, octene-1,4-methyl-1-pentene or the like having carbon numbers of 3 to 12.

Suitable dynamically cross-linked polymers can be obtained by cross-linking a rubber component as a soft segment while at the same time physically dispersing a hard segment such as PP and a soft segment such as EPDM by using a kneading machine such as a Banbury mixer and a biaxial extruder.

The polyolefin can be a mixture of polyolefins, such as a mixture of two or more polyolefins disclosed herein above. For example, a suitable mixture of polyolefins can be a mixture of polypropylene with polyisobutylene, polypropylene with polyethylene (for example PP/HDPE, PP/LDPE) or mixtures of different types of polyethylene (for example LDPE/HDPE).

The polyolefin can be a copolymer of suitable monoolefins monomers or a copolymer of a suitable monoolefins monomer and a vinyl monomer. Exemplary polyolefin copolymers include ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

The polyolefin can be a polypropylene homopolymer, a polypropylene copolymers, a polypropylene random copolymer, a polypropylene block copolymer, a polyethylene homopolymer, a polyethylene random copolymer, a polyethylene block copolymer, a low density polyethylene (LDPE), a linear low density polyethylene (LLDPE), a medium density polyethylene, a high density polyethylene (HDPE), or blends or mixtures of one or more of the preceding polymers.

The polyolefin can be a polypropylene. The term "polypropylene," as used herein, is intended to encompass any polymeric composition comprising propylene monomers, either alone or in mixture or copolymer with other randomly selected and oriented polyolefins, dienes, or other monomers (such as ethylene, butylene, and the like). Such a term also encompasses any different configuration and arrangement of the constituent monomers (such as atactic, syndiotactic, isotactic, and the like). Thus, the term as applied to fibers is intended to encompass actual long strands, tapes, threads, and the like, of drawn polymer. The polypropylene can be of any standard melt flow (by testing); however, standard fiber grade polypropylene resins possess ranges of Melt Flow Indices between about 1 and 1000.

The polyolefin can be a polyethylene. The term "polyethylene," as used herein, is intended to encompass any polymeric composition comprising ethylene monomers, either alone or in mixture or copolymer with other randomly selected and oriented polyolefins, dienes, or other monomers (such as propylene, butylene, and the like). Such a term also encompasses any different configuration and arrangement of the constituent monomers (such as atactic, syndiotactic, isotactic, and the like). Thus, the term as applied to fibers is intended to encompass actual long strands, tapes, threads, and the like, of drawn polymer. The polyethylene can be of any standard melt flow (by testing); however, standard fiber grade polyethylene resins possess ranges of Melt Flow Indices between about 1 and 1000.

The thermoplastic can further comprise one or more processing aids. The processing aid can be a non-polymeric material. These processing aids can be independently selected from the group including, but not limited to, curing agents, initiators, plasticizers, mold release agents, lubricants, antioxidants, flame retardants, dyes, pigments, reinforcing and non-reinforcing fillers, fiber reinforcements, and light stabilizers.

Thermoplastic Additives

In some aspects, a disclosed thermoplastic polymer or a disclosed fiber, filament, yarn, film, sheet or textile comprising a thermoplastic polymer can further comprise an additive. The additive can be incorporated directly into a fiber, filament, yarn, film, sheet or textile or alternatively, applied thereto. In addition, an additive can be incorporated into a polymer melt prior to extrusion, forming a sheet or film, and polymer blends. Additives that can be used in the disclosed thermoplastic polymers, fibers, filaments, yarns, or fabrics include, but are not limited to, dyes, pigments, colorants, ultraviolet light absorbers, hindered amine light stabilizers, antioxidants, processing aids or agents, plasticizers, lubricants, emulsifiers, pigments, dyes, optical brighteners, rheology additives, catalysts, flow-control agents, slip agents, crosslinking agents, crosslinking boosters, halogen scavengers, smoke inhibitors, flame-proofing agents, antistatic agents, fillers, or mixtures of two or more of the foregoing. When used, an additive can be present in an amount of from about 0.01 wt % to about 10 wt %, about 0.025 wt % to about 5 wt %, or about 0.1 wt % to 3 wt %, where the wt % is based upon the sum of the material components in the thermoplastic composition, fiber, filament, yarn, or fabric.

Individual components can be mixed together with the other components of the thermoplastic composition in a continuous mixer or a batch mixer, e.g., in an intermeshing rotor mixer, such as an Intermix mixer, a twin screw extruder, in a tangential rotor mixer such as a Banbury mixer, using a two-roll mill, or some combinations of these to make a composition comprising a thermoplastic polymer and an additive. The mixer can blend the components together via a single step or multiple steps, and can mix the components via dispersive mixing or distributive mixing to form the resulting thermoplastic composition. This step is often referred to as "compounding."

In some aspects, the additive is an antioxidant such as ascorbic acid, an alkylated monophenol, an alkylthiomethylphenol, a hydroquinone or alkylated hydroquinone, a tocopherol, a hydroxylated thiodiphenyl ether, an alkylidene bisphenol, a benzyl compound, a hydroxylated malonate, an aromatic hydroxybenzl compound, a triazine compound, a benzylphosphonate, an acylaminophenol, an ester of β-(3, 5-di-tert-butyl-4-hydroxyphenyl)propionic acid with mono- or polyhydric alcohols, an ester of β-(5-tert-butyl-4-hydroxy-3-methylphenyl)propionic acid with mono- or polyhydric alcohols, an ester of β-(3,5-dicyclohexyl-4-hydroxyphenyl)propionic acid with mono- or polyhydric alcohols, an ester of 3,5-di-tert-butyl-4-hydroxyphenyl acetic acid with mono- or polyhydric alcohols, an amide of β-(3,5-di-tert-butyl-4-hydromhenyl)propionic acid, an aminic antioxidant, or mixtures of two or more of the foregoing.

Exemplary alkylated monophenols include, but are not limited to, 2,6-di-tert-butyl-4-methylphenol, 2-tert-butyl-4, 6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-ethylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1-methylundec-1-yl)phenol, 2,4-dimethyl-6-(1-methylheptadec-1-yl)phenol, 2,4-dimethyl-6-(1-methyltridec-1-yl)phenol, and mixtures of two or more of the foregoing.

Exemplary alkylthiomethylphenols include, but are not limited to, 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol, and mixtures of two or more of the foregoing.

Exemplary hydroquinones and alkylated hydroquinones include, but are not limited to, 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl)adipate, and mixtures of two or more of the foregoing.

Exemplary tocopherols include, but are not limited to, α-tocopherol, p-tocopherol, 7-tocopherol, 6-tocopherol, and mixtures of two or more of the foregoing.

Exemplary hydroxylated thiodiphenyl ethers include, but are not limited to, 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide, and mixtures of two or more of the foregoing.

Exemplary alkylidene bisphenols include, but are not limited to, 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4- nonylphenol], 2.2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3-tert-butyl-4-hydroxyphenyl)butyrate], bis(3-tert-butyl-4-hydroxy-5-methyl-phenyl)dicyclopentadiene, bis[2-(3tert-butyl-2-hydroxy-5-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane, and mixtures of two or more of the foregoing.

Exemplary benzyl compounds include, but are not limited to, 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, 1,3,5-tri-(3,5-di-tert-butyl-4-hydroxybenzyl)-2,4,6-tri methyl benzene, di-(3,5-di-tert-butyl-4-hydroxybenzyl)sulfide, 3,5-di-tert-butyl-4-hydroxybenzyl-mercapto-acetic acid isooctyl ester, bis-(4-tert-butyl-3-hydroxy-2,6-dimethylbenzyl)dithiol terephthalate, 1,3,5-tris-(3,5-di-tert-butyl-4-hydroxybenzyl) isocyanurate, 1,3,5-tris-(4-tert-butyl-3-hydroxy-2,6-dimethylbenzyl)isocyanurate, 3,5-di-tert-butyl-4-hydroxybenzyl-phosphoric acid dioctadecyl ester and 3,5-di-tert-butyl-4-hydroxybenzyl-phosphoric acid monoethyl ester, and mixtures of two or more of the foregoing.

Exemplary hydroxybenzylated malonates include, but are not limited to, dioctadecyl-2,2-bis-(3,5-di-tert-butyl-2-hydroxybenzyl)-malonate, di-octadecyl-2-(3-tert-butyl-4-hydroxy-5-ethylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate, and mixtures of two or more of the foregoing.

Exemplary aromatic hydroxybenzl compounds include, but are not limited to, 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol, and mixtures of two or more of the foregoing.

Exemplary triazine compounds include, but are not limited to, 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris-(3,5-di-tert-butyl-4-hydroxy-benzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxy-phenylpropionyl)-hexahydro-1.3,5-triazine, 1,3,5-tris(3,5-dicyclohexyl-4-hydroxybenzyl) isocyanurate, and mixtures of two or more of the foregoing.

Exemplary benzylphosphonates include, but are not limited to, dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid, and mixtures of two or more of the foregoing.

Exemplary acylaminophenols include, but are not limited to, 4-hydroxy-lauric acid anilide, 4-hydroxy-stearic acid anilide, 2,4-bis-octylmercapto-6-(3,5-tert-butyl-4-hydroxyanilino)-s-triazine and octyl-N-(3,5-di-tert-butyl-4-hydroxyphenyl)-carbamate, and mixtures of two or more of the foregoing.

Exemplary esters of β-(3,5-di-tert-butyl-4-hydroxyphenyl)propionic acid, include, but are not limited to esters with a mono- or polyhydric alcohol such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and mixtures of esters derived from two or more of the foregoing mono- or polyhydric alcohols.

Exemplary esters of β-(5-tert-butyl-4-hydroxy-3-methylphenyl)propionic acid, include, but are not limited to esters with a mono- or polyhydric alcohol such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and mixtures of esters derived from two or more of the foregoing mono- or polyhydric alcohols.

Exemplary esters of β-(3,5-dicyclohexyl-4-hydroxyphenyl)propionic acid, include, but are not limited to esters with a mono- or polyhydric alcohol such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and mixtures of esters derived from two or more of the foregoing mono- or polyhydric alcohols.

Exemplary esters of 3,5-di-tert-butyl-4-hydroxyphenyl acetic acid, include, but are not limited to esters with a mono- or polyhydric alcohol such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and mixtures of esters derived from two or more of the foregoing mono- or polyhydric alcohols.

Exemplary amides of β-(3,5-di-tert-butyl-4-hydromhenyl)propionic acid, include, but are not limited to, N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N, N'-bis(3,5-di-tert-butyl-4-hydroxyphenylpropionyl)hydrazide, N, N'-bis[2-(3-[3,5-di-tert-butyl-4-hydroxyphenyl]propionyloxy)ethyl]oxamide, and mixtures of two or more of the foregoing.

Exemplary aminic antioxidants include, but are not limited to, N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyl-diphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine. phenothiazine, a mixture of mono- and dialkylated tert-butyl/tert-octylphenothiazines, a mixture of mono- and dialkylated tert-octyl-phenothiazines, N-allylphenothiazin, N,N,N',N'-tetraphenyl-1,4-diaminobut-2-ene, N,N-bis-(2,2,6,6-tetramethyl-piperid-4-yl-hexamethylenediamine, bis(2,2,6,6-tetramethylpiperid-4-yl)-sebacate, 2,2,6,6-tetramethylpiperidin-4-one, 2,2,6,6-tetramethylpiperidin-4-ol, and mixtures of two or more of the foregoing.

In some aspects, the additive is a UV absorber and/or light stabilizer, including, but limited to, a 2-(2-hydroxyphenyl)-2H-benzotriazole compound, a 2-hydroxybenzophenone compound, an ester of a substituted and unsubstituted benzoic acid, an acrylate or malonate compound, a sterically hindered amine stabilizer compound, an oxamide compound, a tris-aryl-o-hydroxyphenyl-s-triazine compound, or mixtures of two or more of the foregoing.

Exemplary 2-(2-hydroxyphenyl)-2H-benzotriazole compounds include, but are not limited to, 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-a-cumyl-2-hydroxyphenyl)-2H-benzotriazole, 2-(3-t-butyl-2-hydroxy-5-(2-(ω)-hydroxy-octa-(ethyleneoxy)carbonylethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl) phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-α-cumyl-phenyl)-2H-benzotriazole. 5-chloro-2-(2-hydroxy-3,5-di-α-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxyhydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5-di-t-butylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole and 5-phenylsulfonyl-2-(2-hydroxy-3,5-di-t-butylphenyl)-2H-benzotriazole, and mixtures of two or more of the foregoing.

Exemplary 2-hydroxybenzophenone compounds include, but are not limited to, 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives of 2-hydroxybenzophenone, and mixtures of two or more such derivatives.

Exemplary esters of a substituted and unsubstituted benzoic acid include, but are not limited to, 4-tertbutyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate, and mixtures of two or more of the foregoing.

Exemplary an acrylate or malonate compounds include, but are not limited to, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxycinnamic acid methyl ester, N-(β-carbomethoxy-β-cyanovinyl)-2-methyl-indoline, dimethyl p-methoxybenzylidenemalonate, di-(1,2,2,6,6-pentamethylpiperidin-4-yl)p-methoxybenzylidenemalonate, and mixtures of two or more of the foregoing.

Exemplary sterically hindered amine stabilizer compounds include, but are not limited to, 4-hydroxy-2,2,6,6-tetramethylpiperidine, 1-allyl-4-hydroxy-2,2,6,6-tetramethylpiperidine, 1-benzyl-4-hydroxy-2,2,6,6-tetramethylpiperidine, bis(2,2,6,6-tetramethyl-4-piperidyl) sebacate, bis(2,2,6,6-tetramethyl-4-piperidyl)succinate, bis (1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, tris(2,2,6,6-tetramethyl-4- piperidyl)nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl)sebacate, bis(1-octyloxy-2,2,6,6-tetramethyl-piperidyl)succinate, linear or cyclic condensates of N,N'-bis-(2,2,6,6-tetramethyl-4-piperidyl)-hexamethylenediamine and 4-morpholino-2,6-dichloro-1,3,5-triazine, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidine-2,5-dione, N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, 1,1-bis(1,2,2,6,6-pentamethyl-4-piperidyloxycarbonyl)-2-(4-methoxyphenyl)ethene, N, N'-bis-formyl-N, N'-bis(2.2,6,6-tetramethyl-4-piperidyl)hexamethylenediamine, poly[methylpropyl-3-oxy-4-(2,2,6,6-tetramethyl-4-piperidyl)]siloxane, 1-(2-hydroxy-2-methylpropoxy)-4-octadecanoyloxy-2,2,6,6-tetramethylpiperidine, 1-(2-hydroxy-2-methylpropoxy)-4-hexadecanoyloxy-2,2,6,6-tetramethylpiperidine, 1-(2-hydroxy-2-methylpropoxy)-4-hydroxy-2,2,6,6-tetramethylpiperidine, 1-(2-hydroxy-2-methylpropoxy)-4-oxo-2,2,6,6-tetramethylpiperidine, bis(1-(2-hydroxy-2-methylpropoxy)-2,2,6,6-tetramethylpiperidin-4-yl)sebacate, bis(1-(2-hydroxy-2-methylpropoxy)-2,2,6,6-tetramethylpiperidin-4-yl)adipate, bis(1-(2-hydroxy-2-methylpropoxy)-2,2,6,6-tetramethylpiperidin-4-yl)succinate, bis(1-(2-hydroxy-2-methylpropoxy)-2,2,6,6-tetramethylpiperidin-4-yl)glutarate and 2,4-bis{N-[1-(2-hydroxy-2-methylpropoxy)-2,2,6,6-tetramethylpiperidin-4-yl]-N-butylamino}-6-(2-hydroxyethylamino)-s-triazine, and mixtures of two or more of the foregoing.

Exemplary oxamide compounds include, but are not limited to, 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides, and mixtures of two or more of the foregoing.

Exemplary tris-aryl-o-hydroxyphenyl-s-triazine compounds include, but are not limited to, 4,6-bis-(2,4-dimethylphenyl)-2-(2-hydroxy-4-octyloxyphenyl)-s-triazine, 4,6-bis-(2,4-dimethylphenyl)-2-(2,4-dihydroxyphenyl)-s-triazine, 2,4-bis(2,4-dihydroxyphenyl)-6-(4-chlorophenyl)-s-triazine, 2,4-bis[2-hydroxy-4-(2-hydroxy-ethoxy)phenyl]-6-(4-chlorophenyl)-s-triazine, 2,4-bis[2-hydroxy-4-(2-hydroxy-4-(2-hydroxy-ethoxy)phenyl]-6-(2,4-dimethylphenyl)-s-triazine, 2,4-bis[2-hydroxy-4-(2-hydroxyethoxy)phenyl]-6-(4-bromophenyl)-s-triazine, 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine, 2,4-bis(4-biphenylyl)-6-(2-hydroxy-4-octyloxycarbonylethylideneoxyphenyl)-s-triazine, 2-phenyl-4-[2-hydroxy-4-(3-sec-butyloxy-2-hydroxypropyloxy)phenylJ-642-hydroxy-4-(3-sec-amyloxy-2-hydroxypropyloxy)-phenyl]-s-triazine, 2,4-bis(2,4-dimethylphenyl)-6-[2-hydroxy-4-(3-benzyloxy-2-hydroxy-propyloxy)phenyl]-s-triazine, 2,4-bis(2-hydroxy-4-n-butyloxyphenyl)-6-(2,4-di-n-butyloxyphenyl)-s-triazine, methylenebis-{2,4-bis(2,4-dimethylphenyl)-6-[2-hydroxy-4-(3-butyloxy-2-hydroxypropoxy)-phenyl]-s-triazine}, 2,4,6-tris(2-hydroxy-4-isooctyloxycarbonylisopropylideneoxyphenyl)-s-triazine, 2,4-bis(2,4-dimethylphenyl)-6-(2-hydroxy-4-hexyloxy-5-α-cumylphenyl)-s-triazine, 2-(2,4,6-trimethylphenyl)-4,6-bis[2-hydroxy-4-(3-butyloxy-2-hydroxypropyloxy)phenyl]-s-triazine, 2,4,6-tris[2-hydroxy-4-(3-sec-butyloxy-2-hydroxypropyloxy)phenyq-s-triazine, 4,6-bis-(2,4-dimethylphenyl)-2-(2-hydroxy-4-(3-(2-ethylhexyloxy)-2-hydroxypropoxy)-phenyl)-s-triazine, 4,6-diphenyl-2-(4-hexyloxy-2-hydroxyphenyl)-s-triazine, and mixtures of two or more of the foregoing.

In some aspects, the additive is a peroxide scavenger such as an ester of β-thiodipropionic acid, e.g., the lauryl, stearyl, myristyl or tridecyl esters, mercaptobenzimidazole, and the zinc salt of 2-mercapto-benzimidazole, zinc dibutyldithiocarbamate, dioctadecyl disulfide, pentaerythritol tetrakis(β-dodecylmercapto)propionate, or mixtures of any of the foregoing.

In some aspects, the additive is a polyamide stabilizer such as a copper salt of a halogen, e.g., iodide, and/or phosphorus compounds and salts of divalent manganese.

In some aspects, the additive is a basic co-stabilizer such as melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, calcium stearate, zinc stearate, magnesium behenate, magnesium stearate, sodium ricinoleate and potassium palmitate, antimony pyrocatecholate or zinc pyrocatecholate.

In some aspects, the additive is a nucleating agent such as talcum, metal oxides such as titanium dioxide or magnesium oxide, phosphates, carbonates or sulfates of, preferably, alkaline earth metals, or mixtures thereof. Alternatively, the nucleating agent can be a mono- or polycarboxylic acids, and the salts thereof, e.g., 4-tert-butylbenzoic acid, adipic acid, diphenylacetic acid, sodium succinate, sodium benzoate, or mixtures thereof. In a further aspect, the additive can be a nucleating agent comprising both an inorganic and an organic material as disclosed herein above.

In some aspects, the rheology modifier can be a nanoparticles having comparatively high aspect ratios, nanoclays, nano-carbon, graphite, nano-silica, and the like.

In some aspects, the additive is a filler or reinforcing agent such as clay, kaolin, talc, asbestos, graphite, glass (such as glass fibers, glass particulates, and glass bulbs, spheres, or spheroids), mica, calcium metasilicate, barium sulfate, zinc sulfide, aluminum hydroxide, silicates, diatomaceous earth, carbonates (such as calcium carbonate, magnesium carbonate and the like), metals (such as titanium, tungsten, zinc, aluminum, bismuth, nickel, molybdenum, iron, copper, brass, boron, bronze, cobalt, beryllium, and alloys of these), metal oxides (such as zinc oxide, iron oxide, aluminum oxide, titanium oxide, magnesium oxide, zirconium oxide and the like), metal hydroxides, particulate synthetic plastics (such as high molecular weight polyethylene, polypropylene, polystyrene, polyethylene ionomeric resins, polyamide, polyester, polyurethane, polyimide, and the like), synthetic fibers (such as fibers comprising high molecular weight polyethylene, polypropylene, polystyrene, polyethylene ionomeric resins, polyamide, polyester, polyurethane, polyimide, and the like), particulate carbonaceous materials (such as carbon black and the like), wood flour and flours or fibers of other natural products, as well as cotton flock, cellulose flock, cellulose pulp, leather fiber, and combinations of any of the above. Non-limiting examples of heavy-weight filler components that can be used to increase the specific gravity of the cured elastomer composition can include titanium, tungsten, aluminum, bismuth, nickel, molybdenum, iron, steel, lead, copper, brass, boron, boron carbide whiskers, bronze, cobalt, beryllium, zinc, tin, metal oxides (such as zinc oxide, iron oxide, aluminum oxide, titanium oxide, magnesium oxide, and zirconium oxide), metal sulfates (such as barium sulfate), metal carbonates (such as calcium carbonate), and combinations of these. Non-limiting examples of light-weight filler components that can be used to decrease the specific gravity of the elastomer compound can include particulate plastics, hollow glass spheres, ceramics, and hollow spheres, regrinds, and foams, which can be used in combinations.

In some aspects, the additive is a cross-linking agent. There are a variety of cross-linking agents that can be used in the disclosed thermoplastic compositions. For example, a cross-linking agent can be a free-radical initiator. The free radical initiator can generate free radicals through thermo cleavage or UV radiation. The free-radical initiator can be present in an amount from about 0.001 wt % to about 1.0 wt %. A variety of radical initiators can be used as the radical sources to make thermoplastic compositions have a cross-linked structure. Suitable radical initiators applied include peroxides, sulfurs, and sulfides. Exemplary peroxides include, but are not limited to, aliphatic peroxides and aromatic peroxides, such as diacetylperoxide, di-tert-butypperoxide, dicumyl peroxide, dibenzoylperoxide, 2,5-dimethyl-2,5-di(benzoylperoxy)hexane, 2,5-dimethyl-2,5-di(butylperoxy)-3-hexyne, 2,5-bis-(t-butylperoxy)-2,5-dimethyl hexane, n-butyl-4,4-bis(t-butylperoxyl)valerate, 1,4-bis-(t-butylperoxyisopropyl)-benzene, t-butyl peroxybenzoate, 1,1-bis-(t-butylperoxy)-3,3,5 tri-methylcyclohexane, and di(2,4-dichloro-benzoyl), or combinations of two or more of the foregoing.

In some aspects, the additive is a colorant. The term "colorant," as used herein, means a compound providing color to a substrate, e.g., a disclosed thermoplastic composition. A colorant can include without limitation a dye, a pigment, and the like, and mixtures and combinations thereof. In some instances, the colorant can be an organic or inorganic pigment, a dye, or mixtures or combinations thereof. In a further aspect, the pigment or dye is an inorganic material such as a metal oxide, e.g., iron oxide or titanium dioxide. Alternatively, the inorganic pigment or dye can be a metal compound, e.g., strontium chromate or barium sulfate, or a metallic pigment, e.g., aluminum flakes or particles. Other exemplary inorganic pigments include carbon black, talc, and the like. In some cases, the metal compound is not one comprising cadmium. In can be desirable in some instances that the inorganic pigment or dye is not one that contains a lead, cadmium and chromium (VI) compound. In a further aspect, the pigment or dye is an organic compound such as a perylene, phthalocyanine derivative (e.g., copper phthalocyanine), a indanthrone, a benzimidazolone, a quinacridone, a perinone, and an azomethine derivative. In some instances, the composition according to any method known to a person skilled in the art. For example, the colorant can be added to the thermoplastic composition in a mixing device such as an extruder, directly or else by means of a masterbatch. In various aspects, the disclosed thermoplastic composition can comprise between about 0.005 wt % and about 5 wt % relative to the weight of the composition. In a further aspect, the disclosed thermoplastic composition can comprise between about 0.01 wt % and about 3 wt % relative to the weight of the composition.

Textiles

As discussed herein above, a disclosed composite element can comprise a textile. The textile can be a non-woven textile, a knit textile, or a woven textile. The textile can include a plurality of fibers, a plurality of filaments, or a plurality of yarns, such that the plurality of fibers, the plurality of filaments, or the plurality of yarns comprise a first thermoplastic material. In some instances, the plurality of fibers, the plurality of filaments, or the plurality of yarns can have a first and a second fiber, a first filament and a second filament, or a first yarn and a second yarn, such that each of the first and the second fiber, filament, or yarn, independently have a first thermoplastic material and an additional thermoplastic material. For example, a textile can have a plurality of yarns, such that the first yarn comprises a first thermoplastic material and the second yarn comprises an additional thermoplastic material. The first thermoplastic material and the additional thermoplastic material can be the same or different in terms of polymer composition or a property, e.g., melting temperature of the polymer.

A "textile" may be defined as any material manufactured from fibers, filaments, or yarns characterized by flexibility, fineness, and a high ratio of length to thickness. Textiles generally fall into two categories. The first category includes textiles produced directly from webs of filaments or fibers by randomly interlocking to construct non-woven fabrics and felts. The second category includes textiles formed through a mechanical manipulation of yarn, thereby producing a woven fabric, a knitted fabric, a braided fabric, a crocheted fabric, and the like.

The terms "filament," "fiber," or "fibers" as used herein refer to materials that are in the form of discrete elongated pieces that are significantly longer than they are wide. The fiber can include natural, manmade or synthetic fibers. The fibers may be produced by conventional techniques, such as extrusion, electrospinning, interfacial polymerization, pulling, and the like. The fibers can include carbon fibers, boron fibers, silicon carbide fibers, titania fibers, alumina fibers, quartz fibers, glass fibers, such as E, A, C, ECR, R, S, D, and NE glasses and quartz, or the like. The fibers can be fibers formed from synthetic polymers capable of forming fibers such as poly(ether ketone), polyimide, polybenzoxazole, poly(phenylene sulfide), polyesters, polyolefins (e.g., polyethylene, polypropylene), aromatic polyamides (e.g., an aramid polymer such as para-aramid fibers and meta-aramid fibers), aromatic polyimides, polybenzimidazoles, polyetherimides, polytetrafluoroethylene, acrylic, modacrylic, poly(vinyl alcohol), polyamides, polyurethanes, and copolymers such as polyether-polyurea copolymers, polyester-polyurethanes, polyether block amide copolymers, or the like. The fibers can be natural fibers (e.g., silk, wool, cashmere, vicuna, cotton, flax, hemp, jute, sisal). The fibers can be man-made fibers from regenerated natural polymers, such as rayon, lyocell, acetate, triacetate, rubber, and poly (lactic acid).

The fibers can have an indefinite length. For example, man-made and synthetic fibers are generally extruded in substantially continuous strands. Alternatively, the fibers can be staple fibers, such as, for example, cotton fibers or extruded synthetic polymer fibers can be cut to form staple fibers of relatively uniform length. The staple fiber can have a have a length of about 1 millimeter to 100 centimeters or more as well as any increment therein (e.g., 1 millimeter increments).

The fiber can have any of a variety of cross-sectional shapes. Natural fibers can have a natural cross-section, or can have a modified cross-sectional shape (e.g., with processes such as mercerization). Man-made or synthetic fibers can be extruded to provide a strand having a predetermined cross-sectional shape. The cross-sectional shape of a fiber can affect its properties, such as its softness, luster, and wicking ability. The fibers can have round or essentially round cross sections. Alternatively, the fibers can have non-round cross sections, such as flat, oval, octagonal, rectangular, wedge-shaped, triangular, dog-bone, multi-lobal, multi-channel, hollow, core-shell, or other shapes.

The fiber can be processed. For example, the properties of fibers can be affected, at least in part, by processes such as drawing (stretching) the fibers, annealing (hardening) the fibers, and/or crimping or texturizing the fibers.

In some cases a fiber can be a multi-component fiber, such as one comprising two or more co-extruded polymeric materials. The two or more co-extruded polymeric materials can be extruded in a core-sheath, islands-in-the-sea, segmented-pie, striped, or side-by-side configuration. A multi-component fiber can be processed in order to form a plurality of smaller fibers (e.g., microfibers) from a single fiber, for example, by remove a sacrificial material.

The fiber can be a carbon fiber such as TARIFYL produced by Formosa Plastics Corp. of Kaohsiung City, Taiwan, (e.g., 12,000, 24,000, and 48,000 fiber tows, specifically fiber types TC-35 and TC-35R), carbon fiber produced by SGL Group of Wiesbaden, Germany (e.g., 50,000 fiber tow), carbon fiber produced by Hyosung of Seoul, South Korea, carbon fiber produced by Toho Tenax of Tokyo, Japan, fiberglass produced by Jushi Group Co., LTD of Zhejiang, China (e.g., E6, 318, silane-based sizing, filament diameters 14, 15, 17, 21, and 24 micrometers), and polyester fibers produced by Amann Group of Bönningheim, Germany (e.g., SERAFILE 200/2 non-lubricated polyester filament and SERAFILE COMPHIL 200/2 lubricated polyester filament).

A plurality of fibers includes 2 to hundreds or thousands or more fibers. The plurality of fibers can be in the form of bundles of strands of fibers, referred to as tows, or in the form of relatively aligned staple fibers referred to as sliver and roving. A single type fiber can be used either alone or in combination with one or more different types of fibers by co-mingling two or more types of fibers. Examples of co-mingled fibers include polyester fibers with cotton fibers, glass fibers with carbon fibers, carbon fibers with aromatic polyimide (aramid) fibers, and aromatic polyimide fibers with glass fibers.

As used herein, the term "yarn" refers to an assembly formed of one or more fibers, wherein the strand has a substantial length and a relatively small cross-section, and is suitable for use in the production of textiles by hand or by machine, including textiles made using weaving, knitting, crocheting, braiding, sewing, embroidery, or rope-making techniques. Thread is a type of yarn commonly used for sewing.

Yarns can be made using fibers formed of natural, man-made and synthetic materials. Synthetic fibers are most commonly used to make spun yarns from staple fibers, and filament yarns. Spun yarn is made by arranging and twisting staple fibers together to make a cohesive strand. The process of forming a yarn from staple fibers typically includes carding and drawing the fibers to form sliver, drawing out and twisting the sliver to form roving, and spinning the roving to form a strand. Multiple strands can be plied (twisted together) to make a thicker yarn. The twist direction of the staple fibers and of the plies can affect the final properties of the yarn. A filament yarn can be formed of a single long, substantially continuous filament, which is conventionally referred to as a "monofilament yarn," or a plurality of individual filaments grouped together. A filament yarn can also be formed of two or more long, substantially continuous filaments which are grouped together by grouping the filaments together by twisting them or entangling them or both. As with staple yarns, multiple strands can be plied together to form a thicker yarn.

Once formed, the yarn can undergo further treatment such as texturizing, thermal or mechanical treating, or coating with a material such as a synthetic polymer. The fibers, yarns, or textiles, or any combination thereof, used in the disclosed articles can be sized. Sized fibers, yarns, and/or textiles are coated on at least part of their surface with a sizing composition selected to change the absorption or wear characteristics, or for compatibility with other materials. The sizing composition facilitates wet-out and wet-through of the coating or resin upon the surface and assists in attaining desired physical properties in the final article. An exemplary sizing composition can comprise, for example, epoxy polymers, urethane-modified epoxy polymers, polyester polymers, phenol polymers, polyamide polymers, polyurethane polymers, polycarbonate polymers, polyetherimide polymers, polyamideimide polymers, polystylylpyridine polymers, polyimide polymers bismaleimide polymers, polysulfone polymers, polyethersulfone polymers, epoxy-modified urethane polymers, polyvinyl alcohol polymers, polyvinyl pyrrolidone polymers, and mixtures thereof.

Two or more yarns can be combined, for example, to form composite yarns such as single- or double-covered yarns, and corespun yarns. Accordingly, yarns may have a variety of configurations that generally conform to the descriptions provided herein.

The yarn can comprise at least one thermoplastic material (e.g., one or more of the fibers can be made of thermoplastic material). The yarn can be made of a thermoplastic material. The yarn can be coated with a layer of a material such as a thermoplastic material.

The linear mass density or weight per unit length of a yarn can be expressed using various units, including denier (D) and tex. Denier is the mass in grams of 9000 meters of yarn. The linear mass density of a single filament of a fiber can also be expressed using denier per filament (DPF). Tex is the mass in grams of a 1000 meters of yarn. Decitex is another measure of linear mass, and is the mass in grams for a 10,000 meters of yarn.

As used herein, tenacity is understood to refer to the amount of force (expressed in units of weight, for example: pounds, grams, centinewtons or other units) needed to break a yarn (i.e., the breaking force or breaking point of the yarn), divided by the linear mass density of the yarn expressed, for example, in (unstrained) denier, decitex, or some other measure of weight per unit length. The breaking force of the yarn is determined by subjecting a sample of the yarn to a known amount of force, for example, using a strain gauge load cell such as an INSTRON brand testing system (Norwood, Mass., USA). Yarn tenacity and yarn breaking force are distinct from burst strength or bursting strength of a textile, which is a measure of how much pressure can be applied to the surface of a textile before the surface bursts.

Generally, in order for a yarn to withstand the forces applied in an industrial knitting machine, the minimum tenacity required is approximately 1.5 grams per Denier. Most yarns formed from commodity polymeric materials generally have tenacities in the range of about 1.5 grams per Denier to about 4 grams per Denier. For example, polyester yarns commonly used in the manufacture of knit uppers for footwear have tenacities in the range of about 2.5 to about 4 grams per Denier. Yarns formed from commodity polymeric materials which are considered to have high tenacities generally have tenacities in the range of about 5 grams per Denier to about 10 grams per Denier. For example, commercially available package dyed polyethylene terephthalate yarn from National Spinning (Washington, N.C., USA) has a tenacity of about 6 grams per Denier, and commercially available solution dyed polyethylene terephthalate yarn from Far Eastern New Century (Taipei, Taiwan) has a tenacity of about 7 grams per Denier. Yarns formed from high performance polymeric materials generally have tenacities of about 11 grams per Denier or greater. For example, yarns formed of aramid fiber typically have tenacities of about 20 grams per Denier, and yarns formed of ultra-high molecular weight polyethylene (UHMWPE) having tenacities greater than 30 grams per Denier are available from Dyneema (Stanley, N.C., USA) and Spectra (Honeywell-Spectra, Colonial Heights, Va., USA).

Various techniques exist for mechanically manipulating yarns to form a textile. Such techniques include, for example, interweaving, intertwining and twisting, and interlooping. Interweaving is the intersection of two yarns that cross and interweave at right angles to each other. The yarns utilized in interweaving are conventionally referred to as "warp" and "weft." A woven textile includes include a warp yarn and a weft yarn. The warp yarn extends in a first direction, and the weft strand extends in a second direction that is substantially perpendicular to the first direction. Intertwining and twisting encompasses various procedures, such as braiding and knotting, where yarns intertwine with each other to form a textile. Interlooping involves the formation of a plurality of columns of intermeshed loops, with knitting being the most common method of interlooping. The textile may be primarily formed from one or more yarns that are mechanically-manipulated, for example, through interweaving, intertwining and twisting, and/or interlooping processes, as mentioned above.

The textile can be a non-woven textile. Generally, a non-woven textile or fabric is a sheet or web structure made from fibers and/or yarns that are bonded together. The bond can be a chemical and/or mechanical bond, and can be formed using heat, solvent, adhesive or a combination thereof. Exemplary non-woven fabrics are flat or tufted porous sheets that are made directly from separate fibers, molten plastic and/or plastic film. They are not made by weaving or knitting and do not necessarily require converting the fibers to yarn, although yarns can be used as a source of the fibers. Non-woven textiles are typically manufactured by putting small fibers together in the form of a sheet or web (similar to paper on a paper machine), and then binding them either mechanically (as in the case of felt, by interlocking them with serrated or barbed needles, or hydro-entanglement such that the inter-fiber friction results in a stronger fabric), with an adhesive, or thermally (by applying binder (in the form of powder, paste, or polymer melt) and melting the binder onto the web by increasing temperature). A non-woven textile can be made from staple fibers (e.g., from wetlaid, airlaid, carding/crosslapping processes), or extruded fibers (e.g., from meltblown or spunbond processes, or a combination thereof), or a combination thereof. Bonding of the fibers in the non-woven textile can be achieved with thermal bonding (with or without calendering), hydro-entanglement, ultrasonic bonding, needlepunching (needlefelting), chemical bonding (e.g., using binders such as latex emulsions or solution polymers or binder fibers or powders), meltblown bonding (e.g., fiber is bonded as air attenuated fibers intertangle during simultaneous fiber and web formation).

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used herein, the term "and/or" includes any and all combinations of one or more of the associated listed items. Expressions such as "at least one of," when preceding a list of elements, modify the entire list of elements and do not modify the individual elements of the list.

As used in the specification and the appended claims, the singular forms "a," "an" and "the" include plural referents unless the context clearly dictates otherwise. Thus, for example, reference to "a polymer," "a mold," or "a foamed preform," including, but not limited to, two or more such polymers, molds, or preform, and the like.

As used herein, in substance or substantially means at least 50 percent, 60 percent, 75 percent, 90 percent, 95 percent, or more, as determined based on weight or volume.

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyamide is interpreted to include one or more polymer molecules of the polyamide, where the polymer molecules may or may not be identical (e.g., different molecular weights and/or isomers).

It should be noted that ratios, concentrations, amounts, and other numerical data can be expressed herein in a range format. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'". It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1 percent to 5 percent" should be interpreted to include not only the explicitly recited values of about 0.1 percent to about 5 percent, but also include individual values (e.g., 1 percent, 2 percent, 3 percent, and 4 percent) and the sub-ranges (e.g., 0.5 percent, 1.1 percent, 2.4 percent, 3.2 percent, and 4.4 percent) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated plus or minus 10 percent variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not.

As used herein, the term "units" can be used to refer to individual (co)monomer units such that, for example, styrenic repeat units refers to individual styrene (co)monomer units in the polymer. In addition, the term "units" can be used to refer to polymeric block units such that, for example, "styrene repeating units" can also refer to polystyrene blocks; "units of polyethylene" refers to block units of polyethylene; "units of polypropylene" refers to block units of polypropylene; "units of polybutylene" refers to block units of polybutylene, and so on. Such use will be clear from the context.

The term "copolymer" refers to a polymer having two or more monomer species, and includes terpolymers (i.e., copolymers having three monomer species).

Unless otherwise specified, temperatures referred to herein are based on atmospheric pressure (i.e. one atmosphere).

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

As used herein the terms "weight percent" indicates the percent by weight of a given component based on the total weight of the composition, unless otherwise specified. That is, unless otherwise specified, all wt percent values are based on the total weight of the composition. It should be understood that the sum of wt percent values for all components in a disclosed composition or formulation are equal to 100.

Compounds are described using standard nomenclature. For example, any position not substituted by any indicated group is understood to have its valence filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

The term "alkyl group" as used herein is a branched or unbranched saturated hydrocarbon group of 1 to 24 carbon atoms, such as methyl, ethyl, n propyl, isopropyl, n butyl, isobutyl, t butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Aspects

The following listing of exemplary aspects supports and is supported by the disclosure provided herein.

Aspect 1. A composite element comprising: a textile including a plurality of fibers, the plurality of fibers comprising a first thermoplastic material; and a second thermoplastic material surrounding the plurality of fibers of the textile and consolidating at least a portion of the textile, wherein the second thermoplastic material has a melting temperature lower than a melting temperature of the first thermoplastic material.

Aspect 2. The composite element of Aspect 1, wherein the textile is a non-woven textile.

Aspect 3. The composite element of Aspect 1, wherein the textile comprises a yarn which includes the plurality of fibers, and the second thermoplastic material surrounds at least portions of the yarn.

Aspect 4. The composite element of Aspect 3, wherein the textile is a knitted textile, a woven textile, a crocheted textile, or a braided textile.

Aspect 5. The composite element of any one of Aspect 1 to Aspect 4, wherein the textile is spacer textile including two textile faces, a spacer region positioned between the two textile faces, and a plurality of spacer elements in the spacer region, the spacer elements connecting the two textile faces, wherein the second thermoplastic material surrounds fibers of at least one of the two textile faces, surrounds the spacer elements, and consolidates at least one of the two textile faces and the spacer region.

Aspect 6. The composite element of Aspect 5, wherein the spacer textile is a knitted spacer textile including two knitted faces with a spacer yarn in the spacer region connecting the two knitted faces, wherein the second thermoplastic material at least partially surrounds yarn of at least one of the two knitted faces, surrounds the spacer yarn, and consolidates at least one of the two knitted faces and the spacer region.

Aspect 7. The composite element of any one of Aspect 1 to Aspect 6, wherein the textile is essentially free of dye or pigments.

Aspect 8. The composite element of any one of Aspect 3 to Aspect 7, wherein the yarn is a package dyed yarn.

Aspect 9. The composite element of any one of Aspect 3 to Aspect 7, wherein the yarn is a solution dyed yarn.

Aspect 10. The composite element of any one of Aspect 1 to Aspect 9, wherein the first thermoplastic material comprises a thermoplastic polymer selected from the group consisting of thermoplastic polyesters, thermoplastic polyethers, thermoplastic polyamides, thermoplastic polyurethanes, thermoplastic polyolefins, and combinations thereof.

Aspect 11. The composite element of Aspect 10, wherein the first thermoplastic material comprises a first thermoplastic polymer selected from the group consisting of thermoplastic polyurethanes, thermoplastic polyesters, thermoplastic polyamides, and combinations thereof.

Aspect 12. The composite element of Aspect 11, wherein the first thermoplastic polymer is a first thermoplastic polyester.

Aspect 13. The composite element of Aspect 11, wherein the first thermoplastic polyester is polyethylene terephthalate (PET).

Aspect 14. The composite element of Aspect 11, wherein the first thermoplastic polymer is a first thermoplastic polyamide.

Aspect 15. The composite element of Aspect 14, wherein the first thermoplastic polyamide is nylon 6,6, nylon 6, nylon 12, and combinations thereof.

Aspect 16. The composite element of Aspect 11, wherein the first thermoplastic polymer is a thermoplastic polyurethane.

Aspect 17. The composite element of Aspect 1 to Aspect 16, wherein the first thermoplastic material comprises a first thermoplastic copolymer.

Aspect 18. The composite element of Aspect 17, wherein the first thermoplastic copolymer is selected from the group consisting of a thermoplastic co-polyester, a thermoplastic co-polyether, a thermoplastic co-polyamide, a thermoplastic co-polyurethane, and combinations thereof.

Aspect 19. The composite element of Aspect 18, wherein the first thermoplastic copolymer is a thermoplastic co-polyester.

Aspect 20. The composite element of Aspect 18, wherein the first thermoplastic copolymer is a thermoplastic co-polyamide.

Aspect 21. The composite element of Aspect 18, wherein the first thermoplastic copolymer is a thermoplastic co-polyurethane.

Aspect 22. The composite element of Aspect 18, wherein the first thermoplastic copolymer is a thermoplastic polyether block amide (PEBA) copolymer.

Aspect 23. The composite element of any one of Aspect 1 to Aspect 22, wherein the melting temperature of —the first thermoplastic material is greater than 140 degrees Celsius (C).

Aspect 24. The composite element of any one of Aspect 1 to Aspect 23, wherein the melting temperature of the first thermoplastic material is at least 10 degrees C. greater than the melting temperature of the second thermoplastic material.

Aspect 25. The composite element of Aspect 24, wherein the melting temperature of the first thermoplastic material is at least 20 degrees C. greater than the melting temperature of the second thermoplastic material.

Aspect 26. The composite element of any one of Aspect 1 to Aspect 25, wherein the second thermoplastic material comprises a second thermoplastic polymer selected from the group consisting of a thermoplastic polyester, a thermoplastic polyether, a thermoplastic polyamide, a thermoplastic polyurethane, a thermoplastic polyolefin, and combinations thereof.

Aspect 27. The composite element of Aspect 26, wherein the second thermoplastic polymer is a thermoplastic polymer selected from the group consisting of thermoplastic polyurethanes, thermoplastic polyesters, thermoplastic polyamides, and combinations thereof.

Aspect 28. The composite element of Aspect 26, wherein the second thermoplastic polymer is a thermoplastic polyester.

Aspect 29. The composite element of Aspect 26, wherein the second thermoplastic polyester is polyethylene terephthalate (PET).

Aspect 30. The composite element of Aspect 26, wherein the second thermoplastic polymer is a thermoplastic polyamide.

Aspect 31. The composite element of Aspect 30, wherein the second thermoplastic polyamide is nylon 6,6, nylon 6, nylon 12, and combinations thereof.

Aspect 32. The composite element of Aspect 26, wherein the second thermoplastic polymer is a thermoplastic polyurethane.

Aspect 33. The composite element of any one of Aspect 1 to Aspect 32, wherein the second thermoplastic material comprises a second thermoplastic copolymer.

Aspect 34. The composite element of Aspect 33, wherein the second thermoplastic copolymer is selected from the group consisting of a thermoplastic co-polyester, a thermoplastic co-polyether, a thermoplastic co-polyimide, a thermoplastic co-polyurethane, and combinations thereof.

Aspect 35. The composite element of Aspect 34, wherein the second thermoplastic copolymer is a thermoplastic co-polyester.

Aspect 36. The composite element of Aspect 34, wherein the second thermoplastic copolymer is a thermoplastic co-polyamide.

Aspect 37. The composite element of Aspect 34, wherein the second thermoplastic copolymer is a thermoplastic co-polyurethane.

Aspect 38. The composite element of Aspect 34, wherein the second thermoplastic copolymer is a thermoplastic polyether block amide (PEBA) copolymer.

Aspect 39. The composite element of any one of Aspect 1 to Aspect 38, wherein the first thermoplastic polymer of the first thermoplastic material and the second thermoplastic polymer of the second thermoplastic polymer are the same thermoplastic polymer.

Aspect 40. The composite element of Aspect 39, wherein the first thermoplastic material and the second thermoplastic material each comprise a thermoplastic polyurethane.

Aspect 41. The composite element of Aspect 40, wherein a first polymeric component of the first thermoplastic material consists essentially of at least one thermoplastic polyurethane, and a second polymeric component of the second thermoplastic material consists essentially of at least one thermoplastic polyurethane.

Aspect 42. The composite element of any one of Aspect 1 to Aspect 42, wherein the melting temperature of the second thermoplastic material is at least 10 degrees C. lower than the melting temperature of the first thermoplastic material.

Aspect 43. The composite element of any one of Aspect 1 to Aspect 42, wherein the melting temperature of the second thermoplastic material is less than 135 degrees C.

Aspect 44. The composite element of Aspect 43, wherein the melting temperature of the second thermoplastic material is from about 80 degrees C. to about 130 degrees C.

Aspect 45. The composite element of Aspect 43, wherein the melting temperature of the second thermoplastic material is from about 90 degrees C. to about 120 degrees C.

Aspect 46. The composite element of Aspect 43, wherein the melting temperature of the second thermoplastic material is from about 100 degrees C. to about 120 degrees C.

Aspect 47. The composite element of Aspect 43, wherein the melting temperature of the second thermoplastic material is less than 125 degrees C.

Aspect 48. The composite element of Aspect 43, wherein the melting temperature of the second thermoplastic material is less than 120 degrees C.

Aspect 49. The composite element of any one of Aspect 1 to Aspect 48, wherein the second thermoplastic material is a hot melt adhesive.

Aspect 50. A fluid chamber, comprising: a composite element extending across and affixed to at least a portion of the first side of the fluid chamber, to the second side of the fluid chamber, to the sidewall of the fluid chamber, or to any combination thereof; wherein the composite element comprises a textile including a plurality of fibers, the plurality of fibers comprising a first thermoplastic material, and a second thermoplastic material surrounding and the plurality of fibers in the textile and consolidating the textile, the second thermoplastic material having a melting temperature lower than a melting temperature of the first thermoplastic material; and a fluid chamber having a first side, a second side, and a sidewall extending between the first side and the second side, the fluid chamber comprising a third thermoplastic material.

Aspect 51. The fluid chamber of Aspect 50, wherein the fluid chamber is a blow-molded fluid chamber.

Aspect 52. The fluid chamber of Aspect 50, wherein the first side of the fluid chamber and at least a portion of the sidewall are formed of a first sheet comprising a third thermoplastic material, the second side of the fluid chamber is formed of a second sheet comprising a fourth thermoplastic material.

Aspect 53. The fluid chamber of Aspect 52, wherein the first sheet is bonded to the second sheet along a seam extending around at least a portion of the sidewall.

Aspect 54. The fluid chamber of Aspect 52 or Aspect 53, wherein the seam extends along an edge of the sidewall.

Aspect 55. The fluid chamber of any one of Aspect 52 to Aspect 54, wherein the first side is a ground-facing side and the edge is adjacent to the second side.

Aspect 56. The fluid chamber of any one of Aspect 52 to Aspect 53, wherein a portion of the sidewall is formed from the second sheet.

Aspect 57. The fluid chamber of any one of Aspect 52 to Aspect 56, wherein the seam extends along a center of the sidewall.

Aspect 58. The fluid chamber of Aspect 52 or Aspect 53, wherein an opening extends through the seam into an internal void of the fluid chamber.

Aspect 59. The fluid chamber of any one of Aspect 52 to Aspect 58, wherein the opening comprises a fill valve.

Aspect 60. The fluid chamber of any one of Aspect 52 to Aspect 59, wherein the first sheet is bonded to the second sheet along a seam extending around the sidewall thereby defining a fluid-filled internal void.

Aspect 61. The fluid chamber of any one of Aspect 50 to Aspect 60, wherein the first side is a ground-facing side.

Aspect 62. The fluid chamber of Aspect 61, wherein the ground-facing side of the fluid chamber is substantially planar and the sidewall of the fluid chamber comprises a curved transition from the ground-facing side to a section of the sidewall that is substantially perpendicular to the ground-facing side.

Aspect 63. The fluid chamber of any one of Aspect 50 to Aspect 62, wherein a portion of the sidewall is formed from the second sheet.

Aspect 64. The fluid chamber of Aspect 63, wherein an opening extends through the seam into an internal void of the fluid chamber.

Aspect 65. The fluid chamber of any one of Aspect 50 to Aspect 64, wherein an internal surface of the first side, the second side and the sidewall defines an internal void of the fluid chamber.

Aspect 66. The fluid chamber of Aspect 65, wherein the composite element extends across at least a portion of an external surface of the first side, the sidewall, the second side, or combinations thereof.

Aspect 67. The fluid chamber of Aspect 65, wherein the composite element extends across at least a portion of the internal surface of the first side, the sidewall, the second side, or combinations thereof.

Aspect 68. The fluid chamber of Aspect 65, wherein the internal void is filled with a fluid.

Aspect 69. The fluid chamber of Aspect 68, wherein the fluid is a gas.

Aspect 70. The fluid chamber of Aspect 69, wherein the gas comprises $N_2$.

Aspect 71. The fluid chamber of any one of Aspect 68 to Aspect 70, wherein the fluid is pressurized.

Aspect 72. The fluid chamber of any one of Aspect 50 to Aspect 71, wherein the composite element is a composite element according to any one of Aspect 1 to Aspect 49.

Aspect 73. The fluid chamber of any one of Aspect 50 to Aspect 72, wherein the third thermoplastic material comprises a third thermoplastic polymer selected from the group consisting of a thermoplastic polyester, a thermoplastic polyether, a thermoplastic polyamide, a thermoplastic polyurethane, a thermoplastic polyolefin, and combinations thereof.

Aspect 74. The fluid chamber of Aspect 73, wherein the third thermoplastic material comprises a third thermoplastic polymer selected from the group consisting of a thermoplastic polyurethane, a thermoplastic polyester, a thermoplastic polyamide, and combinations thereof.

Aspect 75. The fluid chamber of Aspect 73, wherein the third thermoplastic polymer is a thermoplastic polyester.

Aspect 76. The fluid chamber of Aspect 73, wherein the third thermoplastic polyester is a polyethylene terephthalate (PET).

Aspect 77. The fluid chamber of Aspect 73, wherein the third thermoplastic polymer is a thermoplastic polyamide.

Aspect 78. The fluid chamber of Aspect 77, wherein the thermoplastic polyamide is nylon 6,6, nylon 6, nylon 12, and combinations thereof.

Aspect 79. The fluid chamber of Aspect 73, wherein the third thermoplastic polymer is a thermoplastic polyurethane.

Aspect 80. The fluid chamber of Aspect 50 to Aspect 79, wherein the third thermoplastic material comprises a third thermoplastic copolymer.

Aspect 81. The fluid chamber of Aspect 80, wherein the third thermoplastic copolymer is selected from the group consisting of a thermoplastic co-polyester, a thermoplastic co-polyether, a thermoplastic co-polyamide, a thermoplastic co-polyurethane, and combinations thereof.

Aspect 82. The fluid chamber of Aspect 81, wherein the third thermoplastic copolymer is a thermoplastic co-polyester.

Aspect 83. The fluid chamber of Aspect 81, wherein the third thermoplastic copolymer is a thermoplastic co-polyamide.

Aspect 84. The fluid chamber of Aspect 81, wherein the third thermoplastic copolymer is a thermoplastic co-polyurethane.

Aspect 85. The fluid chamber of Aspect 81, wherein the third thermoplastic copolymer is a thermoplastic polyether block amide (PEBA) copolymer.

Aspect 86. The fluid chamber of any one of Aspect 50 to Aspect 85, wherein the first thermoplastic material and the third thermoplastic material include the same thermoplastic polymer.

Aspect 87. The fluid chamber of any one of Aspect 50 to Aspect 85, wherein the second thermoplastic material and the third thermoplastic material include the same thermoplastic polymer.

Aspect 88. The fluid chamber of any one of Aspect 50 to Aspect 85, wherein the first thermoplastic material, the second thermoplastic material, and the third thermoplastic material include the same thermoplastic polymer.

Aspect 89. The fluid chamber of Aspect 88, wherein the first thermoplastic material, the second thermoplastic material, and the third thermoplastic material each comprise a thermoplastic polyurethane.

Aspect 90. The fluid chamber of any one of Aspect 50 to Aspect 89, wherein the melting temperature of the second thermoplastic material and the melting temperature of the third thermoplastic material are within 20 degrees C. of each other.

Aspect 91. The fluid chamber of Aspect 90, wherein the melting temperature of the second thermoplastic material and the melting temperature of the third thermoplastic material are within 10 degrees C. of each other.

Aspect 92. The fluid chamber of Aspect 90, wherein the melting temperature of the second thermoplastic material and the melting temperature of the third thermoplastic material are within 5 degrees C. of each other.

Aspect 93. The fluid chamber of Aspect 90, wherein the melting temperature of the second thermoplastic material and the melting temperature of the third thermoplastic material are substantially the same.

Aspect 94. The fluid chamber of any one of Aspect 50 to Aspect 93, wherein the melting temperature of the first thermoplastic material, the melting temperature of the second thermoplastic material, and the melting temperature of the third thermoplastic material are within 20 degrees C. of each other.

Aspect 95. The fluid chamber of Aspect 94, wherein the melting temperature of the first thermoplastic material, the melting temperature of the second thermoplastic material, and the melting temperature of the third thermoplastic material are within 10 degrees C. of each other.

Aspect 96. The fluid chamber of Aspect 94, wherein the melting temperature of the first thermoplastic material, the melting temperature of the second thermoplastic material, and the melting temperature of the third thermoplastic material are within 5 degrees C. of each other.

Aspect 97. The fluid chamber of any one of Aspect 50 to Aspect 96, wherein the melting temperature of the third thermoplastic material is at least 20 degrees C. lower than the melting temperature of the first thermoplastic material.

Aspect 98. The fluid chamber of Aspect 97, wherein the melting temperature of the third thermoplastic material is at least 30 degrees C. lower than the melting temperature Tm of the first thermoplastic material.

Aspect 99. The fluid chamber of Aspect 97, wherein the melting temperature of the third thermoplastic material is at least 50 degrees C. lower than the melting temperature of the first thermoplastic material.

Aspect 100. The fluid chamber of Aspect 97, wherein the melting temperature of the third thermoplastic material is at least 70 degrees C. lower than the melting temperature of the first thermoplastic material.

Aspect 101. The fluid chamber of any one of Aspect 50 to Aspect 100, wherein the melting temperature of the third thermoplastic material is less than 135 degrees C.

Aspect 102. The fluid chamber of Aspect 101, wherein the melting temperature of the third thermoplastic material is from about 80 degrees C. to about 135 degrees C.

Aspect 103. The fluid chamber of Aspect 101, wherein the melting temperature of the third thermoplastic material is from about 90 degrees C. to about 120 degrees C.

Aspect 104. The fluid chamber of Aspect 101, wherein the melting temperature of the third thermoplastic material is less than 125 degrees C.

Aspect 105. The fluid chamber of any one of Aspect 52 to Aspect 104, wherein the fourth thermoplastic material comprises a fourth thermoplastic polymer selected from the group consisting of a thermoplastic polyester, a thermoplastic polyether, a thermoplastic polyamide, a thermoplastic polyurethane, a thermoplastic polyolefin, and combinations thereof.

Aspect 106. The fluid chamber of Aspect 105, wherein the fourth thermoplastic material comprises a fourth thermoplastic polymer selected from the group consisting of a thermoplastic polyurethane, a thermoplastic polyester, a thermoplastic polyamide, and combinations thereof.

Aspect 107. The fluid chamber of Aspect 105, wherein the fourth thermoplastic polymer is a thermoplastic polyester.

Aspect 108. The fluid chamber of Aspect 107, wherein the fourth thermoplastic polyester is a polyethylene terephthalate.

Aspect 109. The fluid chamber of Aspect 105, wherein the fourth thermoplastic polymer is a thermoplastic polyamide.

Aspect 110. The fluid chamber of Aspect 109, wherein the fourth thermoplastic polyamide is nylon 6,6, nylon 6, nylon 12, and combinations thereof.

Aspect 111. The fluid chamber of Aspect 105, wherein the fourth thermoplastic polymer is a thermoplastic polyurethane.

Aspect 112. The fluid chamber of Aspect 52 to Aspect 111, wherein the fourth thermoplastic material comprises a fourth thermoplastic copolymer.

Aspect 113. The fluid chamber of Aspect 112, wherein the fourth thermoplastic copolymer is selected from the group consisting of a thermoplastic co-polyester, a thermoplastic co-polyether, a thermoplastic co-polyamide, a thermoplastic co-polyurethane, and combinations thereof.

Aspect 114. The fluid chamber of Aspect 112, wherein the fourth thermoplastic copolymer is a thermoplastic co-polyester.

Aspect 115. The fluid chamber of Aspect 112, wherein the fourth thermoplastic copolymer is a thermoplastic co-polyamide.

Aspect 116. The fluid chamber of Aspect 112, wherein the fourth thermoplastic copolymer is a thermoplastic co-polyurethane.

Aspect 117. The fluid chamber of Aspect 112, wherein the fourth thermoplastic copolymer is a thermoplastic polyether block amide copolymer.

Aspect 118. The fluid chamber of any one of Aspect 52 to Aspect 117, wherein the first thermoplastic material and the fourth thermoplastic material include the same thermoplastic polymer.

Aspect 119. The fluid chamber of any one of Aspect 52 to Aspect 117, wherein the second thermoplastic material and the fourth thermoplastic material include the same thermoplastic polymer.

Aspect 120. The fluid chamber of any one of Aspect 52 to Aspect 117, wherein the third thermoplastic material and the fourth thermoplastic material include the same thermoplastic polymer.

Aspect 121. The fluid chamber of any one of Aspect 52 to Aspect 117, wherein the second thermoplastic material, the third thermoplastic material, and the fourth thermoplastic material include the same thermoplastic polymer.

Aspect 122. The fluid chamber of any one of Aspect 52 to Aspect 117, wherein the first thermoplastic material, the second thermoplastic material, the third thermoplastic material, and the fourth thermoplastic material include the same thermoplastic polymer.

Aspect 123. The fluid chamber of any one of Aspect 52 to Aspect 122, wherein a first polymeric component of the first thermoplastic material consist essentially of at least one thermoplastic polyurethane, a second polymeric component of the second thermoplastic material consists essentially of at least one thermoplastic polyurethane, a third polymeric component of the third thermoplastic material consists essentially of at least one thermoplastic polyurethane, and a fourth polymeric component of the fourth thermoplastic material consists essentially of at least one thermoplastic polyurethane.

Aspect 124. The fluid chamber of any one of Aspect 52 to Aspect 123, wherein a first polymeric component of the first thermoplastic material consists essentially of at least one thermoplastic polyurethane, and a second polymeric component of the second thermoplastic material consists essentially of at least one thermoplastic polyurethane.

Aspect 125. The fluid chamber of any one of Aspect 52 to Aspect 124, wherein the melting temperature of the second thermoplastic material and the melting temperature of the fourth thermoplastic material are within 20 degrees C. of each other.

Aspect 126. The fluid chamber of Aspect 125, wherein the melting temperature of the second thermoplastic material and the melting temperature of the fourth thermoplastic material are within 10 degrees C. of each other.

Aspect 127. The fluid chamber of Aspect 125, wherein the melting temperature of the second thermoplastic material and the melting temperature of the fourth thermoplastic material are within 5 degrees C. of each other.

Aspect 128. The fluid chamber of Aspect 125, wherein the melting temperature of the second thermoplastic polymer material and the melting temperature of the fourth thermoplastic material are substantially the same.

Aspect 129. The fluid chamber of any one of Aspect 52 to Aspect 122, wherein the melting temperature of the third thermoplastic material and the melting temperature of the fourth thermoplastic material are within 20 degrees C. of each other.

Aspect 130. The fluid chamber of Aspect 129, wherein the melting temperature of the third thermoplastic material and the melting temperature of the fourth thermoplastic material are within 10 degrees C. of each other.

Aspect 131. The fluid chamber of Aspect 129, wherein the melting temperature of the third thermoplastic material and the melting temperature of the fourth thermoplastic material are within 5 degrees C. of each other.

Aspect 132. The fluid chamber of Aspect 129, wherein the melting temperature of the third thermoplastic material and the melting temperature of the fourth thermoplastic material are substantially the same.

Aspect 133. The fluid chamber of any one of Aspect 52 to Aspect 132, wherein the melting temperature of the second thermoplastic material, the melting temperature of the third thermoplastic material, and the melting temperature of the fourth thermoplastic material are within 20 degrees C. of each other.

Aspect 134. The fluid chamber of Aspect 133, wherein the melting temperature of the second thermoplastic material, the melting temperature of the third thermoplastic material, and the melting temperature of the fourth thermoplastic material are within 10 degrees C. of each other.

Aspect 135. The fluid chamber of Aspect 133, wherein the melting temperature of the second thermoplastic material, the melting temperature of the third thermoplastic material, and the melting temperature of the fourth thermoplastic material are within 5 degrees C. of each other.

Aspect 136. The fluid chamber of Aspect 133, wherein the melting temperature of the second thermoplastic polymer, the melting temperature of the third thermoplastic material, and the melting temperature of the fourth thermoplastic material are substantially the same.

Aspect 137. The fluid chamber of any one of Aspect 52 to Aspect 136, wherein the melting temperature of the fourth thermoplastic material is at least 20 degrees C. lower than the melting temperature of the first thermoplastic material.

Aspect 138. The fluid chamber of Aspect 137, wherein the melting temperature of the fourth thermoplastic material is at least 30 degrees C. lower than the melting temperature of the first thermoplastic material.

Aspect 139. The fluid chamber of Aspect 137, wherein the melting temperature of the fourth thermoplastic material is at least 50 degrees C. lower than the melting temperature of the first thermoplastic material.

Aspect 140. The fluid chamber of Aspect 137, wherein the melting temperature of the second thermoplastic material is at least 20 degrees C. lower than the melting temperature of the first thermoplastic material, of the third thermoplastic material, and of the fourth thermoplastic material.

Aspect 141. The fluid chamber of Aspect 137, wherein the melting temperature of the second thermoplastic material is at least 30 degrees C. lower than the melting temperature of the first thermoplastic material, of the third thermoplastic material, and of the fourth thermoplastic material.

Aspect 142. The fluid chamber of Aspect 137, wherein the melting temperature of the second thermoplastic material is at least 50 degrees C. lower than the melting temperature of the first thermoplastic material, of the third thermoplastic material, and of the fourth thermoplastic material.

Aspect 143. The fluid chamber of Aspect 137, wherein the melting temperature of the second thermoplastic material is at least 20 degrees C. lower than the melting temperature of the third thermoplastic material and of the fourth thermoplastic material.

Aspect 144. The fluid chamber of Aspect 137, wherein the melting temperature of the second thermoplastic material is at least 30 degrees C. lower than the melting temperature of the third thermoplastic material and of the fourth thermoplastic material.

Aspect 145. The fluid chamber of Aspect 137, wherein the melting temperature of the second thermoplastic material is at least 50 degrees C. lower than the melting temperature of the third thermoplastic material and of the fourth thermoplastic material.

Aspect 146. The fluid chamber of any one of Aspect 52 to Aspect 145, wherein the melting temperature of the fourth thermoplastic material is less than 135 degrees C.

Aspect 147. The fluid chamber of Aspect 146, wherein the melting temperature of the fourth thermoplastic material is from about 80 degrees C. to about 135 degrees C.

Aspect 148. The fluid chamber of Aspect 146, wherein the melting temperature of the fourth thermoplastic material is from about 90 degrees C. to about 120 degrees C.

Aspect 149. The fluid chamber of Aspect 146, wherein the melting temperature of the fourth thermoplastic material is less than 125 degrees C.

Aspect 150. The fluid chamber of Aspect 146, wherein the melting temperature Tm of the fourth thermoplastic polymer is less than about 120° C.

Aspect 151. The fluid chamber of any one of Aspect 52 to Aspect 150, wherein the first sheet has a gas transmission rate of 15 cm3/m2·atm·day or less for nitrogen for an average film thickness of 20 mils.

Aspect 152. The fluid chamber of any one of Aspect 52 to Aspect 151, wherein the first sheet has a thickness of about 0.1 to 40 mils.

Aspect 153. The fluid chamber of any one of Aspect 52 to Aspect 152, wherein the first sheet is a first layered film including from about 5 layers to about 200 layers; and wherein the first layered film includes at least one cap layer comprising the third thermoplastic material.

Aspect 154. The fluid chamber of Aspect 153, wherein the first layered film includes at least 7 layers.

Aspect 155. The fluid chamber of Aspect 153, wherein the first layered film includes at least 20 layers.

Aspect 156. The fluid chamber of Aspect 155, wherein the first layered film further comprises a plurality of layers formed from a fifth thermoplastic material comprising a polymer selected from the group of ethylene-vinyl alcohol copolymers, polyvinylidene polymers, polyvinylidene copolymers, polyamides, acrylonitrile polymers, polyurethane engineering plastics, polymethylpentene resins, ethylene-carbon monoxide copolymers, liquid crystal polymers, polyethylene terephthalate, polyether imides, polyacrylic imides, and mixtures thereof.

Aspect 157. The fluid chamber of Aspect 156, wherein the fifth thermoplastic material comprises an ethylene-vinyl alcohol copolymer.

Aspect 158. The fluid chamber of any one of Aspect 52 to Aspect 157, wherein the second sheet has a gas transmission rate of 15 cm3/m2·atm·day or less for nitrogen for an average film thickness of 20 mils.

Aspect 159. The fluid chamber of any one of Aspect 52 to Aspect 158, wherein the second sheet has a thickness of about 0.1 to 40 mils.

Aspect 160. The fluid chamber of any one of Aspect 52 to Aspect 159, wherein the second sheet comprises a second layered film including from about 5 layers to about 200 layers; and wherein the second layered film includes at least one cap layer comprising the fourth thermoplastic material.

Aspect 161. The fluid chamber of Aspect 160, wherein the second layered film includes at least 7 layers.

Aspect 162. The fluid chamber of Aspect 160, wherein the second layered film includes at least 20 layers.

Aspect 163. The fluid chamber of Aspect 162, wherein the first layered film comprises a plurality of layers formed from a sixth thermoplastic material comprising a polymer selected from the group of ethylene-vinyl alcohol copolymers, polyvinylidene polymers, polyvinylidene copolymers, polyamides, acrylonitrile polymers, polyurethane engineering plastics, polymethylpentene resins, ethylene-carbon monoxide copolymers, liquid crystal polymers, polyethylene terephthalate, polyether imides, polyacrylic imides, and mixtures thereof.

Aspect 164. The fluid chamber of Aspect 163, wherein the sixth thermoplastic material comprises an ethylene-vinyl alcohol copolymer.

Aspect 165. A cushioning structure comprising: a first cushioning element; and a composite element affixed to the cushioning element, wherein the composite element comprises a textile including a plurality of fibers, the plurality of fibers comprising a first thermoplastic material; and a second thermoplastic material, wherein the second thermoplastic material has a melting temperature lower than a melting temperature of the first thermoplastic material; wherein, in the composite element, the second thermoplastic material surrounds the plurality of fibers in the textile and consolidates the textile.

Aspect 166. The cushioning structure of Aspect 165, wherein the cushioning structure has an internally-facing side and an externally-facing side opposite the internally-facing side, and the composite element is affixed to the internally-facing side.

Aspect 167. The cushioning structure of Aspect 165, wherein the cushioning structure has an internally-facing side and an externally-facing side opposite the internally-facing side, and the composite element is affixed to the externally-facing side.

Aspect 168. The cushioning structure of Aspect 167, wherein the externally-facing side of the cushioning structure further comprises an outer layer affixed to a side of the composite element opposite the side affixed to the externally-facing side of the cushioning element.

Aspect 169. The cushioning structure of Aspect 168, wherein the cushioning structure is a cushioning structure for an article of footwear, the internally-facing side is an upper-facing side, the externally-facing side is a ground-facing side, and the outer layer is an outsole layer.

Aspect 170. The cushioning structure of any one of Aspect 165 to Aspect 169, wherein the cushioning structure further comprises a second cushioning element, and the composite element is positioned between and affixed to both the first cushioning structure and the second cushioning element.

Aspect 171. The cushioning structure of Aspect 170, wherein the first cushioning structure is a foam component or a fluid chamber, and the second cushioning structure is a foam component or a fluid chamber.

Aspect 172. The cushioning structure of Aspect 171, wherein the first cushioning structure is a foam component, and the second cushioning structure is a fluid chamber.

Aspect 173. The cushioning structure of Aspect 171, wherein the first cushioning structure is a fluid chamber, and the second cushioning structure is a foam component.

Aspect 174. The cushioning structure of any one of Aspect 165 to Aspect 172, wherein the first cushioning structure is a fluid chamber having a first side, a second side, and a sidewall extending between the first side, wherein the composite element extends across and is affixed to at least a portion of the first side of the fluid chamber, to the second side of the fluid chamber, to the sidewall of the fluid chamber, or to any combination thereof.

Aspect 175. The cushioning structure of Aspect 171, wherein the first side of the fluid chamber and at least a portion of the sidewall are formed of a first sheet comprising a third thermoplastic material, the second side of the fluid chamber is formed of a second sheet comprising a fourth thermoplastic material.

Aspect 176. The cushioning structure of any one of Aspect 165 to 175, wherein the composite element is a composite element according to any one of Aspect 1-Aspect 49.

Aspect 177. The cushioning structure of any one of Aspect 165 to Aspect 176, wherein the cushioning structure is a fluid chamber according to any one of Aspect 50 to Aspect 164.

Aspect 178. The cushioning structure of any one of Aspect 165 to Aspect 177, wherein the cushioning structure is a cushioning structure for an article of apparel.

Aspect 179. The cushioning structure of any one of Aspect 165 to Aspect 177, wherein the cushioning structure is a cushioning structure for an article of sporting equipment.

Aspect 180. The cushioning structure of any one of Aspect 165 to Aspect 177, wherein the cushioning structure is a sole structure for an article of footwear.

Aspect 181. The cushioning structure of any one of Aspect 171 to Aspect 181, further comprising an outsole having a chamber-engaging side and a ground-engaging side, wherein the chamber-engaging side of the outsole covers and is affixed to at least a portion of the ground-facing side of the fluid chamber.

Aspect 182. The cushioning structure of Aspect 181, wherein the chamber-engaging side of the outsole is affixed to at least a portion of the sidewall of the fluid chamber.

Aspect 183. The cushioning structure of any one of Aspect 171 to Aspect 182, further comprising a mid-sole having a ground-facing side affixed to the second side of the fluid chamber.

Aspect 184. The cushioning structure of any one of Aspect 171 to Aspect 183, wherein the outsole comprises a second composite element between the chamber-engaging side of the outsole and a portion of the ground-facing side of the fluid-filled chamber.

Aspect 185. The cushioning structure of any one of Aspect 171 to Aspect 184, wherein the outsole comprises a second composite element between the chamber-engaging side of the outsole and a portion of the ground-facing side of the fluid-filled chamber.

Aspect 186. The cushioning structure of Aspect 185, wherein the second composite element is a composite element according to any one of Aspect 1 to Aspect 49.

Aspect 187. An article of footwear, comprising: an upper; and a sole structure affixed to the upper, wherein the sole structure includes a cushioning structure according to any one of Aspect 165 to Aspect 185.

Aspect 188. An outsole for an article of footwear, the outsole comprising: a composite element according to any one of Aspect 1 to Aspect 49.

Aspect 189. A method of manufacturing a composite element, the method comprising: positioning a textile and film adjacent to each other, wherein the textile includes a plurality of fibers, the plurality of fibers comprising a first thermoplastic material; and wherein the film comprises a second thermoplastic material has a melting temperature lower than a melting temperature of the first thermoplastic material; and increasing a temperature of the film to a temperature at or above the melting temperature of the second thermoplastic material but below the melting temperature of the first thermoplastic material, such that the second thermoplastic flows and surrounds the plurality of fibers of the textile and consolidates the textile; and decreasing the temperature of the film to a temperature below the melting temperature of the second thermoplastic material such that the second thermoplastic re-solidifies, forming the composite element.

Aspect 190. The method of Aspect 189, wherein the method further comprises applying pressure to the textile and film while the temperature of the film is above the melting temperature of the second thermoplastic material.

Aspect 191. The method of Aspect 189 or 190, wherein the step of increasing the temperature is conducted while the textile and the film are in a mold, and the method further comprises removing the composite element from the mold.

Aspect 192. The method of any one of Aspect 189 to Aspect 191, wherein the composite element is a composite element according to any one of Aspect 1 to Aspect 49.

Aspect 193. A method of forming a fluid chamber, the method comprising: affixing a composite element to a fluid chamber, wherein the fluid chamber has a first side, a second side, and a sidewall extending between the first side and the second side, and the fluid chamber comprises a third thermoplastic material; wherein the composite element extends across and affixed to at least a portion of the first side of the fluid chamber, to the second side of the fluid chamber, to the sidewall of the fluid chamber, or to any combination thereof, and wherein the composite element comprises a textile including a plurality of fibers, the plurality of fibers comprising a first thermoplastic material, and a second thermoplastic material surrounding the plurality of fibers in the textile and consolidating the textile, the second thermoplastic material having a melting temperature lower than a melting temperature of the first thermoplastic material.

Aspect 194. The method of Aspect 193, wherein the step of affixing comprises melting at least a portion of the second thermoplastic material.

Aspect 195. The method of Aspect 194, wherein the step of affixing comprises melting at least a portion of the second thermoplastic material and the third thermoplastic material, and intermingling the melted portions, forming a bonding region.

Aspect 196. The method of any one of Aspect 193 to Aspect 195, wherein the method further comprises forming the composite element according to any one of Aspect 189 to Aspect 192.

Aspect 197. The method of any one of Aspect 193 to Aspect 196, wherein the step of forming the fluid chamber comprises blow-molding the fluid chamber from the third thermoplastic material.

Aspect 198. The method of any one of Aspect 193 to Aspect 196, wherein the step of forming the fluid chamber comprises forming the fluid chamber from a first sheet comprising the third thermoplastic material.

Aspect 199. The method of Aspect 198, wherein the step of forming the fluid chamber comprises thermoforming the first sheet.

Aspect 200. The method of Aspect 199, wherein the thermoforming is conducted in a mold.

Aspect 201. The method of Aspect 199 or 200, wherein the composite element is affixed to the first sheet during the thermoforming.

Aspect 202. The method of Aspect 198 to Aspect 201, wherein the step of forming the fluid chamber further comprises forming the fluid chamber from a second sheet comprising a fourth thermoplastic material.

Aspect 203. The method of Aspect 202, wherein the step of forming the fluid chamber comprises forming the first side from the first sheet, forming the second side from the second sheet, and forming at least a portion of the sidewall from the first sheet or from the second sheet.

Aspect 204. The method of Aspect 202 or Aspect 203, wherein the step of forming the fluid chamber comprises bonding the first sheet to the second sheet.

Aspect 205. The method of any one of Aspect 193 to Aspect 204, wherein the method further comprises filling the fluid chamber with a gas.

Aspect 206. The method of any one of Aspect 193 to Aspect 205, wherein the method further comprises: locating a first sheet in a first portion of a mold; locating a second sheet over the first portion of the mold, the second sheet covering at least a portion of the first sheet; increasing a temperature of the third thermoplastic material or the fourth thermoplastic material or both, thereby bonding the first sheet and the second sheet together, forming a fluid chamber; introducing a fluid to the fluid chamber; sealing the fluid chamber; and removing it from the mold.

Aspect 207. The method of Aspect 206, wherein the step of increasing the temperature of the third thermoplastic material or the fourth thermoplastic material or both comprises increasing the temperature the third thermoplastic material and the fourth thermoplastic material to a temperature above the melting point of the third thermoplastic material and above the melting point of the fourth thermoplastic material, and melting a portion of the third thermoplastic material and a portion of the fourth thermoplastic material, and intermingling the melted portions forming a bonding region.

Aspect 208. The method of any one of Aspect 193 to Aspect 207, wherein the fluid chamber is a fluid chamber according to any one of Aspect 50 to Aspect 164.

Aspect 209. A method of making a cushioning structure, the method comprising: affixing a composite element to a first cushioning element; wherein the composite element comprises a textile including a plurality of fibers, the plurality of fibers comprising a first thermoplastic material; a second thermoplastic material, wherein the second thermoplastic material has a melting temperature lower than a melting temperature of the first thermoplastic material; and, in the composite element, the second thermoplastic material surrounds the plurality of fibers in the textile and consolidates the textile.

Aspect 210. The method of Aspect 209, wherein the cushioning structure has an internally-facing side and an externally-facing side opposite the internally-facing side, and the affixing comprises affixing the composite element to the internally-facing side.

Aspect 211. The method of Aspect 209, wherein the cushioning structure has an internally-facing side and an externally-facing side opposite the internally-facing side, and the affixing comprises affixing the composite element to the externally-facing side.

Aspect 212. The method of any one of Aspect 209 to Aspect 211, wherein the method further comprises affixing an outer layer to a side of the composite element opposite the side affixed to the externally-facing side of the cushioning element.

Aspect 213. The method of any one of Aspect 209 to Aspect 212, wherein the method further comprises affixing a second cushioning structure to the first cushioning structure or the composite element.

Aspect 214. The method of Aspect 213, wherein the method further comprises positioning the composite element between the first cushioning structure and the second cushioning element, and affixing the composite element to both the first cushioning structure and the second cushioning element.

Aspect 215. The method of any one of Aspect 209 to Aspect 214, wherein the cushioning structure is a cushioning structure according to any one of Aspect 165 to Aspect 185.

Aspect 216. A method of manufacturing an article, comprising: affixing a first component to a cushioning structure, wherein the cushioning structure is a cushioning structure according to any one of Aspect 165 to Aspect 185.

Aspect 217. The method of Aspect 216, wherein the first component is an upper for an article of footwear, and the cushioning structure is a sole structure for an article of footwear.

Aspect 218. The method of Aspect 216 or Aspect 217, wherein the step of affixing comprises affixing the first component to the cushioning structure using an adhesive.

Aspect 219. The method of Aspect 216 or Aspect 217, wherein the step of affixing comprises affixing the first component to the cushioning structure comprises forming a heat bond between the first component and the cushioning structure by melting a portion of the second thermoplastic material of the composite element.

From the foregoing, it will be seen that aspects herein are well adapted to attain all the ends and objects hereinabove set forth together with other advantages which are obvious and which are inherent to the structure.

While specific elements and steps are discussed in connection to one another, it is understood that any element and/or steps provided herein is contemplated as being combinable with any other elements and/or steps regardless of explicit provision of the same while still being within the scope provided herein.

It will be understood that certain features and sub-combinations are of utility and may be employed without reference to other features and sub-combinations. This is contemplated by and is within the scope of the claims.

Since many possible aspects may be made without departing from the scope thereof, it is to be understood that all matter herein set forth or shown in the accompanying drawings and detailed description is to be interpreted as illustrative and not in a limiting sense.

It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

It should be emphasized that the above-described aspects of the present disclosure are merely possible examples of implementations, and are set forth only for a clear understanding of the principles of the disclosure. Many variations and modifications may be made to the above-described aspects of the disclosure without departing substantially from the spirit and principles of the disclosure. All such modifications and variations are intended to be included herein within the scope of this disclosure.

What is claimed:

1. A fluid chamber, comprising:
   a fluid chamber having a first side, a second side, and a sidewall extending between the first side and the second side, wherein the first side of the fluid chamber and at least a and wherein the second side of the fluid chamber is formed of a second sheet comprising a fourth thermoplastic material;
   a composite element extending across and affixed to at least a portion of the first side of the fluid chamber, to the second side of the fluid chamber, to the sidewall of the fluid chamber, or to any combination thereof; and
   wherein the composite element comprises a textile including a plurality of fibers, the plurality of fibers comprising a first thermoplastic material, and a second thermoplastic material surrounding and the plurality of fibers in the textile and consolidating the textile, the second thermoplastic material having a melting temperature lower than a melting temperature of the first thermoplastic material.

2. The fluid chamber of claim 1, wherein the textile comprises a yarn which includes the plurality of fibers, and the second thermoplastic material surrounds at least portions of the yarn.

3. The fluid chamber of claim 1, wherein the textile is a knitted textile, a woven textile, a crocheted textile, or a braided textile.

4. The fluid chamber of claim 1, wherein the first thermoplastic material comprises a thermoplastic polymer selected from the group consisting of thermoplastic polyesters, thermoplastic polyethers, thermoplastic polyamides, thermoplastic polyurethanes, thermoplastic polyolefins, and combinations thereof.

5. The fluid chamber of claim 1, wherein the melting temperature of the first thermoplastic material is greater than 140 degrees Celsius.

6. The fluid chamber of claim 1, wherein the melting temperature of the first thermoplastic material is at least 10 degrees Celsius greater than the melting temperature of the second thermoplastic material.

7. The fluid chamber of claim 1, wherein the second thermoplastic material comprises a second thermoplastic polymer selected from the group consisting of a thermoplastic polyester, a thermoplastic polyether, a thermoplastic polyamide, a thermoplastic polyurethane, a thermoplastic polyolefin, and combinations thereof.

8. The fluid chamber of claim 1, wherein the first sheet is bonded to the second sheet along a seam extending around at least a portion of the sidewall.

9. The fluid chamber of claim 1, wherein an internal surface of the first side, the second side and the sidewall defines an internal void of the fluid chamber.

10. The fluid chamber of claim 9, wherein the composite element extends across at least a portion of an external surface of the first side, the sidewall, the second side, or combinations thereof.

11. The fluid chamber of claim 9, wherein the composite element extends across at least a portion of the internal surface of the first side, the sidewall, the second side, or combinations thereof.

12. The fluid chamber of claim 10, wherein the internal void is filled with a fluid.

13. The fluid chamber of claim 12, wherein the fluid is pressurized.

14. The fluid chamber of claim 1, wherein the fluid chamber is a midsole element for an article of footwear.

15. An article of footwear, comprising:
    an upper; and
    a sole structure affixed to the upper, wherein the sole structure includes a fluid chamber of claim 1.

16. A method of forming a fluid chamber, the method comprising:
affixing a composite element to a fluid chamber,
wherein the fluid chamber has a first side, a second side, and a sidewall extending between the first side and the second side, wherein the first side of the fluid chamber and at least a portion of the sidewall are formed of a sheet comprising a third thermoplastic material, and wherein the second side of the fluid chamber is formed of a second sheet comprising a fourth thermoplastic material;
wherein the composite element extends across and affixed to at least a portion of the first side of the fluid chamber, to the second side of the fluid chamber, to the sidewall of the fluid chamber, or to any combination thereof, and
wherein the composite element comprises a textile including a plurality of fibers, the plurality of fibers comprising a first thermoplastic material, and a second thermoplastic material surrounding and the plurality of fibers in the textile and consolidating the textile, the second thermoplastic material having a melting temperature lower than a melting temperature of the first thermoplastic material.

17. The method of claim 16, wherein the step of affixing comprises melting at least a portion of the second thermoplastic material; and wherein the step of affixing comprises melting at least a portion of the second thermoplastic material and the third thermoplastic material, and intermingling the melted portions, forming a bonding region.

18. The method of claim 16, wherein the step of forming the fluid chamber comprises forming the fluid chamber from a first sheet comprising the third thermoplastic material.

19. The method of claim 16, wherein the step of forming the fluid chamber comprises thermoforming the first sheet; and wherein the thermoforming is conducted in a mold.

* * * * *

UNITED STATES PATENT AND TRADEMARK OFFICE
CERTIFICATE OF CORRECTION

PATENT NO. : 10,849,386 B2
APPLICATION NO. : 16/658067
DATED : December 1, 2020
INVENTOR(S) : Edwards et al.

It is certified that error appears in the above-identified patent and that said Letters Patent is hereby corrected as shown below:

In the Claims

Claim 1, Column 69, Line 67, "at least a and wherein" should read --at least a portion of the sidewall are formed of a sheet comprising a third thermoplastic material, and wherein--.

Claim 16, Column 71, Line 8, "sheet comprisinq" should read --sheet comprising--.

Claim 16, Column 71, Line 10, "sheet comprisinq" should read --sheet comprising--.

Signed and Sealed this
Fifth Day of April, 2022

Drew Hirshfeld
*Performing the Functions and Duties of the
Under Secretary of Commerce for Intellectual Property and
Director of the United States Patent and Trademark Office*